(12) United States Patent
Toh

(10) Patent No.: US 11,025,637 B2
(45) Date of Patent: Jun. 1, 2021

(54) OFFLINE SALES EXECUTION SYSTEM

(71) Applicant: Suites Digital Pte Ltd, Singapore (SG)

(72) Inventor: Yeow Kwang Toh, Singapore (SG)

(73) Assignee: Suites Digital Pte Ltd, Singapore (SG)

( * ) Notice: Subject to any disclaimer, the term of this patent is extended or adjusted under 35 U.S.C. 154(b) by 0 days.

(21) Appl. No.: 16/757,820

(22) PCT Filed: Oct. 30, 2018

(86) PCT No.: PCT/IB2018/058489
§ 371 (c)(1),
(2) Date: Apr. 21, 2020

(87) PCT Pub. No.: WO2019/087063
PCT Pub. Date: May 9, 2019

(65) Prior Publication Data
US 2020/0387956 A1  Dec. 10, 2020

(30) Foreign Application Priority Data

Oct. 30, 2017  (GB) ..................... 1717766

(51) Int. Cl.
*H04L 29/06* (2006.01)
*G06F 16/21* (2019.01)
(Continued)

(52) U.S. Cl.
CPC .......... *H04L 63/104* (2013.01); *G06F 16/211* (2019.01); *G06F 16/273* (2019.01);
(Continued)

(58) Field of Classification Search
None
See application file for complete search history.

(56) References Cited

U.S. PATENT DOCUMENTS 5,913,061 A * 6/1999 Gupta .................... G06Q 10/10
718/101
6,332,163 B1 * 12/2001 Bowman-Amuah .........
H04L 12/4604
709/217

(Continued)

FOREIGN PATENT DOCUMENTS

WO  2006033556  3/2006

OTHER PUBLICATIONS

Leahu, Marius et al. Role Based Access Control in the ATLAS Experiment. 2007 15th IEEE-NPSS Real-Time Conference, https://ieeexplore.IEEE.org/stamp/stamp.jsp?tp=&arnumber=4382738 (Year: 2007).*

(Continued)

*Primary Examiner* — Jeremiah L Avery
(74) *Attorney, Agent, or Firm* — Taylor English Duma LLP

(57) ABSTRACT

An interaction execution system with an interaction application for installation on a client device for deriving an actual location of the client device, receiving user interaction data indicating a user interaction with an interaction partner at a pre-determined location. The actual location of the client device is compared with the pre-determined location of the user interaction and an automated message is generated if a mismatch between the actual location of the client device and the pre-determined location of the user interaction is detected.

20 Claims, 27 Drawing Sheets

(51) Int. Cl.
  *G06Q 10/10* (2012.01)
  *G06F 21/62* (2013.01)
  *H04L 29/08* (2006.01)
  *G06F 16/27* (2019.01)
  *G06Q 10/06* (2012.01)
  *G06Q 30/06* (2012.01)

(52) U.S. Cl.
  CPC ........... *G06F 21/629* (2013.01); *G06Q 10/10* (2013.01); *H04L 67/02* (2013.01); *G06F 2221/2141* (2013.01); *G06Q 10/0633* (2013.01); *G06Q 10/0639* (2013.01); *G06Q 30/0603* (2013.01); *G06Q 30/0631* (2013.01)

(56) References Cited

U.S. PATENT DOCUMENTS

| | | | |
|---|---|---|---|
| 6,519,571 B1* | 2/2003 | Guheen | G06Q 30/02 705/14.66 |
| 6,615,258 B1* | 9/2003 | Barry | G06F 11/0709 709/223 |
| 7,124,101 B1* | 10/2006 | Mikurak | G06Q 10/06 705/35 |
| 7,315,826 B1* | 1/2008 | Guheen | G06Q 10/06 705/7.29 |
| 8,364,559 B1 | 1/2013 | Amit et al. | |
| 2011/0225417 A1* | 9/2011 | Maharajh | H04L 65/4076 713/150 |
| 2014/0089133 A1 | 3/2014 | Stuart et al. | |
| 2014/0207570 A1 | 7/2014 | Cancro et al. | |
| 2015/0356601 A1 | 12/2015 | Haiyun | |
| 2017/0048252 A1* | 2/2017 | Straub | H04L 67/06 |
| 2017/0201850 A1* | 7/2017 | Raleigh | G06F 3/0482 |

OTHER PUBLICATIONS

Botha, R.A.; Eloff, J.H.P. Separation of duties for access control enforcement in workflow environments. IBM Systems Journal, vol. 40, Issue: 3. https://ieeexplore.IEEE.org/stamp/stamp.jsp?tp=&arnumber=5386928 (Year: 2001).*

Enokido, Tomoya; Takizawa, Makoto. Purpose-Based Information Flow Control for Cyber Engineering. IEEE Transactions on Industrial Electronics vol. 58, Issue: 6. https://ieeexplore.IEEE.org/stamp/stamp.jsp?tp=&arnumber=5765753 (Year: 2011).*

Toh, Yeow Kwang; International Search Report and Written Opinion for PCT/IB2018/058489, filed Oct. 30, 2018, dated Mar. 27, 2019, 14 pgs.

* cited by examiner

Food items ~ 136
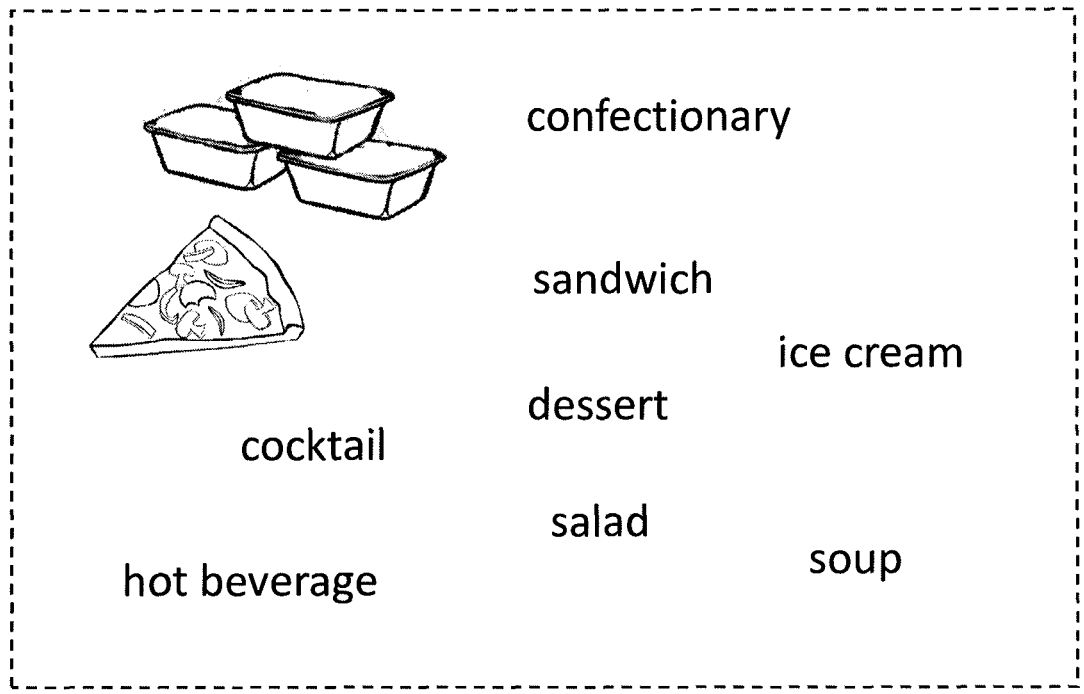
Equipment ~ 137
Management, Billing, Accounting ~ 138
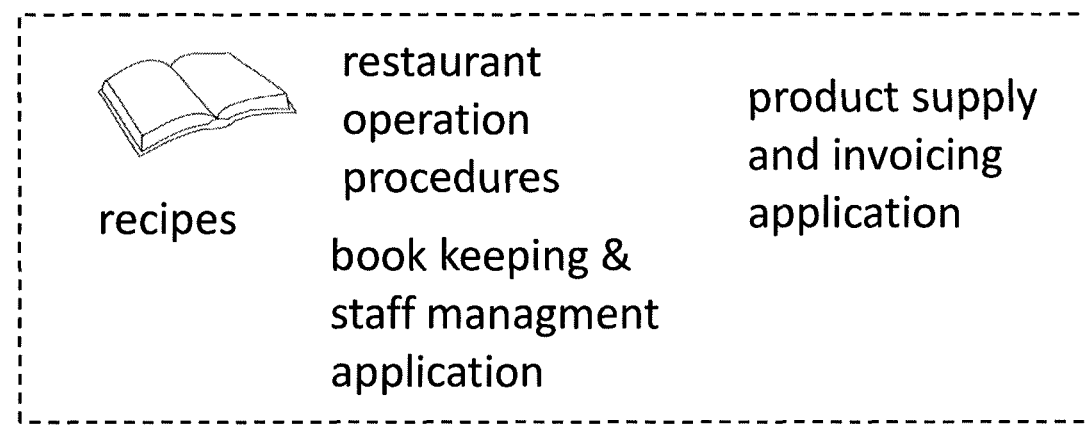
Fig. 23

OFFLINE SALES EXECUTION SYSTEM

The present specification relates to a sales execution system.

In the service industry, the quality of service provided by company representatives in direct contact with their customers, for example a sales person, is instrumental in building customer confidence in the company and maintaining good customer relationship in the long term. Even with a team of dedicated sales personnel, coordinating operations, human resources and marketing can be challenging.

An issue faced by the sales team, who makes frequent customer visits to do customer profiling and sell products is the amount of information they have to keep track of during these visits. To be effective, the sales person is encouraged to improve their relationship with their customers by visiting each customer on a regular basis, noting the details of the primary contact person, conducting pantry checks, and recommending suitable products to the customer while having sufficient knowledge of the products sold by their company.

The sales manager, on the other hand, requires updates from their sales team on the information they obtained during calls with their respective customers, and information on the sales team's performance on-the-go. The sales manager needs to measure the performance of his sales team against Key Performance Indexes or Indicators (KPI) and objectives set by the company. The market team faces the challenge to determine which products are on-demand and which should be on promotion, and to update the product catalogue correspondingly before communicating this to the sales managers and their teams.

Here and in the following, a customer refers in general to a service provider which in turn sells goods or services to end users or consumers. These service providers usually maintain a closer contact to the sales person further up in the value chain than an end user has to its supplier of goods. In many cases they monitor their competitors and are able to provide information about them.

Electronic systems which facilitate sales processes, such as CRM (customer relationship management) systems, have been available since the 1990s. CRM is an approach adopted by companies to manage their current and potential customers through analysing the data generated from the customer's history with the respective company. The main components of CRM are building and managing customer relationship through marketing and observing relationships as they evolve through distinct phases, as well as managing these relationships at each stage and recognizing if the distribution to the firm is not homogeneous.

The current specification discloses an offline sales execution system and software application with a modular structure. The offline feature enables the system or the software applications of the system to store cloud data, such as the product catalogue, locally in a terminal device. The data can later be synchronized with the cloud via upload and download of data when an internet access is available. Thereby, many functions are still available to the user, even when internet access is not available.

A system according to the present specification can provide mobile applications, which provide a functionality that is customized to the requirements of the client, can be loaded reasonably fast and is easy to navigate, especially in comparison with applications that have been modified from a desktop version to a mobile device version.

The system is suitable for use by companies in the Service Industry who engage in distribution or sales of products. The functionality is realized in a single architecture and is provided on a robust electronic platform. The system comprises mobile electronic devices which allow users to retrieve sales information and to upload sales data when internet access is available.

The products may refer to many different types of products, in various product classes such as tangible or intangible, mobile or immobile. For example, the products may comprise hardware items, merchandise, softcopies of documents, access to data sources, online services, services in general, vouchers for goods and services, financial assets, real estate and so forth. Furthermore, the sales execution system may be used for the purchase of goods or also for rental or lease.

Further terms and definitions used in this specification include a call or customer call, product samples, offline usage, and the parties which use the sales execution system. In the context of the present specification, a call refers to any form of contact a sales person makes with the customer. Preferentially, it refers to a face-to-face meetup between sales person and customer. The face-to-face meetup is also referred to as a "sales call".

"Samples" refer to physical samples of the product and are given to the customer during a meetup. "Offline" functionality enables the user to access and update the application's database locally and synchronize to a cloud database when an internet connection is available. The data gathering and transfer is usually carried out using the mobile device module.

The term "Suites" refers to the system provider who provides the sales execution system, "clients" refers to the company using the product "Suites Solution" to sell their products to their "customers", which could be outlets. A "consumer" refers to the end user, such as a car owner or a restaurant. The product "Suites Solution" is also referred to as "sales execution system".

The offline sales execution system according to the present specification can aid in decision making and accomplish company objectives by:

Consolidating sales workflow and material in an easy-to-use software application Automating the generation of different types of sales reports Capturing real-time performance of sales personnel on the ground Helping sales leaders conduct meaningful coaching and managing of teams Helping upper management implement objectives and key performance indicators (KPIs), providing a short and long-term monitoring system, reward and warning functions Reducing operational costs and damage to environment, for example by avoiding the printing of hardcopy materials Providing calendar and route optimization functionality.

Furthermore, the sales execution system can provide a sales team management solution that helps companies to organize the sales team's daily schedule and tasks for better sales efficiency in serving their customers. The system comprises a set of applications that are suitable for a sales team, among others.

The sales execution system provides a set of independent software applications which work together to allow for sales execution and sales team management, on top of customer relationship management. It provides a platform for efficient data and information exchange between the sales person, administrative staff, sales manager, and the upper management. Similar to mobile software applications the sales execution system involves mobile applications with offline access to allow flexibility of the sales person, which enhances the process.

The offline access can be provided by downloading cloud data into a mobile device. The cloud data may be locally updated and synchronized with the data on the cloud whenever a connection to the cloud is established. By way of example, a user may trigger the synchronization manually by clicking on a button symbol. By way of synchronization local data on the mobile device, such as order data or email contents, can be uploaded onto the cloud, from where they can be retrieved by the relevant parties.

Moreover, the sales execution system can enable companies to turn on different features in each module at a pre-determined price, if required. In this way business owners who wish to enhance their sales process are able to make use of a customized combination of modules that is adapted to their budget, needs and operational procedures.

The modules of the sales execution system comprise, among others, a mobile device module, a sales leader web application and a customer web application.

The sales execution system provides various interfaces, such as a management interface and an administration management interface.

In particular, the present specification discloses a sales execution system that comprising a plurality of client devices, each of them comprising a computer memory, the computer memory. The client devices are mobile terminal devices, such as mobile phones, tablets, notebooks and similar devices.

The computer memory of a client device comprises one or more software application of a plurality of software suites. Furthermore, the computer memory comprises application management interface data, which comprises in particular access control data that determines which features of the at least one application are accessible for a user group of a predetermined set of user groups.

The application management interface updates the at least one software application of the software suite automatically based on the application management interface data, if a feature of the at least one application is not accessible for the user group and the application management interface data indicates that the feature of the at least one application is accessible for the user group.

Similarly, the application management interface updates the at least one software application of the software suite automatically based on the application management interface data, if a feature of the at least one application is accessible for the user group and the application management interface data indicates that the feature of the at least one application is not accessible for the user group.

Thereby, an administrator of the application management can release or block features of the software applications of the software suite for the user group and according to a subscription.

The access to the features does not only relate to the visible features of the graphical user interface but also to further functionality such as the data transfer from and to a locally installed copy of an application and to a data exchange between data storage locations. Among others, the data of the data storage locations can correspond to different applications or to different functionality of the same application. The data storage location can be provided on a mobile device on which the application is running or it can be provided as a remote data storage location, for example on the cloud.

Among others, the access data can be related to a task-related role of a user, such as a sales manager, a sales person or a customer or it can be related to a purchased functionality of the application. In this way, it is possible to display or make available only the functionality that a user of the application which is associated with the task-related role requires or to display or make available only the functionality that was purchased according to a subscription model or according to a one-time purchase. In one embodiment, the access data is managed by an interface on a remote server, for example by a suite management interface or a administration management interface. In this way, a change to the access data can be made available to all users which are currently connected to the remote server. For example, the access data may be stored in a remote database which is distributed or replicated among remote servers.

In particular, the access data can be pre-defined or pre-configured according to a task-related role or according to a purchased functionality. Thereby, the access to application functionality can be determined without the need to provide further configuration data over a user interface.

According to one embodiment, the access, availability, activation of deactivation of application features can be based on login data in the case of task related user roles or it can be based on payment data or data relating to purchased features that are stored on a remote server. Thereby, a licensing process can be avoided, which may involve, among others, a request for a license, a sending of license data, and a license verification procedure. Furthermore, the access data may specify that an access to the application features is provided for a trial period.

In this context accessibility of a software feature means that a command that corresponds to the feature can be executed by a user of the client device. In particular, the accessibility can be configured or modified by displaying or not displaying a graphical element of a graphical user interface (GUI) such as a menu item, a list item, a popup window or a tab. The accessibility of a feature may also be configured by executing or refusing a command on a computer of a remote computer system.

In particular, the remote computer system can be a distributed computer system, also known as "computing cloud" which provides a variable or dynamic allocation of computing resources and distribution of data over computer memories of remote server computers.

Furthermore, the computer memory comprises a local or front end application management application for configuring the application management interface data. The local application management application is operative to communicate with a remote administration management interface module on the remote computer system, the remote administration management interface module being configured as a gateway for a data transfer between application data of the software applications.

Furthermore, the computer memory comprises a local database for storing local application data of the at least one software application. The software application is operative to synchronize the local application data with remote application data on a remote database on a remote computer system.

Each of the software suites is configured according to a subscription scheme selected by a client entity of the software suite, the configuration comprising activation and deactivation of software applications using a suite management interface module, the suite management interface module being provided for execution on the remote computer system.

The client entity, which is also referred to as client corresponds to a person or organisation who has purchased or rented the software application suite, whereby the applications of the software suite and application features become available according to the selected subscription scheme.

According to one embodiment, an activation of an application implies that a local or front-end application is accessible for download and operative to communicate with the remote database and procedures calls, which correspond to features of the application become accessible, for example by activating or releasing the procedure calls on the remote computer system.

By providing an administration management module as a gateway for a data transfer between application data, the behaviour of an application can be configured without the need to download an updated application software or to process a verification request to access an application or an application feature on a user device, although such functionality may be provided.

The configuration of the software suites according to the subscription scheme can be provided by the suite management interface module, for example by way of receiving configuration data from an authorized user who enters access or login data into a user interface of the suite management interface module and provides configuration data, for example by way of a graphical user interface or by entering data over keyboard. Thereby, no product activation or registration process or separate verification process is needed in order to configure the software suites, although it may be provided.

In a further embodiment at least one of the client devices of a client entity of a software suite comprises a local suites management interface application that is operative to communicate with the suite management interface module on the remote computer system. Thereby, an administrator can make further applications available, for example after receiving a release code.

In particular, one or more of the software suites can comprise a suites mobile sales application for use by sales persons and for monitoring and documenting a sales process and a web store application for purchasing goods or services.

According to a further embodiment, one or more of the software suites comprises a sales leaders application for supervising one or more sales person of a group of sales persons that is assigned to the sales leader and for documenting and/or supervising the sales conducted by the group of sales persons.

According to a further embodiment, the suite management interface module is provided on one or more dedicated web servers. Likewise, the remote administration management interface module can also be provided on a dedicated web server.

In a further embodiment, the software applications comprise a login interface. The login interface limits access to a given application to one or more user group of the predetermined set of user groups according to the user access data. There may be one login interface per software application or the login interface may be shared between the applications of a single client device.

The abovementioned set of user groups can in particular comprise a sales personnel user group, a sales leaders user group, a customer user group, and an administrator user group.

In a further embodiment, the sales execution system comprises the remote computer system, and the remote database and the suites management interface module are provided on a plurality of server computers of the remote computer system.

Specifically, the subscription schemes or version can comprise a first subscription scheme in which a sales application for use by a sales person is activated, a second subscription scheme in which the sales application and a sales leaders application for use by sales leaders that supervise sales persons is activated, and a third subscription scheme in which the sales application, the sales leaders application and a web application for purchasing products is activated.

In particular, the suites management interface module can comprise functionality for setting a program suite version according to different application tiers or subscription models, such as standard, deluxe, premium and executive versions and for activating and deactivating software applications of the suite of software applications according to the selected program suite version.

Furthermore, the suite version can comprise a management version in which an access to the administration management interface module is activated, and an access to a suite management interface module is activated, and wherein the suite management interface module provides a means of selectively activating or deactivating the applications.

In particular, the software suite may comprise a sales application which comprises functionality for administering customer information, for administering customer call information, for providing a route optimization, for placing ad-hoc order, for generating a report that compares customer call data with pre-set targets and objectives, and for displaying a product catalogue.

Furthermore, the suite of software applications can comprise a sales leader application which provides functionality for generating reports about activities of members of a sales team of a sales leader, such as customer calls, and for administering a sales team. In particular, the sales leaders application can by provide access to the configuration of KPI targets and of a route optimization feature.

In particular, the suite of software applications can comprise a web store application for use by a customer that provides functionality for purchasing products, for displaying a product catalogue and for displaying information of an organization that offers the products.

The administration management interface can furthermore comprise functionality for administering sales teams, for administering customers, for administering a product gallery, for generating reports, the reports relating to sales teams, customers, products, product promotions and product related activities.

According to one embodiment the remote computer system comprises a database which contains sales related data, the sales related data being provide by the suite of software applications.

In a narrow sense, an application as used in this specification refers to a front-end application on a client device, in a wider sense it can also refer to the front end application and a corresponding remote portion of the application, wherein the remote portion may be provided simply by the remote data storage or by the remote data storage and remote application logic, which is also referred as the remote application. The remote application logic can be provided within the remote data storage, for example as database views or stored procedures, as an additional software apart from the data storage or as a combination of both.

According to a further aspect, which relates to a computer software, the current specification discloses a sales execution system with a plurality of software suites, wherein the software suites comprise software applications for installation on client devices. The software applications for installation on the client devices are also referred to as "front end applications".

Furthermore, the sales execution system comprises a local application management application for installation on the client devices. the local application management application is provided for configuring application management interface data. The application management interface data comprise access control data that determines which features of the at least one application are accessible for a user group of a predetermined set of user groups.

The local application management application is operative to communicate with a remote administration management interface module, which is configured as a gateway for a data transfer between application data of the software applications.

Moreover, the sales execution system comprises a local database for storing local application data, wherein the local application data relating to software applications of one of the software suites. The software applications are provided for installation on a client device.

The software applications of the one of the software suites which are provided for installation on the client device are operative to synchronize the local application data with remote application data on a remote database on a remote computer system.

Each of the software suites is configured according to a subscription scheme selected by a client entity of the software suite, the configuration comprising activation and deactivation of software applications using a suite management interface module, the suite management interface module being provided for execution on the remote computer system.

According to a further embodiment, a local suites management interface application is provided for installation on a client device. There is at least one suites management interface application per software suite which is operative to communicate with the suite management interface module.

In particular, the software applications of the plurality of suites can comprise a suites mobile sales application and a web store application. Furthermore, they can also comprise a sales leaders application.

In a further embodiment, the suite management interface module is operative to run on a dedicated web server. Similarly, the remote administration management interface module can be operative to run on a dedicated web server. In a simple implementation, the suite management interface module and the remote administration management interface module can be provided by remote databases which are provided on the remote computer system.

Furthermore, the applications can comprise a login interface, and wherein the login interface limits access to a given application to one or more user group of the pre-determined set of user groups according to the user access data.

In particular, the remote computer system can be provided by a distributed computer system, such as a computing cloud. By providing part of the functionality on a remote system it is easier to update to new versions. The front ends on the client devices may be updated by automated updates which take into account the subscription model that was selected by the client entity.

In a further aspect, the present specification discloses a computer memory on a mobile device, or a multitude of such computer memories, each of them being provided on a mobile device and each of them comprising at least one software application of a plurality of software suites. The software suites each comprise a multitude of software applications, which are related to the execution of a sales process, such as the abovementioned web store, sales and sales leaders applications.

Furthermore, the computer memory comprises application management interface data which in turn comprise access control data that determines which features of the at least one application are accessible for a user group of a pre-determined set of user groups.

Furthermore, the computer memory comprises a local or front end application management application for configuring the application management interface data using a mobile device. the local application management application is operative to communicate with a remote administration management interface module on the remote computer system. Furthermore, the remote administration management interface module, which is operative to run on the remote computer system, is configured as a gateway for a data transfer between application data of the software applications.

Moreover, the computer memory comprises a local database for storing local application data of the at least one software application, the software application being operative to synchronize the local application data with remote application data on a remote database on a remote computer system.

As mentioned further above, each of the software suites is configured according to a subscription scheme selected by a client entity of the software suite, and the configuration comprises activation and deactivation of software applications using a suite management interface module. The suite management interface module is provided for execution on the remote computer system.

In a further aspect the current specification discloses a computer implemented method for operating a sales execution system which comprises a plurality of software suites, the software suites comprising software applications for installation on client devices.

The method comprises receiving first configuration commands over a local administration management interface which is installed on a client device and configuring the accessibility of features of the software applications for a user group of a pre-determined set of user groups according to the first configuration commands, as well as modifying a data transfer between application data of the software applications on a remote computer system according to the first configuration commands, for example by modifying data transfer permissions.

Furthermore, the computer implemented method comprises receiving second configuration commands over a suites management interface and modifying an accessibility of applications of a software suite according to the second configuration commands, for example by changing availability of the local/front-end application for download and availability of the data transfer to the remote computer system of data from the front-end application.

The present specification discloses an interaction execution system, in particular a sales execution system, which can provide an improved interaction between a customer and a sales person.

The interaction execution system can be used, by way of example, for the handling of interaction data relating to a user interaction or a customer interaction, for the automated generation of messages relating to the customer interaction, or for automating a sales process by providing suitable information, such as workflow or product data. By using the interaction execution systems, these actions can be performed in a faster and more efficient way as compared to using a standalone mobile device or client device such as a laptop or mobile phone, which is not connected over a wireless connection, and updating the data by hand. Furthermore, the interaction execution system can provide automated detection of the location of a client device and automated triggering of a corresponding action, which can provide an improved management of a sales process.

By automating a location tracking of a user of the client device, such as sales person, manipulations of the location tracking can be avoided and the location can be tracked reliably and a loss of information, as compared to manual entry can be avoided. Apart from monitoring an actual location of a user, the location tracking can also be used, among others, for optimizing a route between customers, for the computation of a monetary compensation for driving a customer route, for the determination of a pretended sale that did not take place, and for performance monitoring of a sales person. Among others, the location tracking functionality can assist the sales person in optimizing customer visits and it can assist a sales manager in supervising the sales persons.

In particular, the current specification provides an interaction or sales execution system with a software suite that comprises an interaction or sales application for installation on a client device. The client device comprises a computer memory with an interaction or sales application, and furthermore the client device comprises location detection means for obtaining location data, such as for example a GPS antenna and software for evaluating the GPS data or a WIFI antenna and software for processing WIFI location signals.

The interaction application may also comprise a remote component for installation on a remote server, which is configured to communicate with the client device over a communication link.

The interaction execution system further comprises a remote server and a wireless connection between the client device and the remote server. In the context of the present specification, the remote server can be provided by dynamically allocated resources that may correspond to different physical servers which may be in different geographical locations. This is also referred to as "cloud computing".

The sales or interaction application is operative to derive an actual location of the client device using the location data of the location detection means. Furthermore, the interaction application is operative to receive user interaction data, such as sales call data.

For example, the sales call data can be entered over a user interface of the sales application. The sales application obtains location data and derives a location of the client device from the location data, for example by receiving a location signal from a terrestrial provider or by receiving a satellite-based location signal over a wireless communication link and evaluating data contained in the location signal.

The user interaction data is indicative of a user interaction, such as a sales call, with an interaction partner, such as a client, at a pre-determined location. The receiving of the user interaction data comprises retrieving user interaction information from a database on the client device. The database is capable of synchronizing with a corresponding remote database on the remote server. The user interaction information comprises a pre-determined location of the user interaction, data relating to the interaction partner and data relating to a user of the client device, such as a sales person.

The interaction application is further operative to compare the actual location of the client device with the predetermined location of the user interaction and to generate an automated message if a mismatch between the actual location of the client device and the pre-determined location of the user interaction is detected. For example, a mismatch may be detected by exceeding a predetermined distance, such as a 5 km distance.

Furthermore, the interaction application is operative to send the automated message to the remote server over the wireless connection as soon as the client device is connected to the internet, and to output the automated message to a user of the remote server, for example over a user interface of an administration management application on the remote server.

The abovementioned user interaction can comprise among others: a customer interaction such as a sales call, a sales talk or interview, a product instruction, a handing over of a product sample, a display of a product.

The customer interaction can comprise, among others, a communication using the client device, the entry of data into the client device, the retrieval of data from the client device, such as product data, sales process related data.

In a further embodiment, the interaction or sales execution, the client device comprises a receiver for signals of a satellite navigation system, such as Galileo, GPS or Glonass, and a position module for deriving the location of the client device from the signals of the satellite navigation system.

In a further embodiment of the interaction or sales execution system, the client device comprises a receiver for signals of a cell phone network, and a position module for deriving the location of the client device from the signals of the cell phone network.

Furthermore, the current specification discloses a computer implemented method for operating an interaction or sales execution system, which comprises a software suite. The software suite comprises an interaction or sales application for installation on a client device.

The method comprises receiving user or customer interaction data, such as sales call data, by the interaction application on the client device. The receiving of the user interaction data comprises retrieving user interaction information relating to an interaction partner, such as client, from a database on the client device. The local database of the client device is capable of detecting when the client device is connected to the wireless connection and to synchronize the local database with a remote database on the remote server.

The user interaction information comprises, among others, a pre-determined location of the user interaction, wherein the the customer interaction data is indicative of a customer interaction with the interaction partner at the pre-determined location.

The method further comprises obtaining location data and deriving a location of the client device from the location data and comparing the actual location of the client device with the pre-determined location of the user interaction.

An alert message is generated, if a mismatch between the actual location of the client device and the pre-determined location of the sales call is detected. Furthermore, an automated message is sent to the remote server as soon as the client device is connected over the wireless connection to the internet. The automated message is output for further processing to a user of the remote server, for example by way of an application management system.

In a further embodiment, the method comprises receiving a location signal over a wireless connection and deriving the location data from the location signal.

In a further embodiment, the method comprises receiving the location signal from a satellite navigation system.

In yet a further embodiment, the method comprises receiving the location signal from a cell phone network.

According to a further embodiment of the method, the customer or user interaction data comprises a request for delivering a product sample to the interaction partner, such as a client.

This is one way of verifying that a sales call has taken place.

In a further embodiment, the customer interaction data comprises a request for delivering a product or an acknowledgement of receipt of a product sample or product or data of a financial transaction to the interaction partner. In a further embodiment, the product relates to a service delivered to the interaction partner, especially a service relating to tangible products such as a product training, a product installation or a product repair and maintenance.

According to a further embodiment, the method comprises sending the generated alert message to a remote server, matching the alert message to user data of the user of the client device, wherein, by way of example, the user data can be provided by sales person data of a sales person. Furthermore, a stored track record of the user of the client device is updated, wherein the user can be a sales person, and the track record can be stored on the remote server.

According to yet a further embodiment of the method, the method comprises retrieving the stored track record of the user of the client device by a managing application of the software suite and generating a visual indicator in a graphical user interface of the managing application, wherein the visual indicator is indicative of a status of the track record of the sales person. Furthermore, the sales application may use location data in connection with a stored map, for example for providing a route for client calls of a sales person during the course of a day.

In a further aspect, the current specification discloses a computer implemented method for operating an interaction or sales execution system with a software suite. The software suite comprising an interaction or sales application for installation on a client device.

The method comprises detecting a sales call by way of receiving input data by the sales application and receiving competitor product data relating to a competitor product. Furthermore, product catalogue data is retrieved from a local database on the client device. The product data of the competitor product is matched with the product catalogue data and a product recommendation is derived by identifying one or more products in the product catalogue data which are similar to the competitor product or which complement the competitor product. The product recommendation is displayed on a display of the client device.

According to a further embodiment, the competitor product d to is indicative of one or more competitor product that the client has purchased.

According to a further embodiment, the competitor product data is indicative of one or more competitor product that the client intends to purchase.

In a further aspect, the current specification discloses a computer implemented method for operating an interaction or sales execution system with a software suite. the software suite comprising an interaction application, such as a sales application, for installation on a client device.

The interaction application monitors the distribution of product samples to a client and generates a list of distributed product samples, and it monitors products sold to the client and generates a list of sold products.

Further, the interaction application matches the list of sold products to the list of distributed product samples and raises a flag if one of the sold products matches a distributed sample, for example by changing data bits in a memory location of the client device.

In a further embodiment, the number of sold products that match a distributed sample is counted.

In a further embodiment, the method comprises collecting historical client data of the client and generating a product recommendation based on the historical data.

In yet a further aspect, the current specification discloses an interaction or sales execution system with a software suite. The software suite comprising an interaction application, such as a sales or other customer interaction application, for installation on a client device.

The client device comprises a computer memory with the interaction application, and with an interaction database that is capable of synchronizing with a remote database on the remote server. Furthermore, the interaction execution system comprises the remote server and a wireless connection between the client device and the remote server.

The interaction application is operative to detect a customer interaction, such as a sales call, by way of receiving input data, and to retrieve competitor product data relating to a competitor product from the interaction database.

Furthermore, the interaction application is operative to retrieve product catalogue data from the interaction database and to match the product data of the competitor product with the product catalogue data, and to derive a product recommendation by identifying one or more products in the product catalogue data which are similar to the competitor product or which complement the competitor product, and to display the product recommendation, for example on a display screen of the client device.

In a further embodiment, the current specification discloses an interaction or sales execution system with a software suite. The software suite comprises an interaction application, such as a sales or other customer interaction application, for installation on a client device. In a further embodiment, the sales application also comprises a remote component for installation on the remote server.

The sales interaction system further comprises a client device, with a computer memory, the computer memory comprising the interaction application and a database. The database comprises a pre-determined location of an interaction partner, such as a customer or client. The database is further capable of synchronization with a remoting database on the remote server once the client device is connected to the remote server.

The sales interaction system further comprises the remote server and a wireless connection between the client device and the remote server. The interaction application is operative to monitor the distribution of product samples to the interaction partner at the pre-determined location and to generate a list of distributed product samples.

Furthermore, the interaction application is operative to monitor products sold to the interaction partner and to generate a list of sold products, and to match the list of sold products to the list of distributed product samples.

Moreover, the interaction application is operative to raise a flag if one of the sold products matches a distributed sample, to generate an accounting message and to send the accounting message to the remote server, wherein the accounting message is of a first type if one of the sold products matches the distributed sample and of a second type if none of the sold products matches the distributed sample.

By sending the accounting message it can be avoided that samples are distributed to a customer which has already bought them or are booked under marketing instead of under discount or follow-up calculation.

In yet a further aspect, the current specification disclose a computer implemented method for operating an interaction execution system with a software suite that comprises an interaction application for installation on a client device. The method comprises receiving data indicating a request to obtain a product or a product sample on the client device, and generating a product request message for delivering the product or product sample. Further, the method comprises sending the product request message to a remote server and receiving the product request message on the remote server.

A product delivery message is generated for delivering the product or product sample to a client or to a sales person associated with the client.

In a further embodiment, the method comprises triggering an automated packaging of the product or product sample.

According to a further embodiment, the method comprises triggering an automated delivery of the product or product sample.

In yet a further embodiment the method comprises triggering an automated production of the product or product sample.

According to a further embodiment the automated production of the product or product sample comprises a 3D-printing process.

By automatically sending the product request message it is not necessary to trigger the product request message by hand or to manually notify the delivery service, the product can be delivered automatically, whereby reliability of the delivery process is improved.

In a further aspect, the current specification discloses an interaction execution system with a software suite, the software suite comprising an interaction application, such as a sales application or other customer interaction application, for installation on a client device.

The client device comprises a computer memory with the interaction application and with a database that is capable of synchronization with a remote database on the remote server.

Furthermore, the interaction execution system comprises a remote server with a remote database, the remote database comprising a pre-determined delivery location. Moreover, the interaction execution system comprises a wireless connection between the client device and the remote server.

The interaction application is operative to receive data indicating a request to obtain a product or a product sample on the client device and to generate a product request message for delivering the product or product sample to an interaction partner, such as a client or customer, and to automatically send the product request message to the remote server as soon as the client device is connected over the wireless connection, whereby the connection can be provided by a connection to the internet.

A remote portion of the interaction application is furthermore operative to receive the product request message on the remote server, to retrieve the pre-determined delivery location from a remote database and to generate a product delivery message for delivering the product or product sample to the pre-determined delivery location of the interaction partner, or to a sales person associated with the interaction partner.

In a further aspect, the current specification discloses a computer implemented method for operating an interaction execution system for generating a customer interaction workflow.

The interaction execution system comprises a software suite, with an interaction application, such as a sales application for installation on a client device.

The method comprises generating a customer interaction workflow with one or more suggested steps to follow during a customer interaction, such as a client contact a sales call etc. The customer interaction workflow further comprises data relating to material to be presented to an interaction partner, such as a client or customer, during the customer interaction.

The generated customer interaction workflow depends on input data gathered during at least one previous customer interaction, wherein the customer interaction may be provided, among others, by a client contact, a sales call, a product instruction.

According to a further embodiment, the method comprises deriving a duration measure, which is indicative of the duration of a customer relationship based on previously acquired historical data of the interaction partner and adjusting the generated customer interaction workflow depending on the derived duration measure.

According to a further embodiment, the method comprises counting a number of previous meetings with the interaction partner, and deriving the duration measure based on the number of previous meetings with the interaction partner.

According to a further embodiment, the method comprises monitoring information that has been displayed to the interaction partner by way of the client device in previous meetings or customer interactions with the interaction partner. Furthermore, the method comprises removing steps from a customer interaction workflow which relate to previously displayed information.

According to a further embodiment, the the previously displayed information relates to a video presentation of handling a product.

According to a further embodiment, the method comprises monitoring the distribution of product samples to the interaction partner and generating a list of distributed product samples. Further, the method comprises monitoring products sold to the interaction partner and generating a list of sold products.

Moreover, the list of sold products is matched to the list of distributed product samples, and the customer interaction workflow is adjusted, if one of the products in the list of sold products matches a distributed sample in the list of distributed samples.

In a further aspect, the current specification discloses an interaction or sales execution system with a software suite that comprises an interaction application, such as a sales or other customer interaction application, for installation on a client device.

Furthermore, the interaction execution system comprises a client device with a computer memory, the computer memory comprising the interaction application.

The interaction application is operative to generate a customer interaction workflow, which comprises one or more suggested steps to follow during a customer interaction with an interaction partner, such as a client contact, and data relating to material to be presented to the interaction partner during the customer interaction. The generated customer interaction workflow depends on input data gathered during at least one previous customer interaction.

According to a further aspect, the current specification discloses a method for operating a sales execution system which provides automated product recommendation based on previously acquired data of the sales execution system such as competitor product data, for example by comparing with competitors product information gathered during a sales call of a client, by evaluating previously acquired information relating to the client.

The automated product recommendation of the sales execution system differs from the mechanism employed by advertisement supported web services, which evaluate more or less static profile data and visited web pages.

The product recommendation is based on data gathered during client calls or contacts and on delivered products and product samples using the software applications of the sales execution system.

Furthermore, the sales person has an option to choose whether to use the product recommendation displayed by the sales application. This is different from a mechanism that automatically sends the product recommendation to the end user, which may cause distress of the end user and which may also be removed by a spam filter. Moreover, the sales execution system can make use of further information that would not be available to an internet-based sales application, which usually only registers the past product purchases and static profile data.

More specifically, the current specification discloses a computer implemented method for operating a sales execution system with a software suite, the software suite having a sales application for installation on a client device.

According to this method, the sales application detects a sales call is detected by way of receiving input data, for example via a graphical user interface of the sales application. Furthermore, the sales application receives competitor product data that relates to a competitor product. Specifically, the product data can be indicative of a product purchase by the client or an intention to purchase the product. The competitor product data may be stored locally on the client device and/or on a remote server, which is configured to communicate with the client device over a communication link.

Furthermore, the sales application retrieves product catalogue data from data stored on the client device and/or from data stored on a remote server and matches the product data of the competitor product with the product catalogue data, for example by comparing product characteristics, wherein the sales application uses rules for determining comparable product characteristics and for comparable parameters ranges. For example, comparable products can be headsets, headphones and earphones within a predetermined price range of 100 to 200 Dollar.

Based on this information, the sales application derives a product recommendation by identifying one or more products in the product catalogue data which are similar to the competitor product or which complement the competitor product. For example, headphones, headsets and earphones are similar and mobile phone accessories complement a mobile phone product.

The sales application then displays a product recommendation for the products which are similar to the competitor product or which complement the competitor product.

Furthermore, the sales application can comprise rules to rank the product recommendations by relevance and it can display the more relevant products in a graphically more visible way, for example by use of size or colour or by arranging the more relevant recommendations on top of a product list. According to a further embodiment, the sales application displays graphically the type of relevance of the recommendation, for example "comparable product" or "complementing product", by colour by use of symbol or in other ways.

In particular, the product data can be indicative of one or more competitor product that the client has purchased, or it can be indicative of one or more competitor product that the client intends to purchase.

Furthermore, the current specification discloses a computer implemented method for operating a sales execution system with a software suite, which relates to an automated product recommendation. the software suite has a sales application for installation on a client device, wherein the method relates to providing an automated product recommendation which is based on previously distributed product samples.

According to this method the sales application monitors or records the distribution of product samples to a client and generates a list of distributed product samples. Furthermore, the sales application also monitors or records the monitors the products sold to the client and generating a list of sold products.

The sales application matches the list of sold products to the list of distributed product samples and raises a flag if one of the sold products matches a distributed sample, wherein raising a flag refers to changing a state of a computer memory on the client device.

According to further embodiments, the sales application can also generate a purchase recommendation, a product recommendation or a performance indicator of a sales person based on the sold products that match a distributed sample.

According to a specific embodiment, the sales application counts a number of sold products that match a distributed sample. The sales application can then use this information to update a performance indicator of the sales person or a product recommendation.

According to a further embodiment, the sales application also collects or records historical client data of the client, such as past purchases, past sample orders, past received product instruction per video or per personal instructor, information characterizing products the client is interested in, discussion points and notes. Based on the historical data and the abovementioned matching process the sales application generates a product recommendation based on the historical data.

The abovementioned methods for providing a product recommendation may also be combined with a location detection of the client device for providing a more accurate product recommendation, for example based on local preferences or on the local geography or climate, on distance to the next supplier etc.

According to a further aspect which relates to providing product recommendations, the current specification discloses a sales execution system which provides an automated product recommendation that is based on competitor product.

The sales execution system comprises a software suite, that comprises a sales application for installation on a client device, as well as a client device with a computer memory that comprises the sales application and a remote server, which is configured to communicate with the client device over a communication link.

The sales application is operative to detect a sales call by way of receiving input data and to receive competitor product data relating to a competitor product, wherein the competitor product data may relate to a product already purchased by the client or to a product or product type which the client intends to purchase.

Furthermore, the sales application is operative to retrieve product catalogue data from data stored in the memory of the client device or on the remote server and to match the product data of the competitor product with the product catalogue data.

Furthermore, the sales application is operative to derive a product recommendation by identifying one or more products in the product catalogue data which are similar to the competitor product or which complement the competitor product, and to display the product recommendation on the client device.

Moreover, the sales application and/or a remote component of the sales application on the remote server can be operative to execute the further steps of the abovementioned method for providing a product recommendation based on competitor product data.

According to a further aspect which relates to product recommendations, the current specification discloses a sales execution system providing an automated product recommendation, based on distributed product samples.

The sales execution system comprises a software suite that comprises a sales application for installation on a client device. As mentioned before, the sales application may also comprise a remote component for installation on a remote server. Furthermore, the sales execution system comprises a client device with a computer memory that comprises the sales application. Furthermore, the sales execution system comprises a remote server, which is configured to communicate with the client device.

The sales application is operative to monitor the distribution of product samples to a client and to generate a list of distributed product samples. Furthermore, the sales application is operative to monitor products sold to the client and to generate a list of sold products and to match the list of sold products to the list of distributed product samples.

Moreover, the sales application is operative to raise a flag if one of the sold products matches a distributed sample, for example it can generate a purchase or product recommendation, or a performance indicator of a sales person based on the sold products that match a distributed sample.

Moreover, the sales application and/or a remote component of the sales application on the remote server can be operative to execute the further steps of the abovementioned method for providing a product recommendation based on distributed product samples.

In yet a further aspect, which relates to a sample deliver, the current specification discloses a method for operating a sales execution system that provides an automated message to deliver products or product samples, which may further include automated production, such as 3D-print or automated packaging.

More specifically, the current specification discloses a computer implemented method for operating a sales execution system with a software suite that comprises a sales application for installation on a client device.

According to this method, the sales application receives data that indicates a request to obtain a product or a product sample on the client device and generates a product request message for delivering the product or product sample. The sales application sends the product request message to a remote server. The remote server receives the product request message on the remote server and generates a product delivery message for delivering the product or product sample to a client or to a sales person associated with the client.

Moreover, the method can comprise triggering an automated packaging of the product or product sample, for example sending an automated message to a packaging service, which may be an automated packaging service. In particular, the packaging may comprise the mounting of a RFID tag to the product or the packaging material.

Moreover, the method can comprise triggering an automated delivery of the product or product sample, for example by way of sending an automated message to a delivery service, which may be an automated delivery service, for example a drone delivery service, an autonomous vehicle delivery service or a conventional motorized delivery service with automated loading and unloading.

Moreover, the method can comprise triggering an automated production of the product or product sample, for example by sending an automated message to a factory service or directly to a production machine, where it is included in a production queue of the factory service or the production machine. Specifically, the automated production of the product or product sample may comprise a 3D-printing process. In a further embodiment, the production machine is a computer integrated manufacturing machine, wherein the manufacturing can comprise, among others, the action of a mechanical tool on a workpiece, moulding, injection moulding, laser cutting or abrasion, welding, flame cutting, etching, thermal processing, compression moulding and punching.

Furthermore, the current application discloses a sales execution system which relates to a sample delivery, the sales execution system comprises a software suite with a sales application for installation on a client device. The sales execution system comprises a client device with a computer memory that comprises the sales application. Furthermore, the sales execution system comprises a remote server, which is configured to communicate with the client device over a communication link.

The sales application is operative to receive data indicating a request to obtain a product or a product sample on the client device, to generate a product request message for delivering the product or product sample, and to send the product request message to a remote server.

The product request message is received on the remote server and a product delivery message for delivering the product or product sample to a client or to a sales person associated with the client is automatically generated on the remote server.

According to a further aspect, which relates to a customer workflow, the current specification discloses a method for providing a dynamic customer workflow for handling customer calls in a sales execution system. The customer workflow is adapted based on previously acquired data of the sales execution system, especially with the aim of simplifying the workflow and adjusting the workflow to the current situation.

By way of example, the customer workflow can relate to a sales process and to product related instruction. In particular, the previously acquired data can relate to previous instructions received, and previous sales and product sample orders.

Specifically, the current specification discloses a computer implemented method for operating a sales execution system for generating a customer workflow. The sales execution system the sales execution system comprises a software suite with a sales application for installation on a client device.

According to this method, the sales application generates a customer interaction workflow or updates an existing customer workflow.

The customer interaction workflow comprises one or more suggested steps to follow during a client contact, also known as customer call, and material to be presented to the client during the client contact. The presented material can comprise physical samples or also instructional material like books and leaflets in hard- or softcopies, videos and multimedia presentations. The generated customer workflow depends on input data gathered during at least one previous client contact.

According to a further embodiment, the method comprises deriving a duration measure for the duration of a customer relationship based on previously acquired historical data of the client and adjusting the generated customer workflow depending on the derived duration measure. In particular, a number of steps of the generated workflow can be adjusted. For example, a number of steps can if the duration of the customer relationship is longer.

According to a simple example, the customers are grouped into new customers and mid-to-long term customers and the new customers are presented with a different workflow than the mid- to long term customers.

According to a further embodiment, the method comprises counting a number of previous meetings with client and deriving the duration measure based on the number of previous meetings with the client.

According to a further embodiment, which avoids the presentation of redundant information in the workflow, the method comprises monitoring information that has been displayed to the client in previous meetings and removing steps from a customer workflow which relate to previously displayed information. The removal of the workflow steps can be carried out by marking the steps as "displayed", for example by setting a tag or a property of a data structure.

According to a specific embodiment, the previously displayed information which is removed from the workflow, can relate to a video presentation of handling a product, for example a video presentation which shows a preparation or assembly of a product, or a presentation and delivery of the product to an end customer. By adjusting the workflow dynamically, cost efficiency and speed can be improved. The inclusion of a product presentation can help to achieve a unified branding and visually appealing product presentation.

According to a further embodiment, the method for dynamically adjusting the workflow comprises furthermore a monitoring of a distribution of product samples to a client and generating a list of distributed product samples, as well as a monitoring of products sold to the client and generating a list of sold products. Furthermore, the list of sold products is matched to the list of distributed product samples and the customer interaction workflow is adjusted if one or more of the products in the list of sold products matches a distributed sample in the list of distributed samples.

Furthermore, the current specification discloses a sales execution system for proving a dynamic workflow.

The subject matter of the present specification is now explained in further detail with respect to the following Figures in which FIG. 1 shows a schematic diagram of a sales execution system, FIG. 2 shows a modular structure of the sales execution system of FIG. 1, FIG. 3 shows a mobile device module of the modular structure of FIG. 2, FIG. 4 shows a sales leader module of the modular structure of FIG. 2, FIG. 5 shows a web module of the modular structure of FIG. 2, FIG. 6 shows a management interface module of the modular structure of FIG. 2, FIG. 7 shows a first view of the administration management module of the modular structure of FIG. 2, FIG. 8 shows a second view of the administration management module of the modular structure of FIG. 2, FIG. 9 illustrates a data exchange between applications assigned to the same company or applications assigned to different companies and a suites management application interface, FIG. 10 shows a workflow of the web module of FIG. 2, FIG. 11 shows a workflow of the mobile device module of FIG. 2, FIG. 12 shows a workflow of the sales leader module of FIG. 2 and FIG. 4, FIG. 13 shows a workflow of the administration management interface module of FIG. 6, FIG. 14 shows a first workflow of a scheduled call, FIG. 15 shows a second workflow of a scheduled call using functionality provided by the sales execution system of FIG. 1, FIG. 16 shows a first workflow of an ad hoc call, FIG. 17 shows a second workflow of an ad hoc call using functionality provided by the sales execution system of FIG. 1, FIG. 18 shows the sales execution system, wherein the activated and deactivated modules are indicated, FIG. 19 shows a value chain of the sales execution system, FIG. 20 shows a configuration of the sales execution system, and FIG. 21 shows a further configuration of the sales execution system, FIG. 22 shows a use of the sales execution system by a sales person, wherein a client device receives satellite position signals, FIG. 23 shows an example of product categories of products being offered by the sales execution system, FIG. 24 shows a flow diagram of using a satellite position signal in a sales application of the sales execution system, FIG. 25 shows a flow diagram, wherein a work flow is identified and displayed in the sales application, FIG. 26 shows a flow diagram, wherein a sold product is matched to distributed samples for raising a flag and generating a product recommendation, FIG. 27 shows a flow diagram, wherein a product instruction work flow is adjusted and a product suggestion is generated based on data acquired during previous client contacts.

In the following description, details are provided to describe the embodiments of the present specification It shall be apparent to one skilled in the art, however, that the embodiments may be practised without such details.

FIG. 1 shows a schematic diagram of a sales execution system 10. The sales execution system 10 comprises user terminals 11, such as a mobile phone 12 with a mobile application, a first laptop 13 with a sales leader web application and a second laptop 14 with a customer web application. The user terminals 11 can be connected to a cloud computing environment 15 over data links 9, which may comprise wireless and wired components. The user terminals 11 are provided with a computing hardware, display, input means and a front-end application. Preferentially, they are provided as mobile terminal units.

The cloud computing environment 15 comprises an administration management interface (AMI) web server 16, a distributed database 17, and one or more replicas 18 of the database 17. For example, the database 17 may be provided ucts or only a subset of a parts catalogue, which is filtered according to a predetermined filter.

The following pseudo code shows, by way of example, providing items shown in the product gallery with suitable tags that are based on the customer past interests (such as buying, view of gallery, website view or facebook) in the product. During a face-to-face visit of a sales person, the gallery presents those items to the customer in the sale person face-to-face visit.

```
CREATE Product In AMI
"Product TAG" = GET PRODUCT TAG IN FIELDS TAG ([Phone, Car, Laptop,
Motor]) // sample tag
SET Product with TAG in "Product TAG"
Create Customer
SAVE Customer Purchase Products to TRANSACTIONS
"Transactions" = GET all Customer Transactions
CREATE "PRODUCT TAG HOLDER" = [Phone: COUNT, Car: COUNT, Laptop
COUNT, Motor: COUNT]
DO LOOP in "Transactions"
    "PRODUCT" = GET PURCHASED Product
    DO LOOP in "PRODUCT"
        "TAG" = GET PRODUCT TAG
        DO LOOP in "PRODUCT TAG HOLDER"
            DO IF PRODUCT TAG HOLDER NAME EQUAL TO "TAG"
                "PRODUCT HOLDER NAME" COUNT PLUS 1
            END IF
        END LOOP
    END LOOP
END LOOP
"Most Product Tag" = CHECK PRODUCT TAG HOLDER NAME GREATER
COUNT
"Recommend Products" = GET Products where Product TAG EQUAL TO
"Most Product Tag"
CREATE "RECOMMEND" View
SHOW "Recommend Products"
``` by a distributed database and/or as a NoSQL database. In particular, the information may be stored as documents which are defined by a suitable document format such as XML or JSON.

FIG. 2 shows a modular structure of the sales execution system 10 of FIG. 1. In the embodiment of FIG. 2, the sales execution system 10 comprises various components or modules 27 and a set of applications 28, which is referred to as "suites solution 28".

The modules comprise a mobile device module 20, a web module 22, a sales leader module 24, a management interface 25 and an administration management interface 26. The mobile device module 20, the web module 22 and the sales leader module 24 respectively correspond to a first application 20, a second application 22 and a third application 24 of the sales execution system.

FIG. 3 shows the mobile device module 20 of the modular structure of FIG. 1. The functionality provided by the mobile device module 22 may be grouped into user related functions 30, customer management related functions 32, product related functions 36, 38, monitoring and planning functions 34, 40, and system related functions 41.

The user related functions 30 comprise, among others, authentication functions 42, user setting functions 43 and tracking functions 44.

The product related functions 36, 38 comprise a product gallery 36 and a product cart 38. The product gallery 36 comprises a product catalogue 45, which stores product information such as product specifications, product availability, and marketing information. Furthermore, the product gallery comprises a presentation function 46. The presentation function 46 provides a screen presentation of all prod- The customer management related functions 32 comprise customer management functions 47, customer information functions 48, customer analytics functions 49, customer history functions 50, competitor information functions 51, customer call functions 52, customer survey functions 53 and target definition functions 54. In particular, there is functionality to add a new customer, to update the customer information, to delete the customer and to edit the customer information, such as outlet information and contact information.

The competitor information comprises information relating directly to the competitor as well as information relating to the competitor's products. More specifically, the customer related functionality comprises functions to manage objectives and targets in relation to the customer, functions to prepare and document a customer call, customer analytics functions, customer history functions for tracking the customer's transactions and for keeping track of the customer's feedback.

Among others, the report functions 34 comprise functions for generating customer reports 58, products reports functions 60, call report functions 62 and schedule report functions 64. Furthermore, the report generating functions 34 comprise KPI monitoring functions 65 and to infographic generation functions 66. The infographics relate an individual management person, a team, a country or a region, among others.

The customer reports may include, by way of example, a customer category, customer fulfillment data, customer master list data and data relating to objective and targets. The customer fulfillment data refers to the number of customers a sales person has called or came into contact per day, month or year. This number may be compared against the goals set by a sales manager or other authority. The products reports may include product fulfillment and product objectives and targets, for example. The call reports may include order data, demo data, and order objectives and targets, for example. The schedule reports may include, by way of example, schedule fulfillment data and ad hoc order data.

The calendar functions 40 comprise, among others, route optimization functions 54, scheduling functions 55 and tracking functions 56. The route optimization functionality comprises functions to manage customer suggestions and preferences and route suggestions. Specifically, the scheduling functionality comprises functions to manage the customer calls, which may be scheduled calls or also ad hoc calls. The tracking functionality comprises functions to follow up with the sales process and to generate and store tracking notifications.

The system related functions 41 comprise user feedback functions 57 and system health functions 59, such as memory and performance checks and functions to improve the performance.

The following pseudo-code illustrates the route optimization functionality in further detail.

agement functions 70, such as sales team management functions, customer and contacts approval functions and organization chart functions.

FIG. 5 shows the web module 22 of the modular structure of FIG. 2 for use by a customer who intends to purchase goods or services, which are referenced in the database 17 of FIG. 1. Similar to the previously shown modules, the web module 22 comprises gallery functions 36 and cart functions 38'. Furthermore, the web module 22 comprises organization related functions 72 which allow the customer to retrieve information about the company and to contact the company for enquiries.

The cart functions 38' differ from the previously shown cart functions 38 of FIG. 4 in that they allow to enter products in the shopping cart, to pay and to check out. In summary, the cart functions 38 of FIG. 4 are primarily meant for the salesperson's use and for ordering products on behalf of the customer if the customer wishes to order a new product, such as during a call or visit or after a call or visit. By contrast, the sales functions 38' of FIG. 5 are provided primarily for the customers to top up their stocks of an

```
USE GOOGLE MAP API
GET CUSTOMERS
DO LOOP in CUSTOMERS
    GET CUSTOMER LOCATION
    GET CUSTOMER PREFERRED VISIT TIME
    APPLY CUSTOMERS LOCATION in GOOGLE MAP
    SHOW CUSTOMER PIN in GOOGLE MAP USING its LOCATION
    SHOW CUSTOMER VISIT TIME
END LOOP
GET USER CURRENT LOCATION using GPS
"DISTANCE HOLDER" = NULL
DO LOOP in CUSTOMERS COUNT
    GET CUSTOMER LOCATION
    DO IF "DISTANCE HOLDER" NOT EQUAL NULL
        DO LOOP CUSTOMERS
            "CUSTOMER DISTANCE" = USE GOOGLE MAP API (GET
DISTANCE from CUSTOMER LOCATION to "DISTANCE HOLDER")
            DO IF "CUSTOMER DISTANCE" is LESS THAN "DISTANCE
HOLDER"
                "DISTANCE HOLDER" = "CUSTOMER DISTANCE"
            END IF
        END LOOP
    END IF
    DO ELSE
        DO LOOP CUSTOMERS
            "CUSTOMER DISTANCE" = USE GOOGLE MAP API (GET
DISTANCE from CUSTOMER LOCATION to USER CURRENT LOCATION)
            DO IF "CUSTOMER DISTANCE" is LESS THAN "DISTANCE
HOLDER"
                "DISTANCE HOLDER" = "CUSTOMER DISTANCE"
            END IF
        END LOOP
    END ELSE
    GET ROUTES USING "DISTANCE HOLDER" VALUE
    DO LOOP in ROUTES
        SHOW ROUTE
        SHOW DISTANCE
        SET COLOR RED FOR TRAFFIC ROUTE
    END LOOP
END LOOP
DISTANCE = ARRANGE ASCENDING
DO LOOP in DISTANCE
END LOOP
```

FIG. 4 shows the sales leader module 24 of the modular structure of FIG. 2. Similar to the mobile device module 20 of FIG. 3, the sales leader module 34 provides customer management functionality 32', report generating functionality 34', system management functionality 41, product gallery functions 36' and user management functions 30. In addition, the sales leader module comprises organization manexisting products when it is low. Other users may also use the web module 22 of FIG. 5.

FIG. 6 shows a suites management interface of the modular structure of FIG. 2. The management interface 25 provides user management functions 30', tier management functions 74, a client management functions 76, and analytics functionality 78. Herein, a "client" refers to the persons or the entity who uses the sales execution system 10 to offer goods. The analytics functions provide a "client health" functionality which returns some general information about the client. The client information may include, by way example, client health data, such as a summary of customer numbers or the data size of the demo/presentation templates.

The FIGS. 7 and 8 show a first portion and a second portion of the administration management interface 26 of FIG. 2, respectively.

Similar to the mobile device module 20 of FIG. 3 and the sales leader module 24 of FIG. 4, the administration management module 26 provides customer related functions 32" and product gallery related functions 36". Furthermore, the administration management module 26 provides sales team management functions 70'.

The sales team management functions 70' comprise functions to add, update and deactivate users as well as to add, update and delete user roles and to assign a customer to a sales team. Furthermore, the team management functions 70' allow to monitor and define KPI targets for the sales teams and to display an organisational chart of the sales teams, which can be grouped according to team, country and region, for example. Moreover, the team management functions 70' provide a remote access, which allows to execute the sales team management functions 70' from a remote terminal.

The administration management module 26 provides further functionality, which is shown in FIG. 8, and which is similar to the functionality of the mobile device module of FIG. 3 and the sales leader module of FIG. 4. Namely, the administration management module provides user management functions 30', calendar functions 40', and report generation functions 34".

FIG. 9 illustrates a data exchange between applications assigned to the same company or applications assigned to different companies and a suites management application interface, and a corresponding modular structure.

The sales execution system provides various applications 20, 22, 24 which can be activated or unlocked on demand. Furthermore, features of the applications can be activated or deactivated. For example, the features of the applications can be grouped according to a basic, advanced and premium level and activated according to the selected level. In the example of FIG. 9, the applications are provided by the mobile device module 20, the web module 22 and the sales leaders module 24 of FIG. 2. Further applications, which are not shown in FIG. 9, include a customer application, such as the web application shown in FIG. 5, and a consumer application.

By activating the applications, the applications become available to a client. In the example of FIG. 9, the clients correspond to companies. The applications may be activated permanently or temporarily, for example by way of sending an unlocking key number that is provided in response to a received payment, for example via an online transaction. Furthermore, the applications may be activated for a certain number of users only or for a predetermined group of users only.

While the data exchange and the activation or deactivation occurs on the cloud, the activation or deactivation affects the front end and the user interface. For example, it can affect the visual appearance of the front end when deactivated functions are not displayed. The functionalities of the applications may be managed by an administration management interface (AMI) and/or by a suite management interface (SMI).

The following table provides an example for the selective activation of applications.

| Appl. | front end | |
| --- | --- | --- |
|  | Desktop | Mobile |
| Application 1 | − | + |
| Application 2 | + | + |
| Application 3 | − | + |
| Application 4 | + | − |

The selective activation of applications allows a more fine-grained billing structure according to purchased software options. Moreover, it provides a more user-friendly handling: unnecessary functions are switched off and hidden. Thereby, errors can be avoided and the handling and user experience becomes faster and more efficient.

The applications 20, 22, 24 of a company, which are symbolized by circle symbols in FIG. 9, communicate with each other over the administration management interface (AMI) 26. The AMI 26 is also shown in FIG. 2, which depicts the AMI 26 as of the entire sales execution system, whereas FIG. 9 depicts the AMI 26 as an information. For example, a new product is updated in the AMI 26, the applications 20, 22, 24 receive this updated information. In summary, the AMI 26 acts as the central management platform for independent applications with different functionalities.

Furthermore, the applications of different companies may communicate with each other over their respective AMIs. The AMI has two components, a control module for managing permissions, functions and data and a reports module for viewing overall statistics of customer and salesperson performance.

The AMI 26 accesses information about the users and permissions, the media type and the storage and controls the flow of information to and from the different applications of company. The AMI 26 allows a central administration of data streams and permissions and personalization. The AMI 26 is distinct from the database in which the information is stored. The AMI 26 manages the settings under which the applications work, while the database cloud stores the information. The AMI 26 functions as a gateway for uploading data onto the database. Other applications then retrieve this data from the database or upload data or data changes onto the database.

The AMI 26 is primarily intended for the clients to manage their own sales team and products for sale, for example by way of rules that apply to the applications. By contrast, the SMI 25 is primarily intended for the company that sells the sales execution system. It enables the company to manage their respective client base, for example by way of enabling or disabling access to applications or data for the client companies. For example, some clients may not require the ecommerce or web application 22 shown in FIG. 5, or they may require the sales or suites mobile application 20 shown in FIG. 3 but not the sales leaders application 24 shown in FIG. 4.

According to one specific example, which relates to an ecommerce application, the AMI settings control access to the catalogue, the update of prices, the provision of discounts, and the access to a payment gateway.

Each client or company corresponds to a separate database or to an independent sub-database of a main database. The functionality of the AMI may be integrated into the database or the sub-database or it may be provided by a separate software application.

According to one embodiment, an update procedure for the applications is carried out such that all applications provided by the sales execution system are updated together. The update procedure may comprise an update of the computer memory in the cloud infrastructure and an update of the computer memory on the external devices or on only some of the external devices of a client.

The FIGS. 10 to 13 and 14 to 17 illustrate workflows of the sales execution system of FIG. 1. The workflows imply a corresponding message flow. The steps of the workflows may refer to automated steps or to steps that require user interaction, such as the input of data into an input mask on a computer display or to a combination of both.

The four workflows of FIGS. 10 to 13 relate to four different user types: the workflow of FIG. 10 relate to a customer, the workflow of FIG. 11 relates to a sales person or sales representative, the workflow of FIG. 12 to a sales manager or sales leader, and the workflow of FIG. 13 relates to a sales administrator or a marketing person. The work flows of FIGS. 14 to 17 relate to different call types. FIGS. 14 and 15 relate to scheduled calls while FIGS. 16 and 17 relate to ad-hoc calls.

According to the present specification, the workflows can be stored in computer memory and they can be dynamically adjusted. The stored workflow can then be displayed or it can be used to control the behaviour of a software application that uses the workflow. For example, the stored workflow can determine a sequence of visible or audible content that the software application presents, such as input windows and questionnaires, instructional videos and other multimedia content, program menus etc. The following pseudo-code illustrates a dynamical adjustment of a workflow The workflow adjustment in the exemplary pseudo-code below relates to dynamic work-flows for sales representatives. Based on the procedure below, the workflow is different for different types of customers. According to one example, a 5 step workflow is provided for a standard customer, while a 5-plus-2 step workflow with 2 additional steps is provided for a new customer.

example in a situation in which the salesperson calls the customer on the telephone to check if the customer requires any new products and to inform him about new promotions.

In the FIGS. 10 to 13, the upper portion refers to a pre-call phase, the middle portion to an in-call phase and the lower portion to a post-call phase. In FIGS. 14 to 17, the upper portion refers to the marketing, the middle portion refers to a sales portion and the lower portion refers to a sales manager portion.

Figure 1:
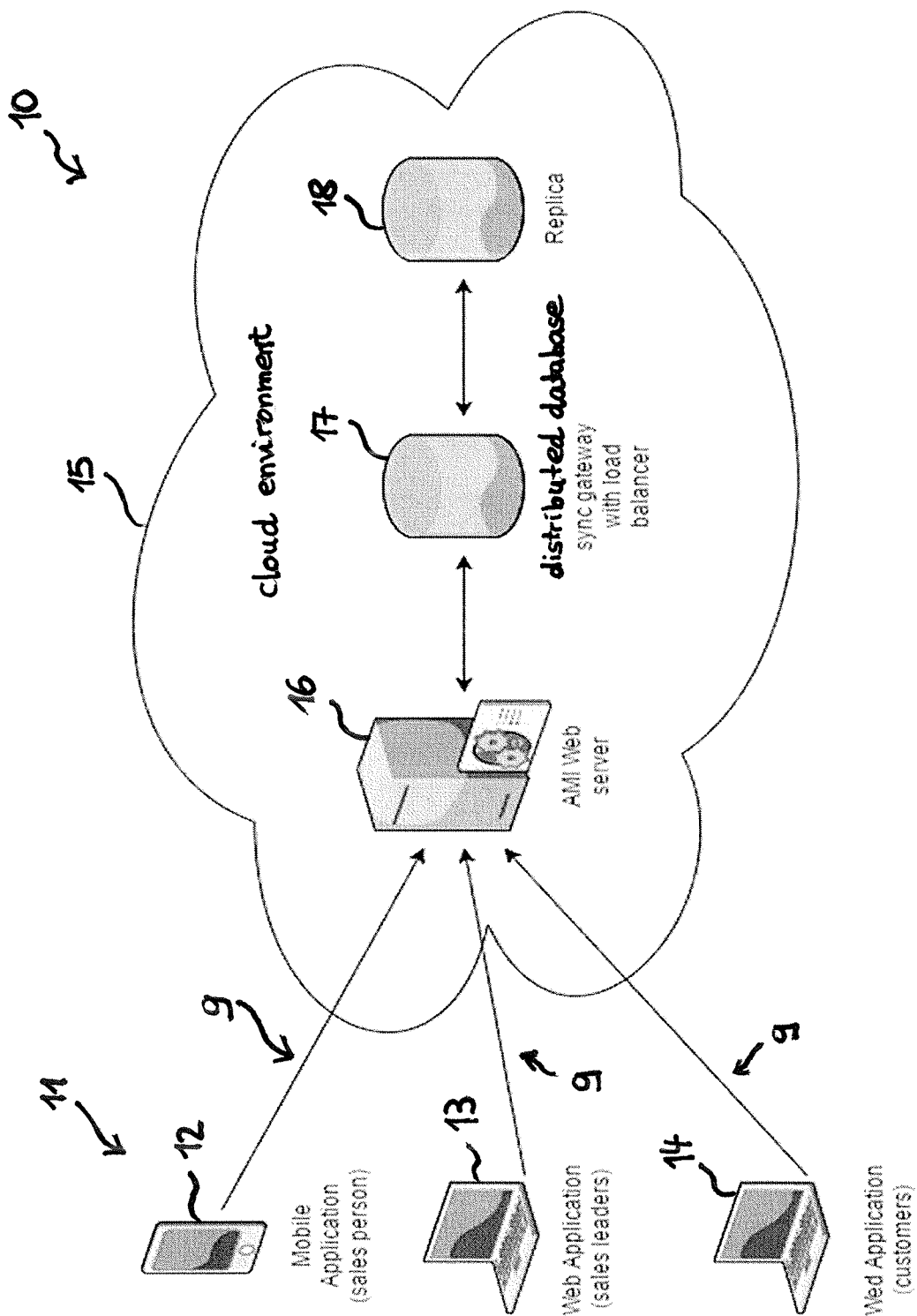

In a first step of the pre-call phase, the sales person manages the customer profiles, wherein the managing comprises at least the retrieval of customer profiles. The first step comprises retrieval of data from a master list and, if applicable, an update of the master list. In a next step, the sales person uses the information of the customer profiles to schedule customer calls.

This step may also comprise the use of an automated procedure which assists the sales person in generating a schedule of customer calls. An input to the automated procedure may comprise, by way of example, a past data transfer or order history, or past call schedules, or past records of a customer. An output may include, among others, a recommended schedule, recommended products or samples. Furthermore, the automated procedure comprises a means for generating a graphical display for output on a screen or display.

In a further step, the sales person prepares demos or tag products. This step may comprise the retrieval of data from the master list and, if applicable, an update of the master list. This step may also comprise the use of an automated procedure which assists the sales person in providing the demo or the tag products. For example, the demo can comprise preparing a computer-generated layout of an interior design or pre-selecting product samples. In a next step,

```
USER LOGGED-IN
GET USER ROLE
GET DYNAMIC WORKFLOW DATA in USER ROLE
STATIC WORKFLOW DATA = [FOLLOW UP, GALLERY, COMPETITOR, IN-
VENTORY, QUESTIONNAIRE, SUMMARY]
DO Loop in DYNAMIC WORKFLOW DATA
    DO IF DYNAMIC WORKFLOW DATA FIELD ACTIVE is EQUAL TO TRUE
        DO IF DYNAMIC WORKFLOW DATA EQUAL TO STATIC WORK-
FLOW DATA
            SHOW STATIC WORKFLOW VIEW
        END IF
        DO ELSE
            HIDE STATIC WORKFLOW VIEW
        END ELSE
    END IF
END LOOP
```

The sales execution system works in three main modes, based on the call process, a pre-call mode, an in-call mode and a post-call mode. Furthermore, there are two call-types: a scheduled call, which is a pre-arranged call with the customer on a specified date and time, and an ad-hoc call, which is a call or a visit to the customer without prior arrangements, upon customer request. Alternatively, the ad-hoc call can also be initiated by the sales person, for the sales person prepares product samples. Again, this step may comprise the use of an automated procedure which assists the sales person in generating the product samples.

The samples in this context refer to physical samples, and not to a mere screen display or a data representation of products. Furthermore, product images or demo videos explaining a usage of the product may also be generated and shown in the product gallery or emailed to the customer. A customer may request a free sample. Preferentially, the sample is only delivered when the salesperson visits the customer for the next time.

In a first step of an in-call phase, the sales person finds the relevant (next) customer with the aid of an automated procedure. In a next step, the sales person obtains a product feedback from the customer. In a next step, the sales person updates the customer information, based on the product feedback. The customer verifies the customer information and the salesperson updates the customer information, if it is inaccurate. The product feedback will then be used and aggregated to give a product rating for products in the database.

In a further step, the sales person updates a competitor information. The execution of this step depends on whether the customer is currently using a competitor product and supplies information about the competitor product. In this case, the salesperson updates the competitor information. The request for competitor information may be optional based on AMI settings or the workflow procedure set by the client company.

In a further step, the sales person presents a demo of one or more promotional products to the customer and, in a further step, the sales person presents a demo of recommended products to the customer. In a next step, the sales person provides product samples to the customer with the aid of an automated procedure. If the customer intends to buy products, the customer or the sales person places orders and, if desired, the sales person schedules a next call with the customer. After that, the call is ended.

In a post-call phase, the sales person uses the master list to review the past customer order history. On the basis of this information, the sales person updates the tagged products using an automated procedure and the master list. The tagged products may be based by the order history or on a tagging by the salesperson, among others. In a next step, the sales person determines a follow-up action using an automated procedure. In a further step, the sales person uses the master list to review his or her own personal performance reports.

The workflow during a customer call, in which the sales execution system is used as a customer relationship management tool, can also be summarized as follows. In a pre-call phase, the sales leader manages the customer data using the administration management interface (AMI), the sales team data and the sales team management functions, and assigns the customer to a sales team. The sales representative or sales person manages the customer information on-the-go using a mobile device, the customer information and customer management functions. Among other, the sales representative inputs contact details and updates existing record or adds new records.

During an in-call phase, the sales representative navigates to a customer page of the sales execution system using his mobile device and a user tracking functionality. The sales person can use a GPS tracking or a tracking via another navigation system to navigate to the customer page.

The navigation system tracks the salesperson's current location and presents a list of nearby customers for the salesperson to choose from. The salesperson may then select a customer that he or she is about to visit. The navigation feature can be useful for a client company who wants to track their salesperson's location to verify that they actually are visiting the customers.

The following pseudo-code illustrates such a tracking using a satellite navigation and a map service or stored maps.

```
USE GOOGLE MAP API
GET CUSTOMERS
DO LOOP in CUSTOMERS
    GET CUSTOMER LOCATION
    APPLY CUSTOMERS LOCATION in GOOGLE MAP API
    SHOW CUSTOMER PIN in GOOGLE MAP USING its LOCATION
    DO IF PIN TAPPED
        SHOW INFORMATION
        SET BUTTON (ROUTE)
        DO IF BUTTON TAPPED
            GET ROUTES USING CURRENT LOCATION to CUSTOMER LOCATION
            DESTINATION = GET USER CURRENT ADDRESS
            PICK UP POINT = GET CUSTOMER ADDRESS
            DO LOOP in ROUTES
                SHOW ROUTE
                SHOW DISTANCE
                SET COLOR RED FOR TRAFFIC ROUTE
            END LOOP
        END IF
    END IF
END LOOP
DO IF CUSTOMERS PIN is in SAME LOCATION
    APPLY GOOGLE MAP CLUSTER
    DO IF CLUSTER TAPPED
        ZOOM IN MAP
        SHOW CUSTOMER PIN in its LOCATION
    END IF
END IF
SAVE DESTINATION AND PICKUP POINT IN TRANSACTION TABLE
```

The sales representative obtains a customer feedback, such as a product feedback and enters the feedback into his mobile device. The software application on the mobile device provides a product feedback prompt upon starting the call to the customer.

The sales representative makes customer specific recommendations using the mobile device, customer management and analytics functions. Furthermore, the sales representative tags an item group according to previous purchases and recommends relevant products to the customer. The application displays the tagged products under the recommended products.

During a post-call phase, the sales representative follows up with the customer using, among others, the mobile device, the product gallery and the product catalogue. The sales person receives notifications on promotions and other customer or product related information. Furthermore, the sales person places orders for the customer on ad-hoc basis. In other words, the salesperson is visiting the customer without prior scheduling.

According to one example of an ad-hoc order placement, the customer calls up the salesperson to request if the salesperson could drop by. The salesperson agrees and visits the customer. This type of customer call is not scheduled and is considered as an "ad-hoc" call. According to a second example, the salesperson calls up the customer to request for a visit. If the customer agrees, the salesperson visits the customer. The corresponding data, such as the purchase orders, is considered as part of an "ad-hoc" call. Scheduled calls as well as ad-hoc calls may optionally be used by the client company for a sales team analysis.

By way of example, the "products" can refer to the products of the company available through the sales execution system, i.e. physical items such as equipment, hardware, merchandise that can be delivered to a customer. Or they may also refer to softcopy documents, services or vouchers for goods or services.

Figure 2:
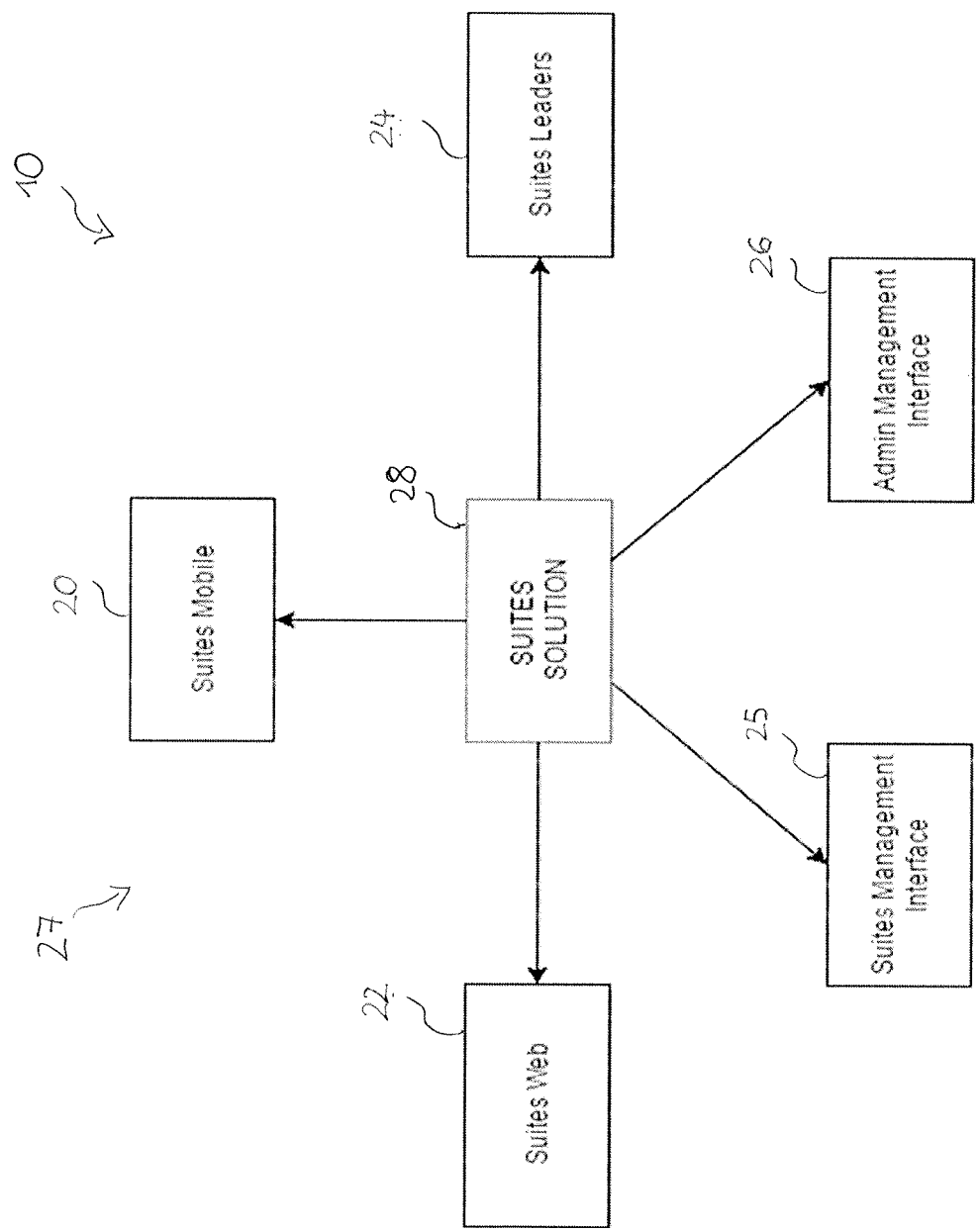
Figure 4:
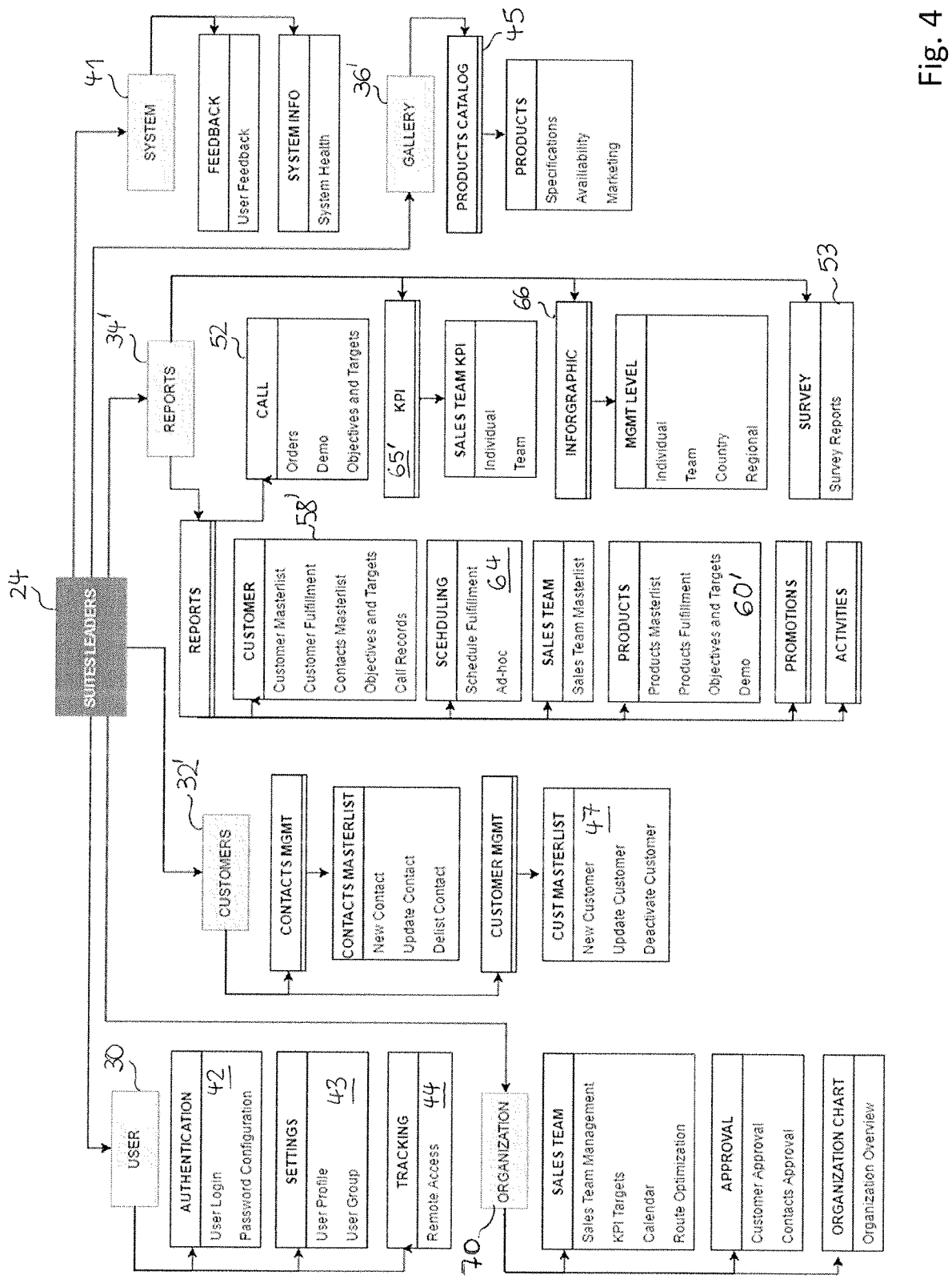
Figure 5:
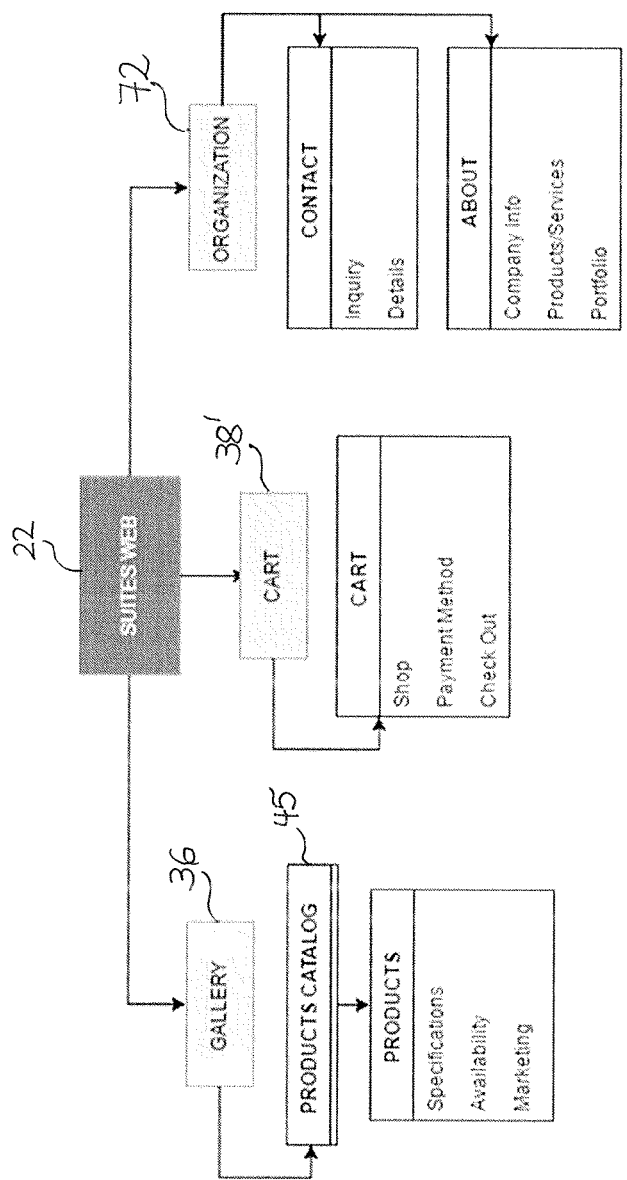
Figure 12:
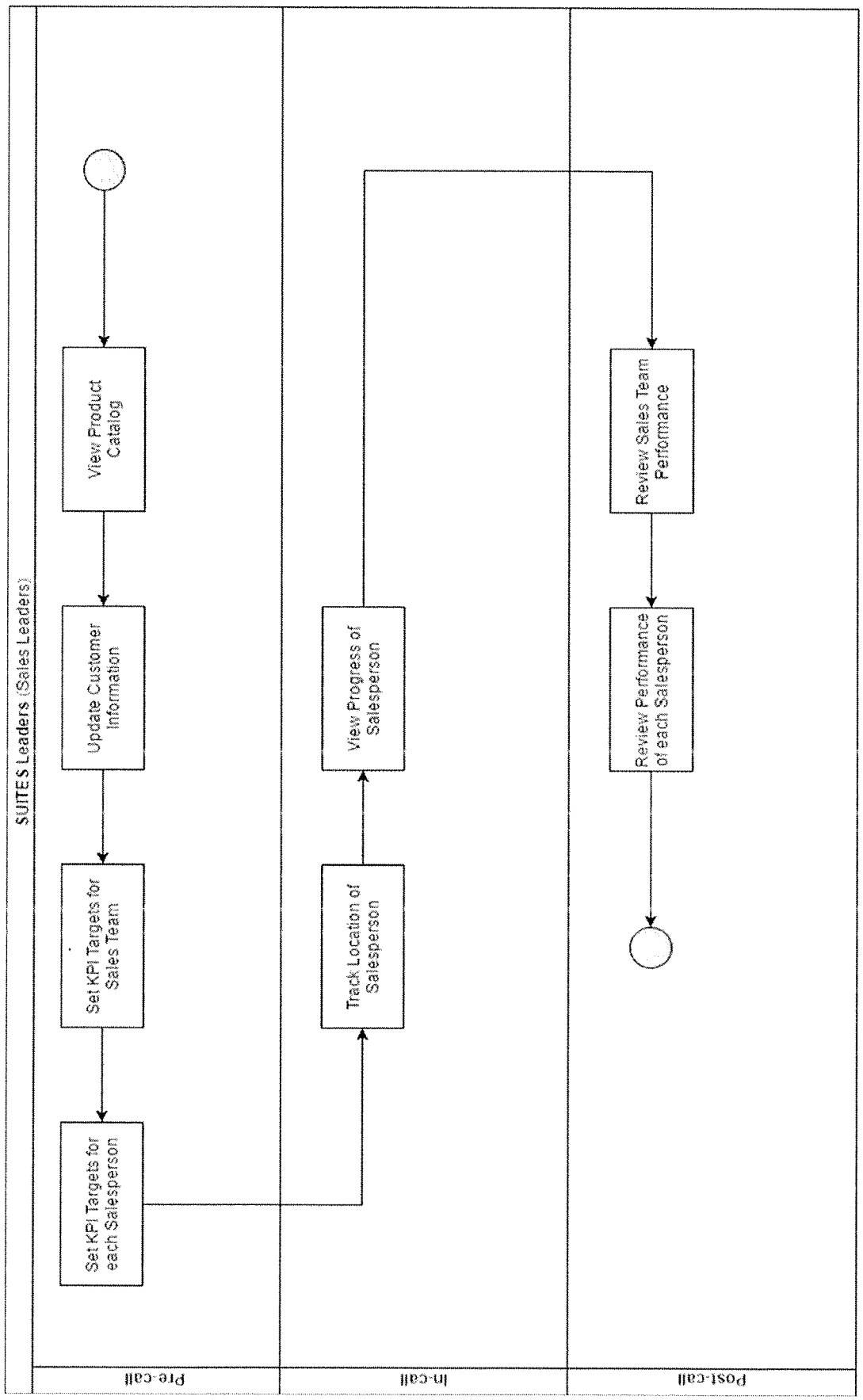

FIG. 12 shows a workflow of the sales leader module of FIG. 2 and FIG. 4 as it is carried out by a sales leader.

In a first step of a pre-call phase, the sales leader inspects a product catalogue. In a further step, the sales leader updates the customer information. In a further step, KPI targets for the sales team are set and, in a further step, KPI targets for each individual sales person are set.

Primarily, sales leaders are allowed to access data captured during the in-call phase of their respective sales team. Furthermore, the sales leaders can set KPIs or objectives which may be shown on the mobile application of their sales team. A sales leader monitors a salesperson's progress after the call, for example by way of inspecting a summary of completed calls and order data. Furthermore, they may control the approval of new customers, the offer of discounts, a maximum time for follow-up, and to provide a KPI breakdown using the administration management interface module.

In a first step of an in-call phase, the sales leader tracks the location of the sales person and, in a further step, inspects the progress of the sales person.

In a first step of a post-call phase, the sales leader reviews the performance of the sales team or sales teams associated to him or her and, in a next step, reviews the performance of each sales person in the sales team or in the sales teams. In one specific case example, the sales leader inspects the progress of the salesperson while the salesperson is in-call with a customer, if an internet connection is available and the salesperson's mobile device is connected to it.

In the process, summary charts may be presented to the sales leader through the web application for a performance review. The sales leader may choose to set KPIs for their team in the next sales season based on their current performance.

A work flow in which the sales execution system is used as a sales process management tool can also be summarized as follows.

In a pre-call phase, a marketing person manages a product information using the administration management interface, the product gallery 36 and the product catalogue management module of the administration management interface 26. Furthermore, the marketing person retrieves product specifications, product availability and product promotions and updates the product catalogue in real time.

A sales leader manages a sales representative workflow using the administration management interface, customer information and accesses the call workflow management using the customer related functions 32" of the administration management interface 26. The access to the sales call workflow management refers to a changing of the settings in the AMI to activate or to deactivate different sections of a call based on client company regulations or established practices.

By way of example, the sales workflow may include: a start of the call, receiving product feedback, performing a pantry check, placing of orders, preparation of a call summary and the end of the call.

The sales leader switches modules on or off as required. Depending on the access permissions set by the client company, the activation or deactivation of the modules may also be performed by an administrator. The sales representative manages customer call schedules using the mobile device module and the calendar module using the calendar functions 40 of the mobile device 20. Furthermore, the sales leader receives notifications for scheduled calls. The salesperson manages his or her calls and is notified of scheduled calls on his mobile application.

During an in-call phase the sales representative manages the call processes using the mobile device module, the user information and the tracking functionality using the tracking functions 56 of the mobile device module 20. Furthermore, the sales representative navigates to the customer page with GPS.

The sales representative manages the call process using the mobile device module, the product gallery 36 of the mobile device module 20 and the product catalogue. Also, the sales representative shares the updated product catalogue with the customers.

In a post-call phase, the customer uses the web module, the cart functions 38' of the web module 22 and a shop functionality to send a request to top up the product and to notify the sales representative automatically.

Optionally, competitor information can be included as part of the abovementioned workflow. In one instance, a client company decides to record competitor information as part of their market analysis project and includes the competitor information as a mandatory field, which the salesperson needs to cover by asking the customer during a call.

Figure 6:
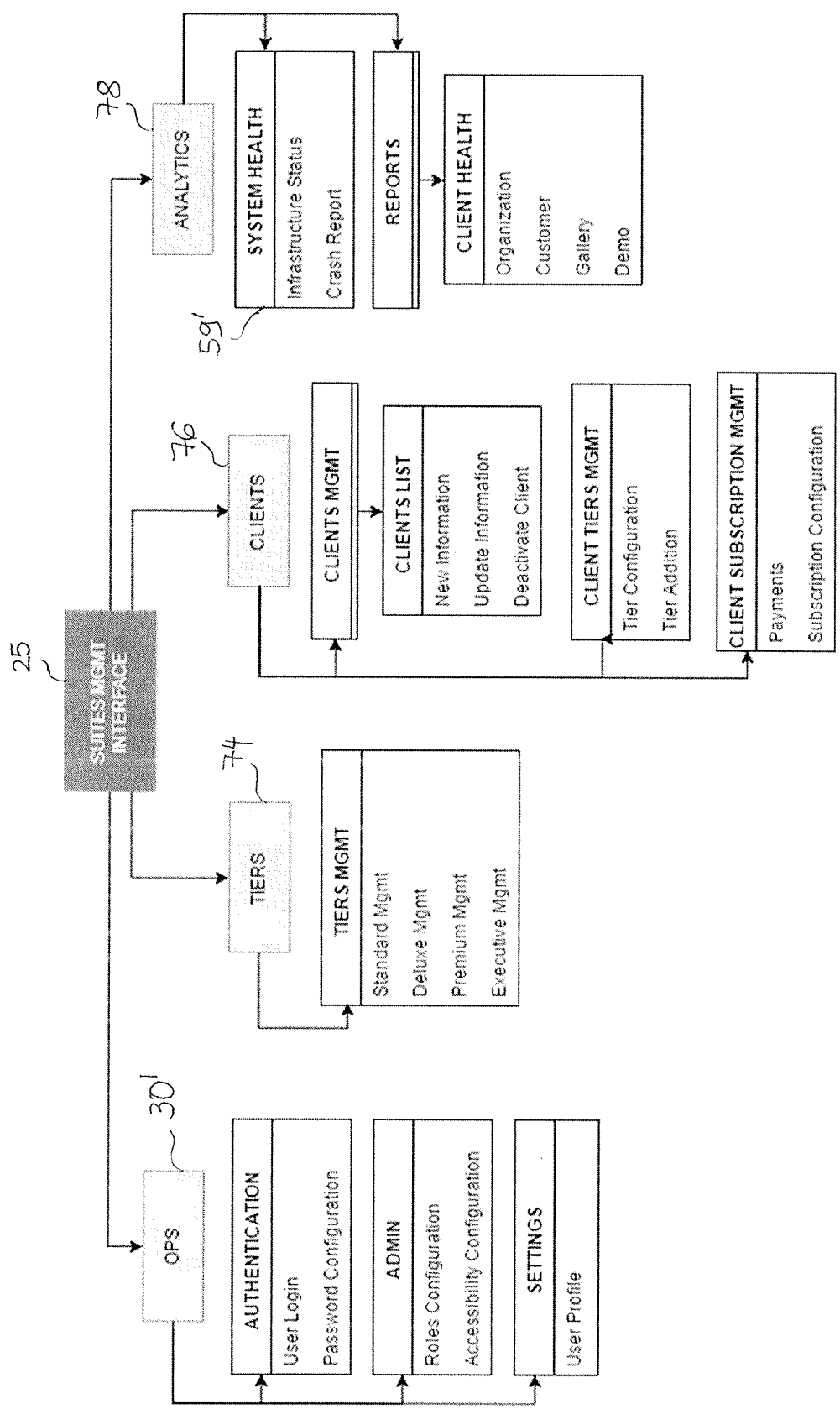
Figure 7:
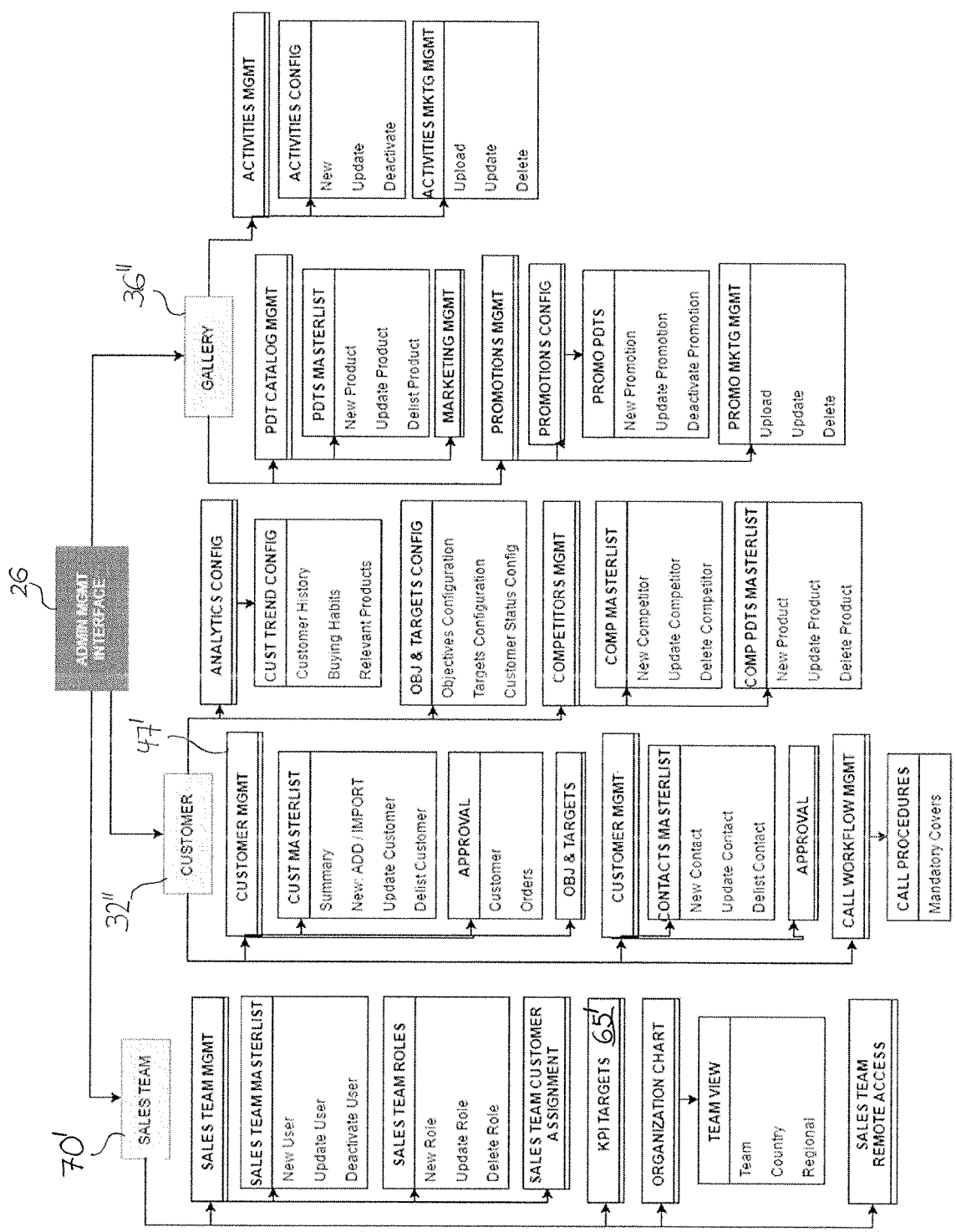
Figure 8:
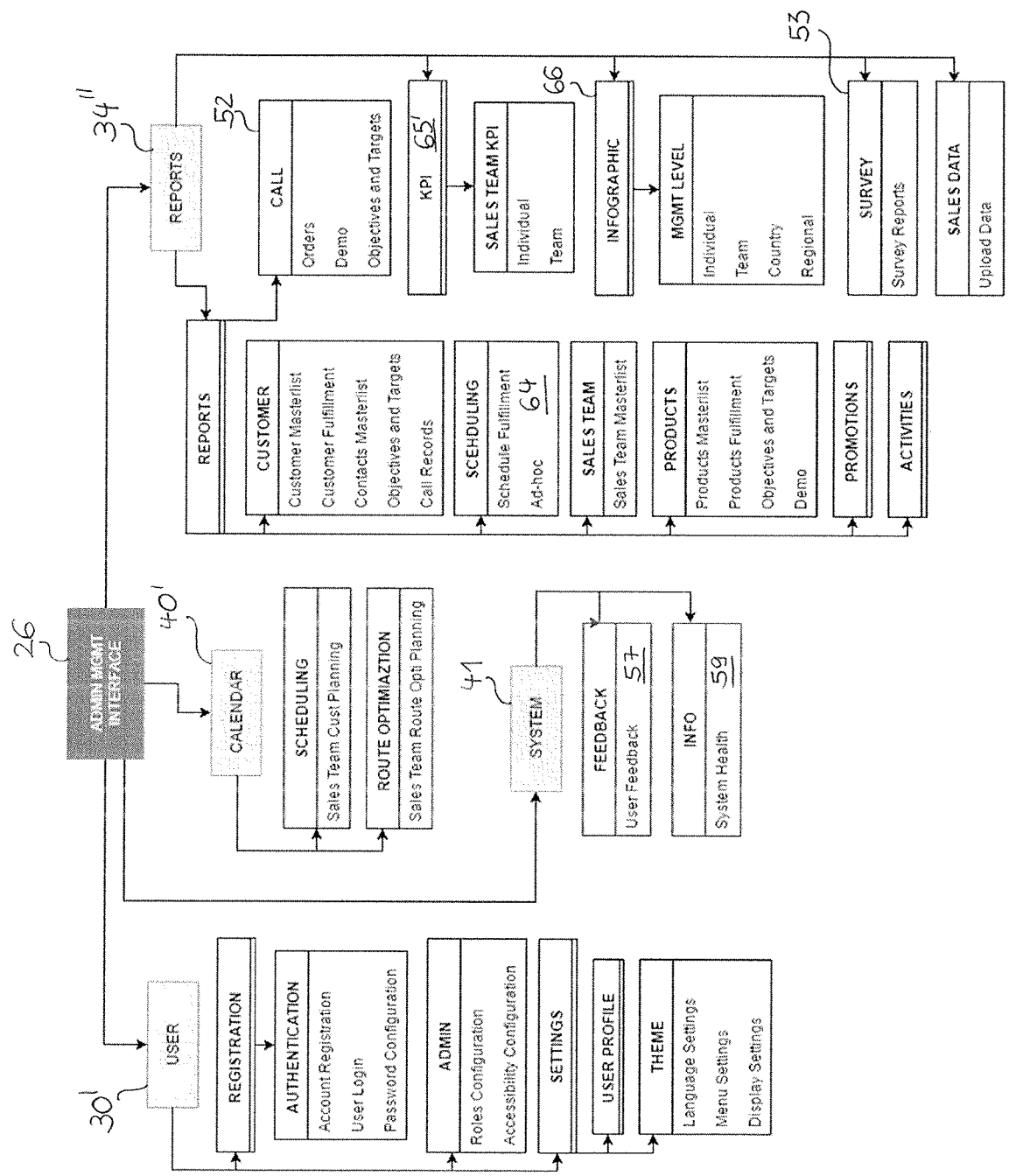
Figure 9:
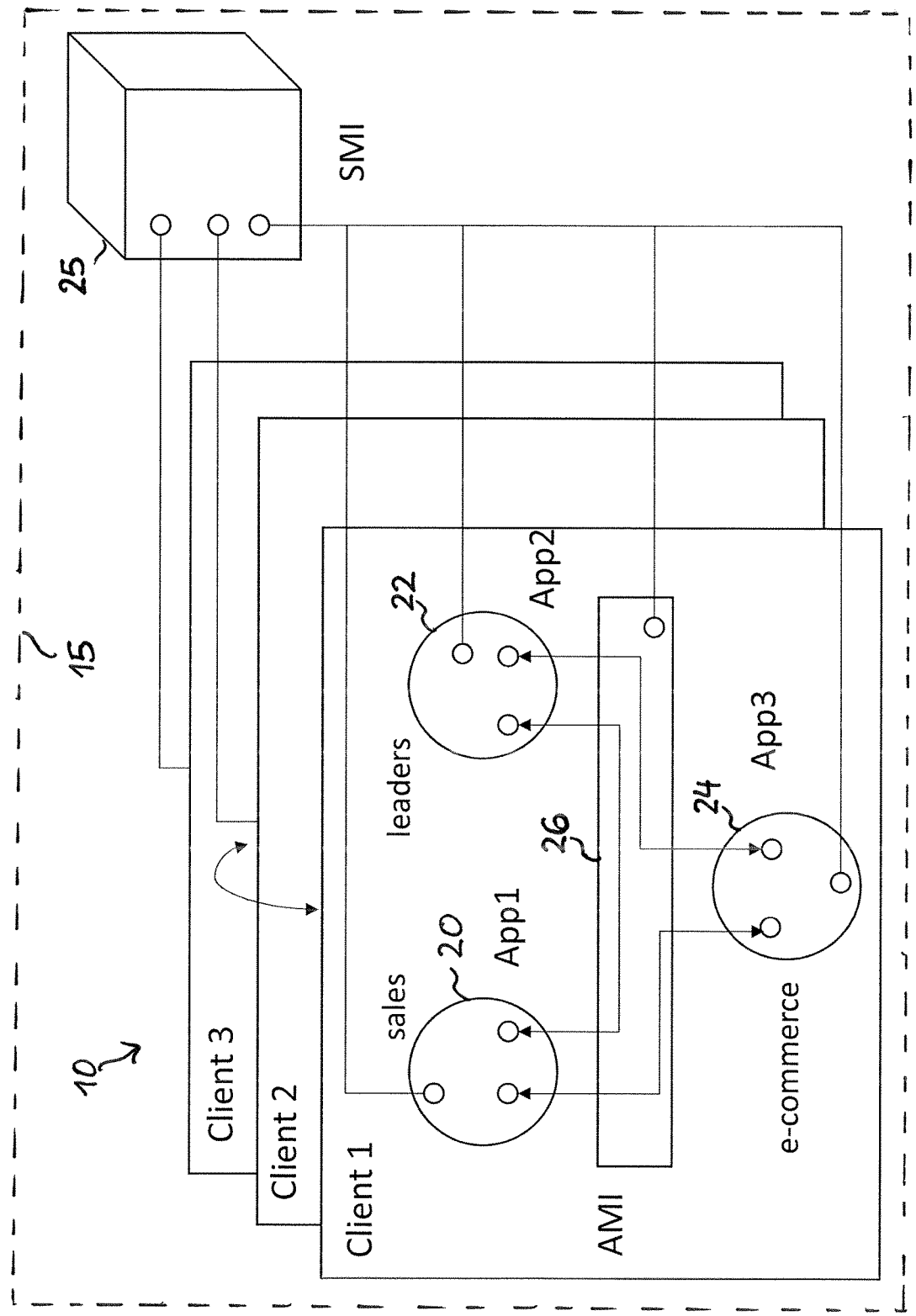
Figure 10:
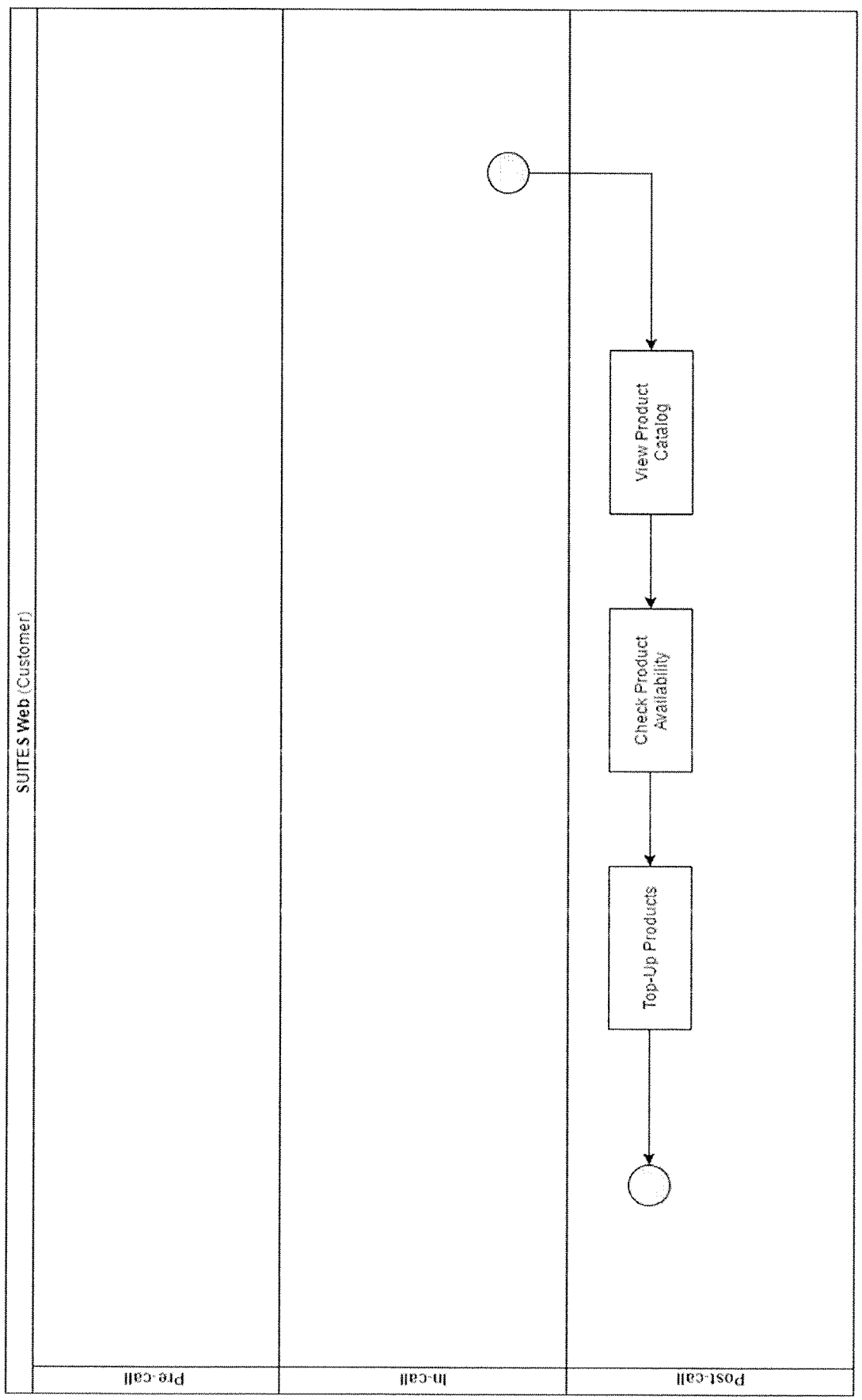
FIG. 10 shows a workflow of the web module of FIG. 2 as it is carried out by a customer or client. After a prior call, the client or customer inspects a product catalogue in a first step, checks a product availability in a further step, and tops up products in a further step.
Figure 11:
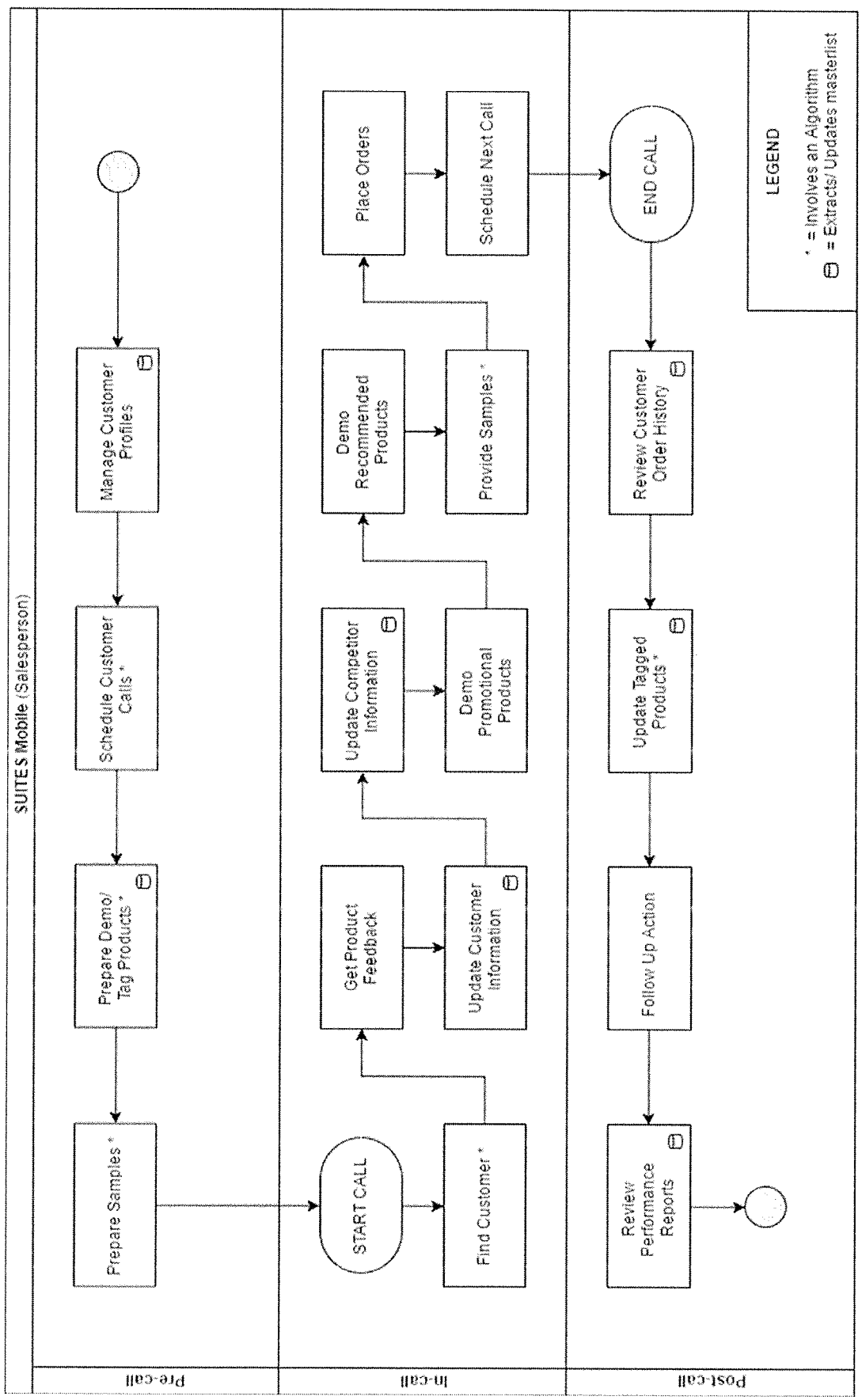
FIG. 11 shows a workflow of the mobile device module of FIG. 2 as it is carried out by a sales person.
Figure 13:
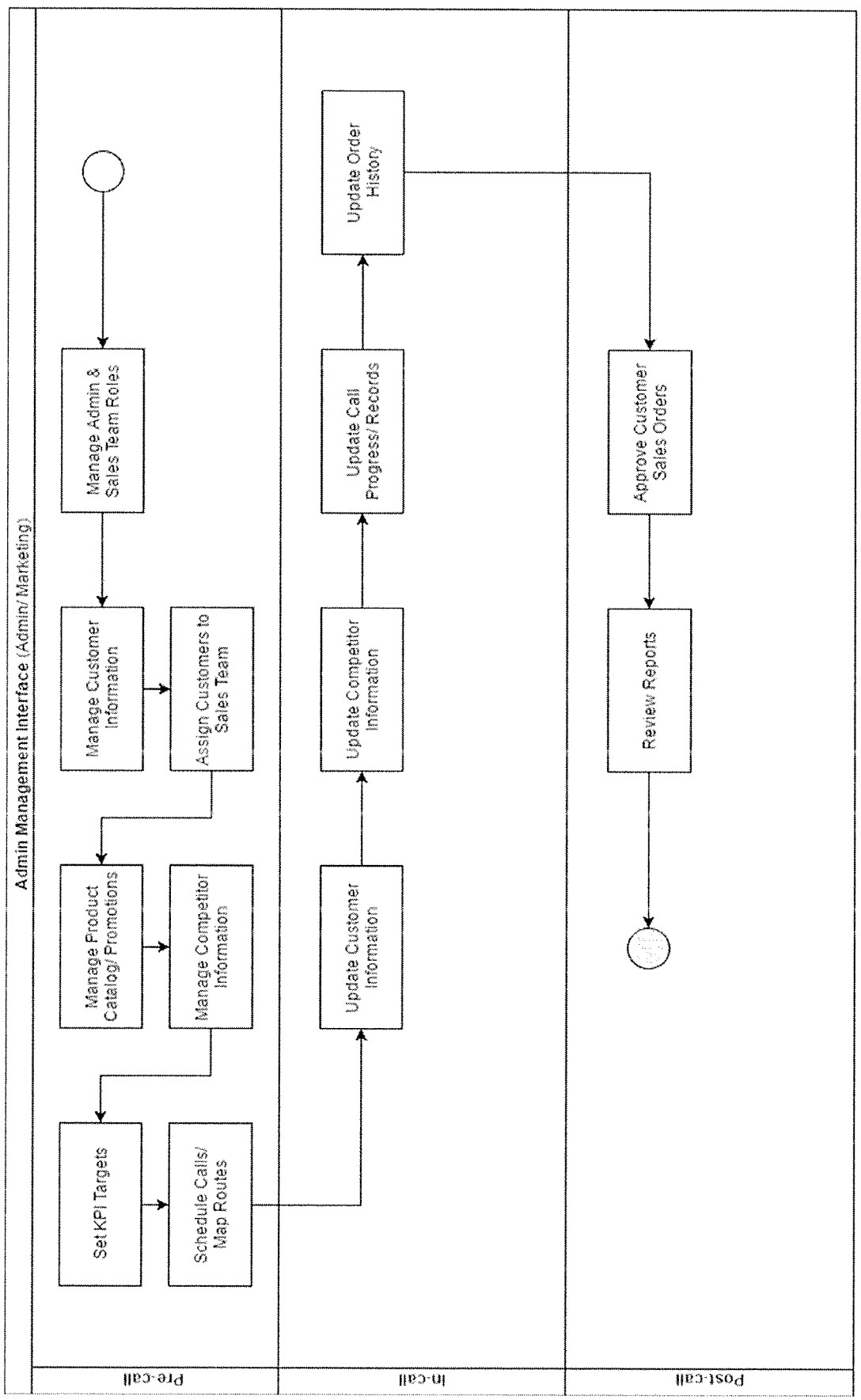

FIG. 13 shows a workflow of the administration management interface module of FIG. 6 as it is carried out by an administrator or a marketing person.

In a first step of a pre-call phase, the responsible person manages the roles of the administration team and the sales team and, in a further step, manages the customer information. In a further step, the customer or the customers are assigned to a sales team which is responsible for them and, in a further step, the product catalogue and/or the product promotions are managed.

In a further step, the competitor information is managed and, in a further step, KPI targets are set. In a last step of the pre-call phase, the calls to the customers are scheduled and the routes are identified using a geographical information system, such as a map application. This step of scheduling the customer calls may also be performed by the salesperson.

In a first step of an in-call phase, the responsible person updates a customer information, and, in a further step, updates the competitor information. Then, during or after the call, the responsible person updates call progress records and, in a further step, updates an order history.

In one instance, the information is obtained solely from the salesperson's mobile device module and is uploaded onto the cloud database. The AMI then retrieves this information. In another instance, the information is manually keyed in on a terminal and transferred to the AMI, and is centrally managed there. For example, any new customers are added using the AMI.

In a first step of a post-call phase, the responsible person approves the customer sales orders and, in a further step, reviews the call progress reports.

A workflow of the sales execution system in which it is used as a sale team management tool can also be summarized as follows.

During a pre-call phase, a sales leader sets targets and objectives with respect to sales leaders, admin roles, the organization of the sales leader and key performance indicators using the report generating functionality 34' of the sales leader module 24. Preferentially, the sales leader sets the KPI for the salesperson periodically, for example in monthly intervals. Furthermore, a sales representative sets personal targets and objectives using the mobile device module, the customer information and objects and stored objects and targets using the target definition functions 54 and customer management functions 32 in the mobile device module 20. The targets and objectives may include, for example, the number of customer visits per month, or the sales amount.

Figure 3:
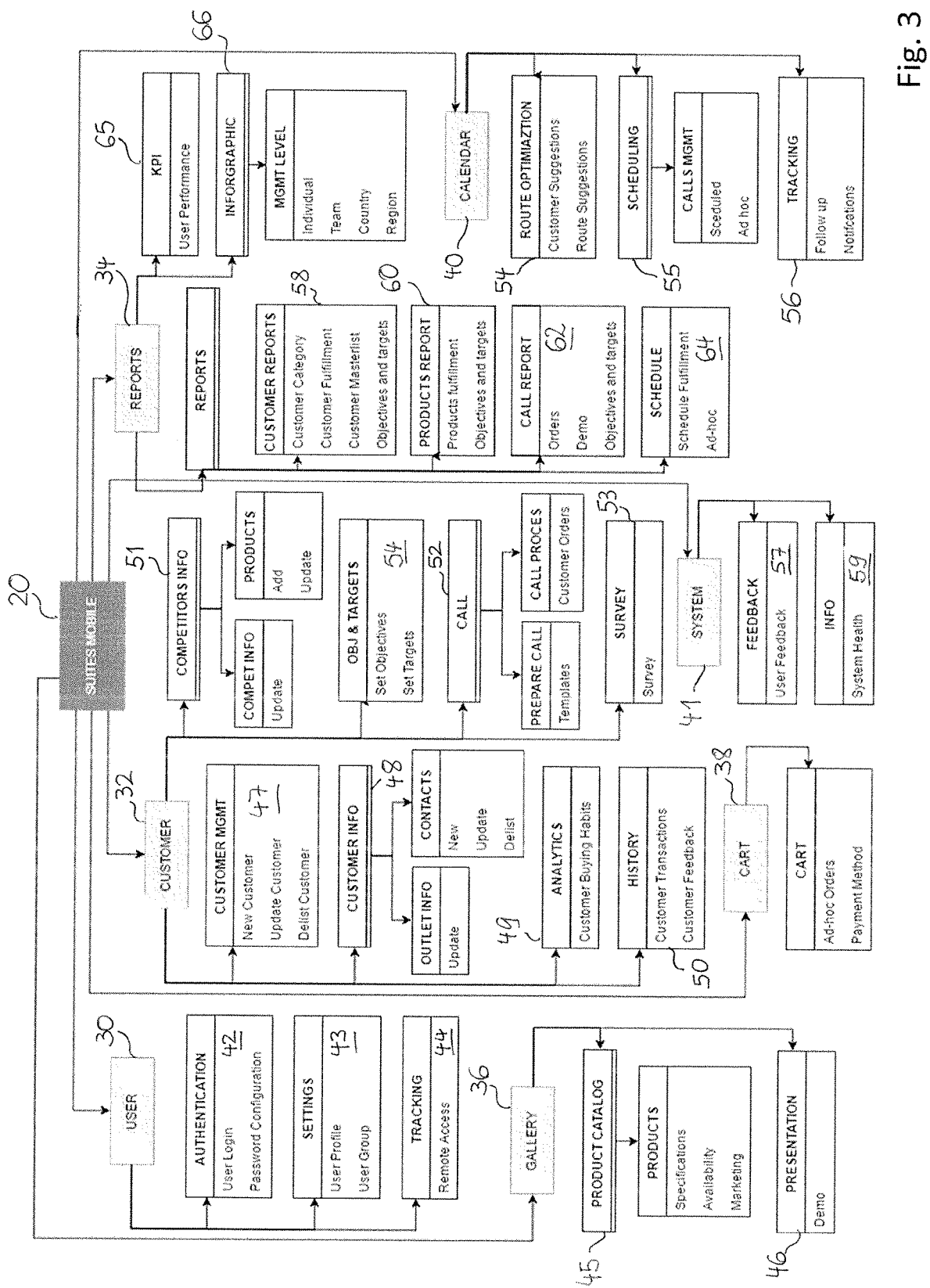

In a post-call phase, a sales leader measures a team performance using the report generating function 34' of the sales leader module 24 of FIG. 4. For selected KPI fields, the reports may be auto-generated without requiring further user input. Likewise, the sales representative uses the report generating function 34 of the mobile device module 20 of FIG. 3 for self-assessment and to measure his or her own performance.

Figure 14:
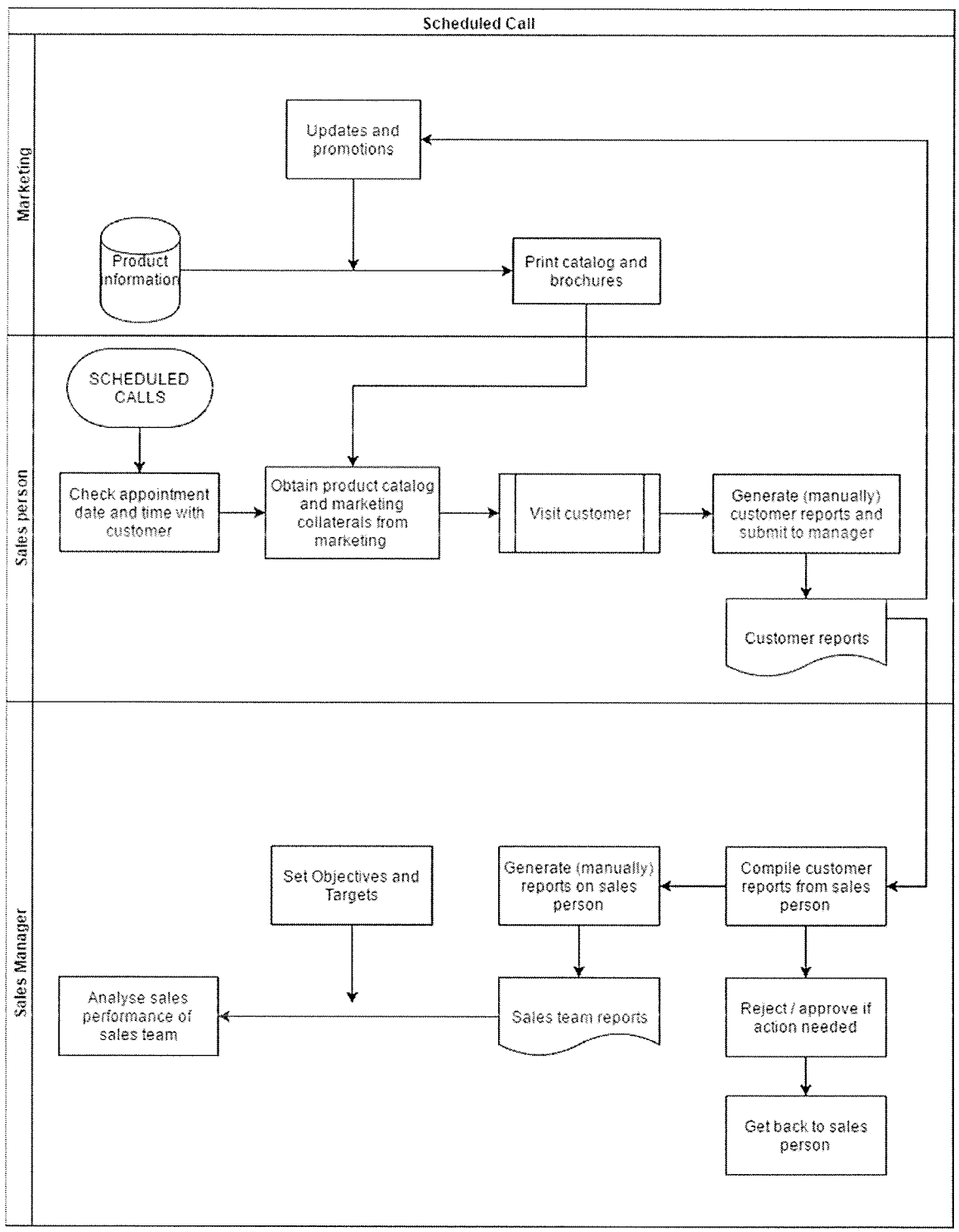

FIG. 14 shows a first workflow of a scheduled call, as it is carried out by a marketing person, a sales person and a sales manager. In a first step of the marketing person, updates and promotions are retrieved. In a further step, a product information and the information about updates and promotions are used to print a catalogue and brochures and/or to provide softcopies of those documents.

In a first step of the sales person, the scheduled calls are retrieved and the appointment date and time with the customer is confirmed in a communication with the customer. In a next step, the catalogue and brochures that were generated in the previous step by the marketing person are used to obtain a product catalogue and marketing collaterals, such as brochures or flyers including products on promotion. In a next step, the customer is visited. After the visit or call, customer reports are generated and submitted to a manual in a further step.

In a first step of the sales manager, the customer reports that were generated in the previous step by the sales person are compiled, and in a further step, the reports on one or more sales persons are generated. The generated reports are used in the first step of the marketing person to generate updates and promotions that are tailored to the customer.

In a further step, the sales team reports are matched or compared against objectives and targets set by the sales leader.

The sales team reports are then modified and the modified sales team reports are then used in a further step to analyse the sales performance of a sales team.

In a further step, the sales manager approves or rejects the customer reports from the sales person, which were compiled in the previous step, if required. For example, the customer reports may be classified as requiring that a further action or the step may be executed or not according to company guidelines. In a further step, the sales manager gets into contact with the sales person in reaction to the rejection or approval of the customer reports.

Figure 15:
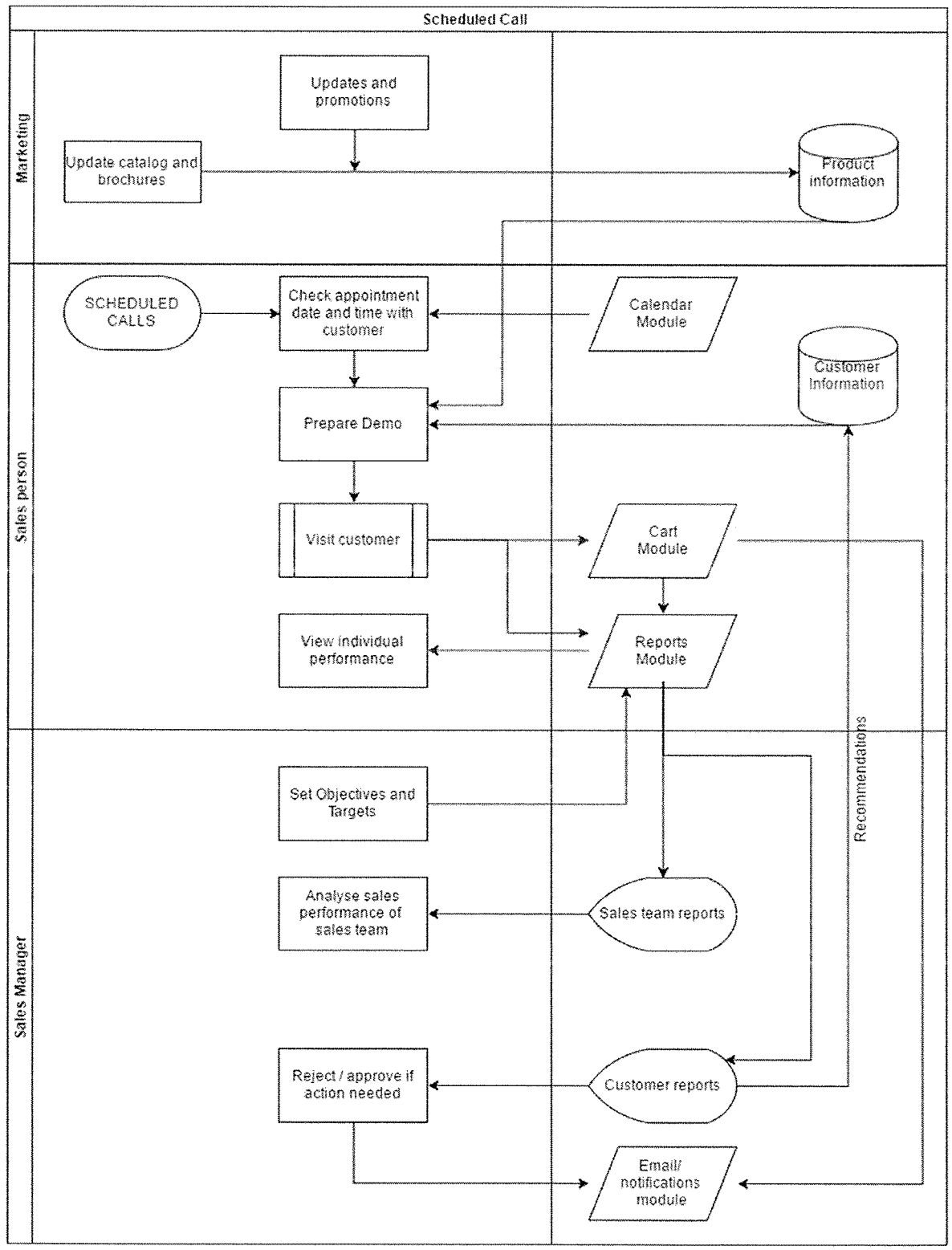

FIG. 15 shows a second workflow of a scheduled call. The view of FIG. 15 is vertically subdivided in a left area, which depicts steps that require human interaction and a right area, which depicts steps that are carried out by the sales execution system.

According to this type of scheduled call, a marketing person updates the catalogue and brochures. Next, the marketing person is using the updated catalogue and brochures as well as information about updates and promotions to update a product information in a database.

In a first step of the sales person, scheduled calls are used to check or confirm an appointment date and time with a customer using the information stored by a calendar module. In a further step, the product information, which was updated by the marketing person in the previous step, is used to prepare a product demo. In a further step, the demo is used during a visit to the customer or a communication with the customer.

For example, a demo may be provided a video which describes how to use an ingredient to cook a dish. Or it may be provided by an actual live demo of a sales person using the ingredients for cooking.

During or after the contact with the customer, a cart module is used to update a customer product cart. This information and further information obtained during the contact with the customer in the previous step is used, in a further step, to update reports with the help of a reports module. Furthermore, information from the cart module is used to generate email and/or notifications, such as order confirmations.

In a further step, the sales person retrieves data using the functionality of the reports module to view the individual performance of the sales person. Thereby, a self-check function is provided.

The sales manager is using functionality of the reports module to set objectives and targets. In a further step, the sales manager uses functionality of the reports module to generate sales team reports and, in a further step, to analyse the sales performance of the sales team. Furthermore, the sales manager is using functionality of the reports module to generate customer reports. If, according to a predetermined criterium, an action of the sales manager is required, the sales manager rejects or approves the customer reports and uses the functionality of an e-mail and notifications module to generate corresponding e-mails or notifications. The information of the customer reports is also used to generate recommendations relating to the customer, which are stored together with the customer information.

Figure 16:
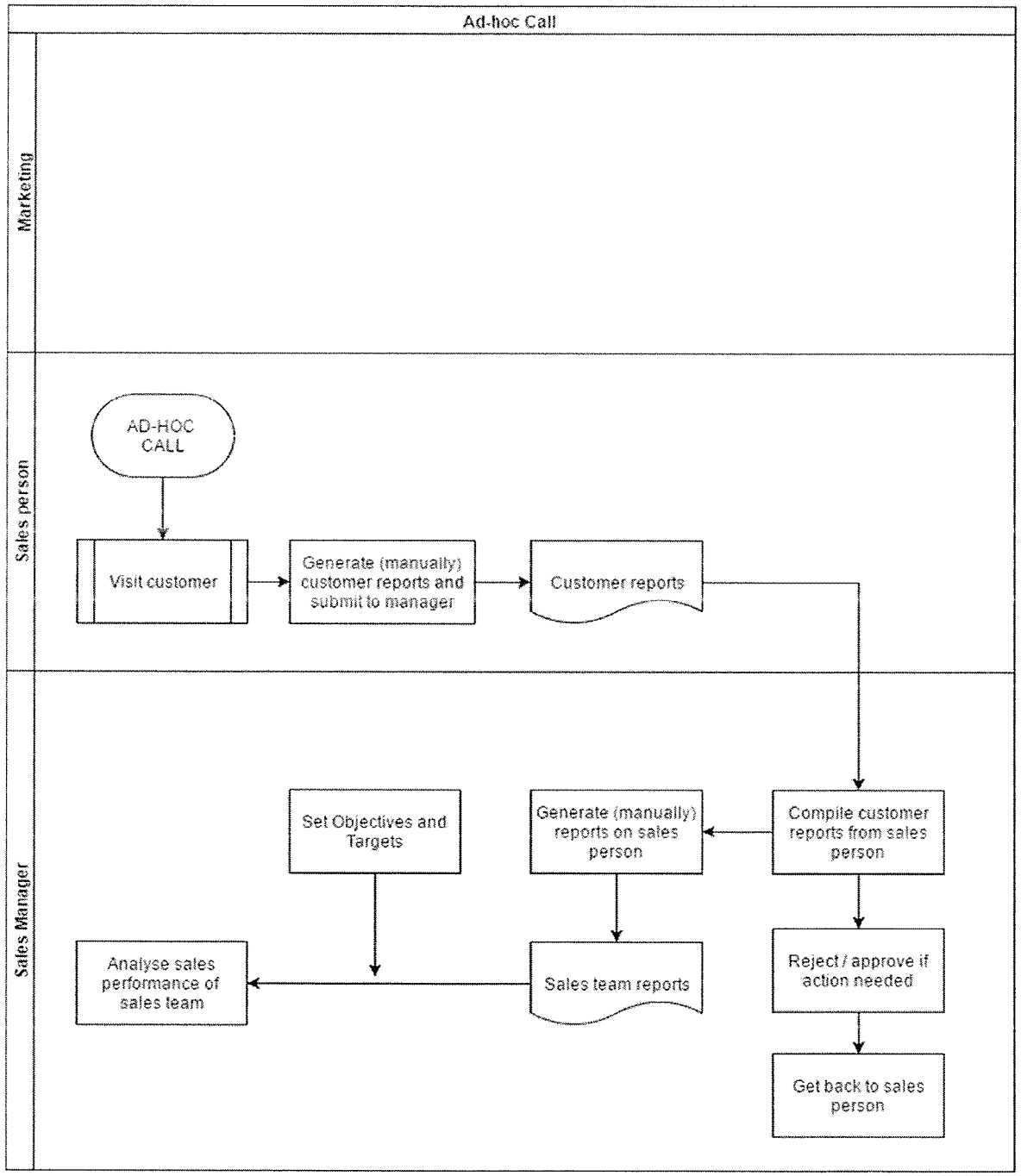

FIG. 16 shows a first workflow of an ad hoc call, as it is carried out by a sales person and a sales manager. In a first step of the sales person, the sales person visits a customer in response to an ad-hoc call. In a further step, the sales person generates customer reports and submits those reports to a sales manager.

In a first step of the sales manager, the sales manager uses the customer reports which were generated by the sales person in the previous step to compile customer reports. In a further step, the compiled customer reports are used to generate a report on the sales person. In a further step, the sales manager uses the sales team reports and objectives and targets which are set by the sales manager or which have been set previously to analyse a sales performance of the sales team.

Furthermore, the sales manager uses the compiled customer reports from the sales person to reject or approve the customer report in case any action is needed according to a predetermined criterium. In a further step, the sales manager contacts the sales person with respect to the approved or rejected customer reports.

Figure 17:
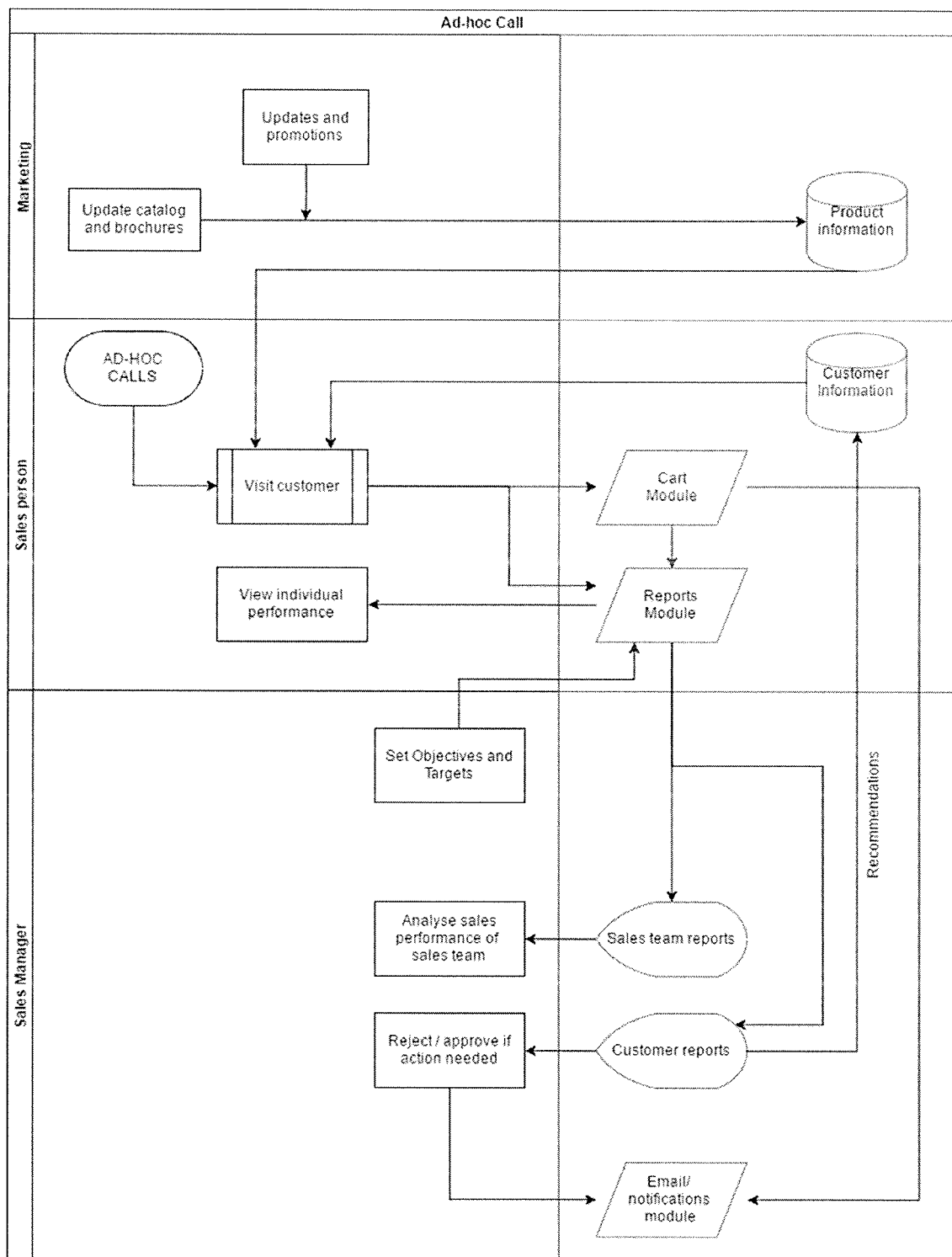

FIG. 17 shows a second workflow of an ad hoc call. The work flow of FIG. 17 is similar to the work flow of FIG. 15 for a scheduled call but differs in the steps taken by the sales person. Namely, the steps of checking an appointment date and time with the customer and of preparing a demo and the corresponding access to modules and data structures are not present in the ad-hoc call work flow of FIG. 17.

Namely, the sales person uses information from an ad-hoc call in a contact or visit to the customer. Furthermore, the sales person uses information obtained during the customer visit to process an order using the carts module and to generate a customer report using the reports module. Furthermore, the sales person uses the reports module to view the individual performance for self-assessment purposes.

Figure 18:
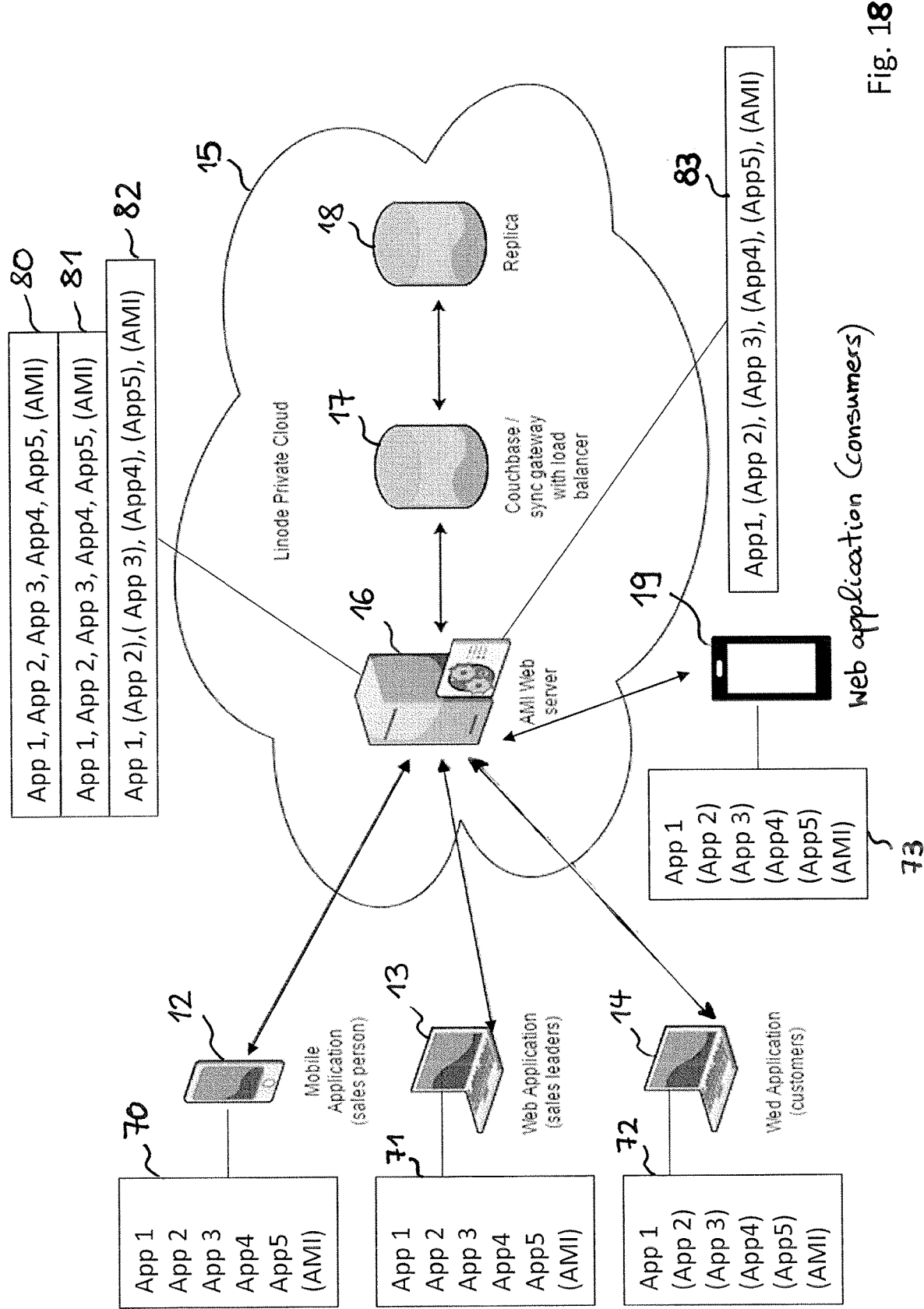

FIG. 18 shows the sales execution system, wherein the activated and deactivated modules are indicated. At the same time, FIG. 18 also illustrates a replication model that enables an offline usage of the sales execution system.

In addition to the mobile devices shown in FIG. 1, FIG. 18 shows a mobile device 19 with a consumer application. In the embodiment of FIG. 18 there are five applications and the administration management interface module, which are replicated on the mobile devices 12, 13, 14 and 19. The applications are respectively stored in a memory area 70 of the mobile phone 12, in a memory 71 of the first laptop 13, in a memory 72 of the second laptop 14, and in a memory 73 of the second mobile phone 19 from where they can be loaded into a working memory of the respective devices 12, 13, 14, 19.

Furthermore, the information about the activation patterns is stored in the respective memories 70, 71, 72, 73. In the example of FIG. 18, an access to the AMI is deactivated on the mobile devices 12, 13, 14 and 19, which is symbolized by round brackets. Furthermore, an access to the second, third, fourth and fifth application is deactivated on the mobile devices 14 and 19.

Furthermore, FIG. 18 shows, by way of example, a first memory area 80, a second memory area 81, a third memory area 82 and a fourth memory area 83 of a working memory on the AMI web server 16. In the example of FIG. 18, the memory content of the memory areas 70, 71, 72, 73 is replicated in the memory areas of the working memory areas 80, 81, 82, 83. This need not be the case, however, as long as the relevant information is replicated on the AMI server. For example, the applications may be loaded into the working memory of the AMI server 16 when they are called for the first time. In other examples, several frontends use the same copy of an application or an application may run as a distributed application on multiple computers.

Furthermore, in one embodiment the consumer accesses the AMI server using an internet browser and without the need of downloading one or all of the applications.

Figure 19:
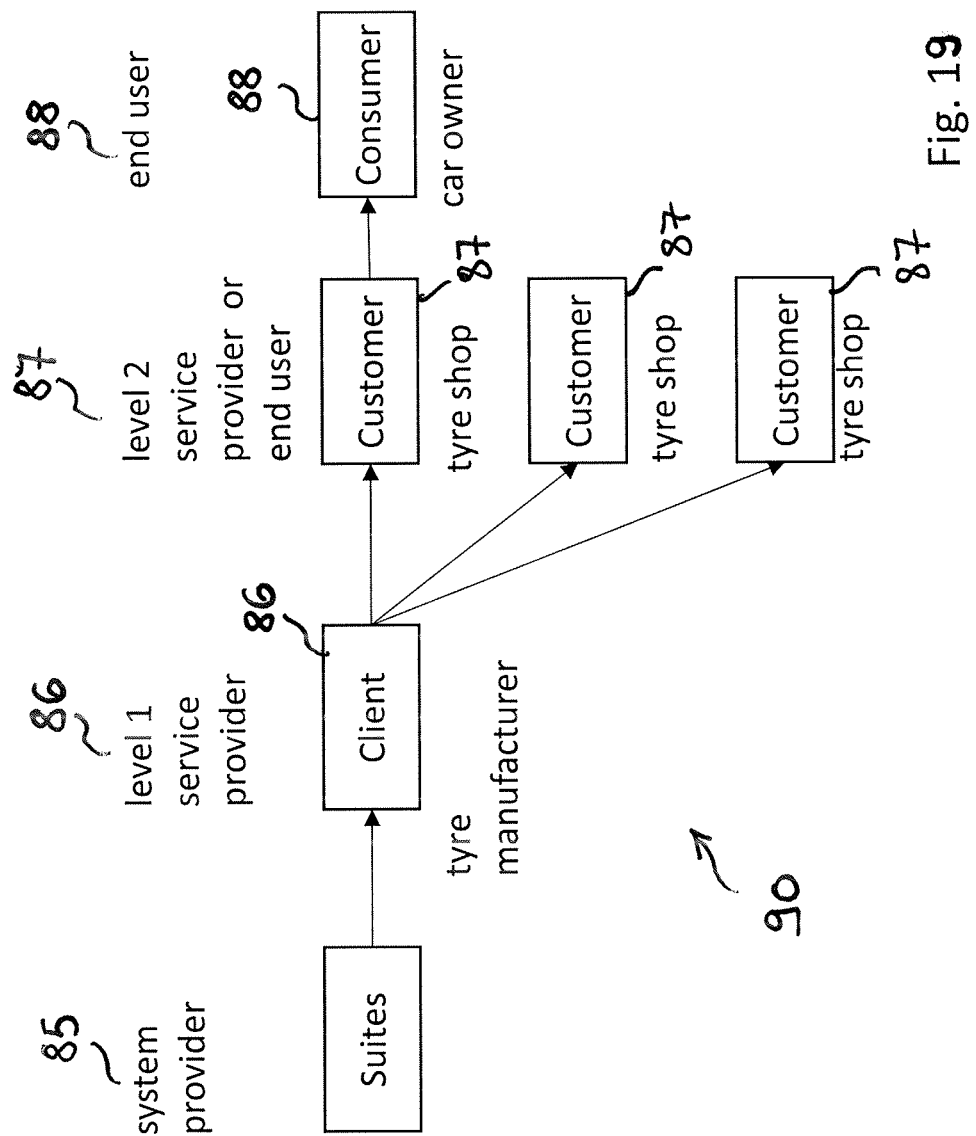

FIG. 19 shows a value chain of the sales execution system. The Suites solution provider 85 or system provider 85 provides the sales execution system 10 to a top-level service provider or client 86 against payment. The client 86 in turn provides the terminal devices of his customers 87 with the required software applications from the sales execution system 10, generally in exchange for a payment. The customers 87 may be end users, or when a further level is present, such as in the example of FIG. 19, they may be second level service providers.

When a further level is present in the value chain 90, then the customer 87 in turn provides his consumers 88 with a suitable interface for acquiring the goods or services. This interface may require the installation or download of software, such as a mobile phone app, or it may be provided as part of a web interface. According to another embodiment, the consumer 88 is not able to purchase goods by themselves but is required do purchase goods with the help of a sales person. In this case, no interface for buying goods is provided, but the consumer 88 may still be able to access certain information about current offers and the product catalogue.

In the example of FIG. 19, the client 86 is represented by a tyre manufacturer 86, the customers 87 are represented by licensed tyre shops of the tyre manufacturer 86 and the consumers 88 are represented by the car owners 88, which buy the tyres. In another example, the client is a fast food chain, the customers are franchise takers and the consumers are the customers of the fast food shops.

Figure 21:
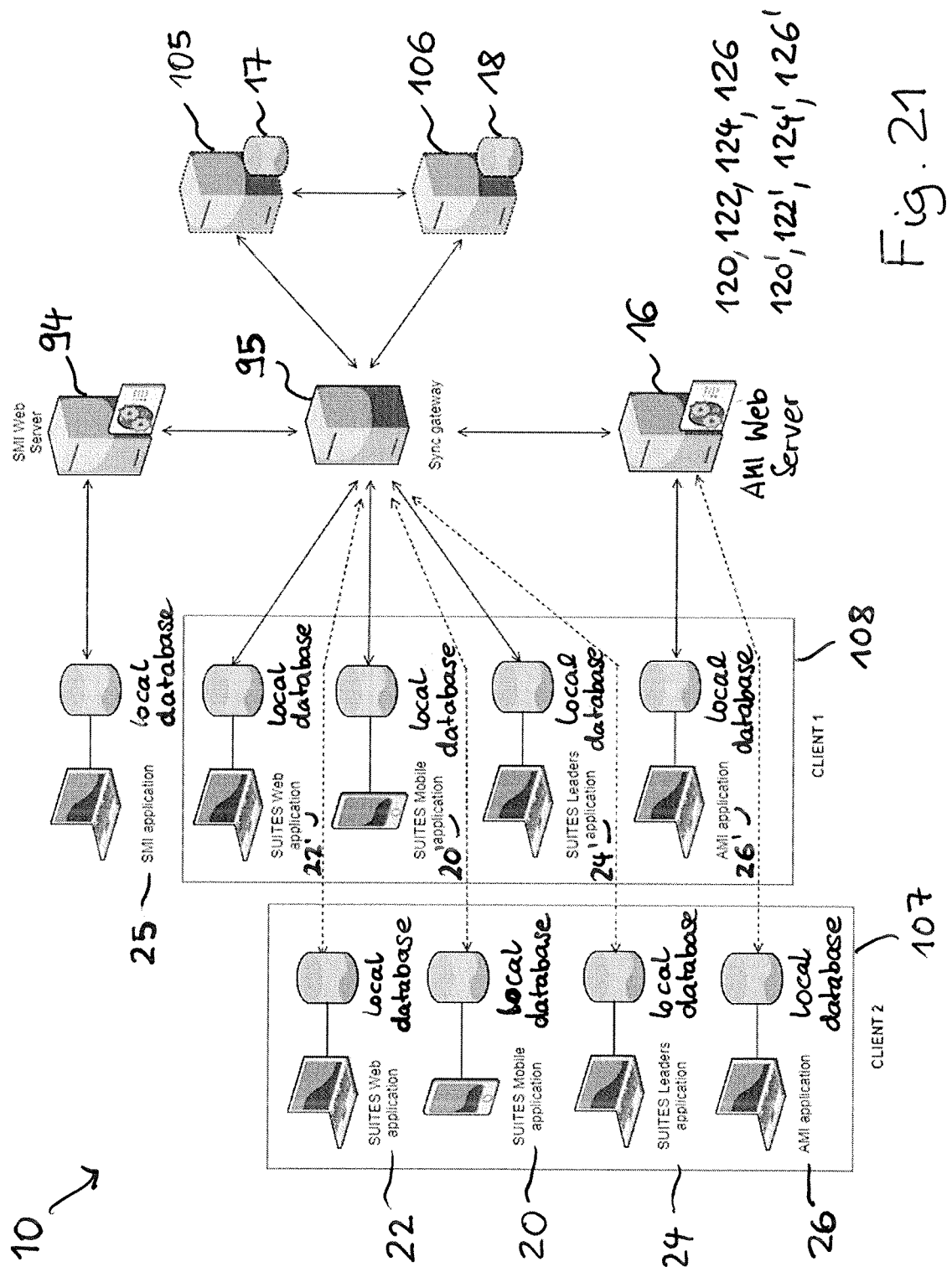
Figure 22:
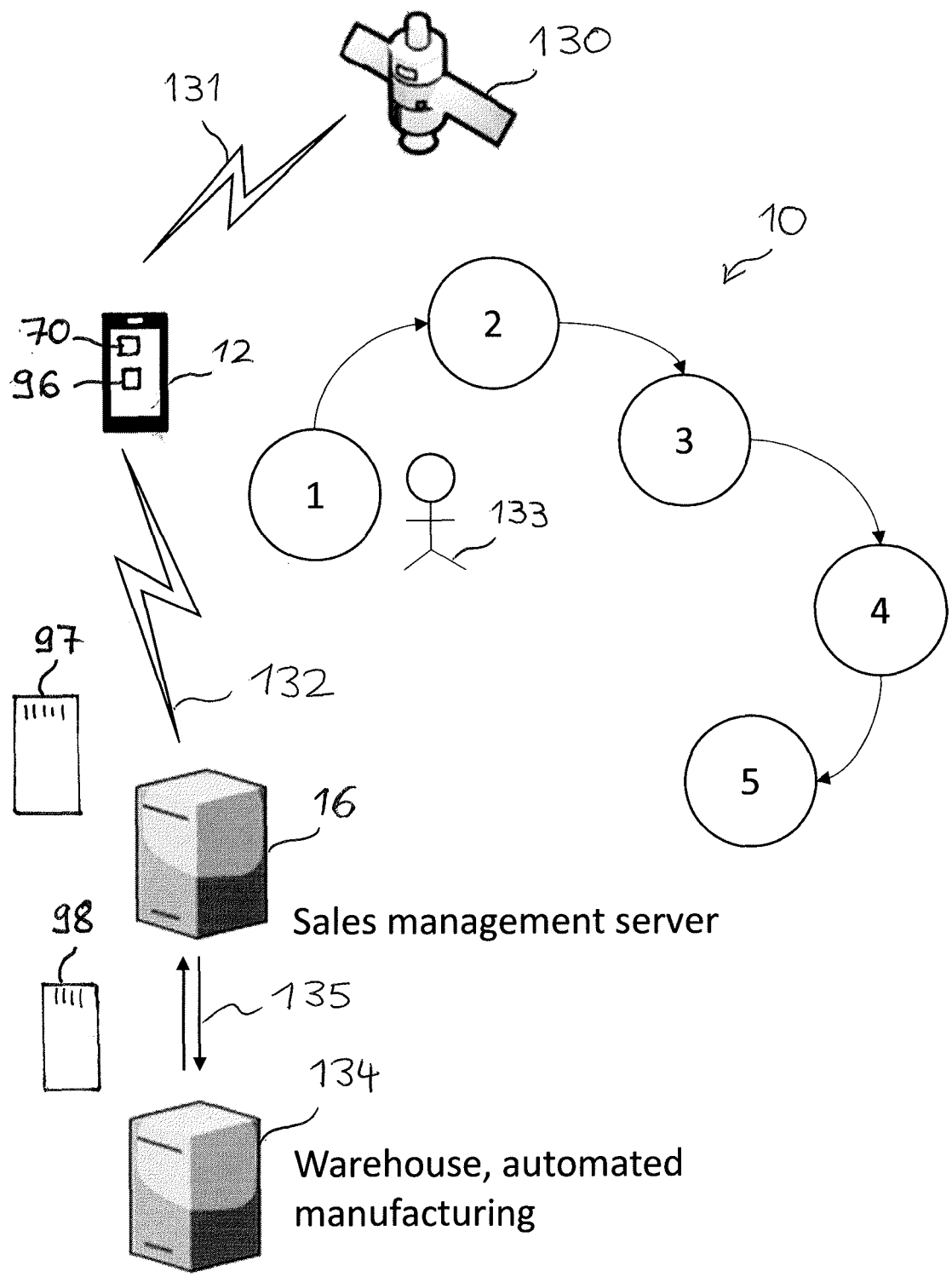

According to a preferred embodiment, each device contains only the required applications. Typically, this means that the device contains only one application, which provides suitable functionality for a user or a user type. Such a situation is shown in the configuration of FIGS. 21 and 22.

For example, a sales person has a sales application on his mobile device and a sales leader has a sales team management application on his mobile device or desktop. In another example, there are more than one applications on a given device. For example, a sales leader has the sales team management application and the sales application on his mobile device.

Figure 20:
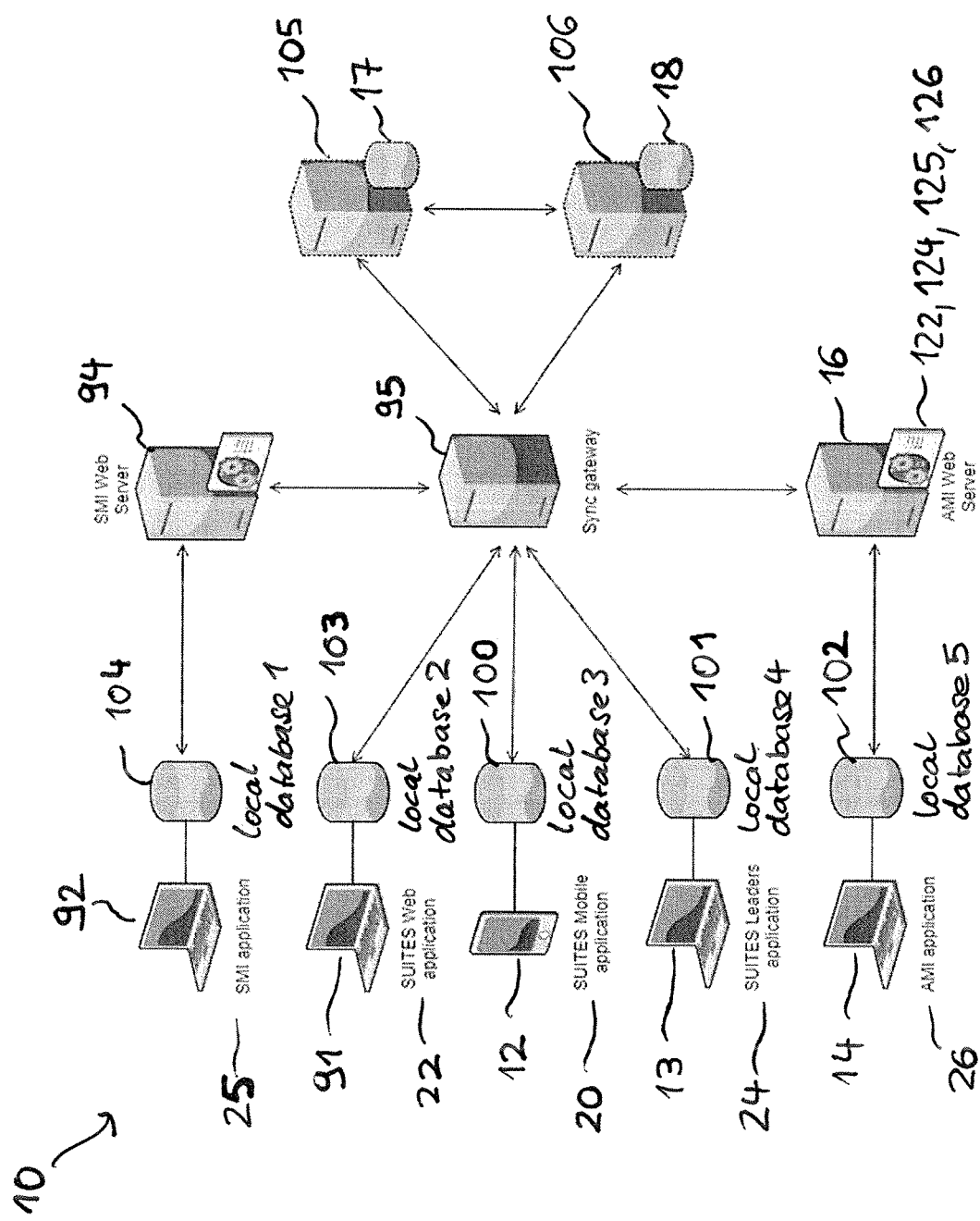

FIG. 20 shows a configuration of the sales management system 10. In this example configuration, a mobile device module 20 is provided on a mobile phone 20, a sales leader module application 24 is provided on a first laptop 13, an AMI application 25 is provided on a second laptop 14, a web application 22 is provided on a third laptop 91 and an SMI application 25 is provided on a fourth laptop 92.

The devices 12, 13, 14, 91, 92 also comprise in their computer readable memory respective local databases 100, 101, 102, 103, 104. The local databases 100, 101, 102, 103, 104 contain information that is required to run the respective application offline. They mirror in part the content of the remote database 17 and its backup database 18, which are provided on the remote database servers 105 and 106. In general, a database comprises a database management application and the database data. In particular, the remote database can be installed on a virtual machine.

In the example of FIG. 20, dedicated servers 95, 16 and 94 are provided for data synchronization, applications and AMI interface and for the SMI interface. The AMI webserver 16 comprises remote application components or applications 122, 124, 125, 126, which are configured to communicate with the locally installed applications or interfaces 22, 24, 25 and 26, respectively.

According to one embodiment, synchronization and update of data is handled through a synchronization gateway, which is running on a server computer and which intercepts the data traffic between the mobile devices and the database. The synchronization gateway, which is labelled as "Sync gateway" in FIGS. 20 and 21, maintains up-to-date copies of documents on mobile devices for instant access and on servers in data centers for reasons such as synchronizing documents, sharing documents, and loss-protection.

The synchronization gateway provides access control and ensures that users can only access certain documents. This can be accomplished by providing customized access functions. By way of example, an access function can make the access dependent on a user or on a user role. Furthermore, the access function may operate on a channel which is assigned to documents, rather than on the level of a document itself.

Furthermore, the synchronization gateway ensures that only relevant documents are synchronized. This can be accomplished by examining the respective document and applying business logic to decide whether to assign the documents to channels.

More specifically, channels can be used to filter documents being pulled from the synchronization gateway. Every document stored in a database that is connected to the synchronization gateway is tagged with a set of named channels by a customized synchronization function that runs on a mobile device.

A pull replication from the gateway is implicitly filtered by the set of channels that the user's account is allowed to access. The replication can be filtered further by creating an array of channel names and setting it as the value of the channels property of a pull replication. Only documents tagged with those channels will be downloaded.

When the data is changed independently, version conflicts may arise. Typically, such a conflict can occur, if data is changed in a situation where one or two mobile devices are offline and operate on the same data. In the context of the sales execution system, these conflicts can be handled by providing a customized handler function. The database provides a version tree of the data and the handler function determines the way in which the version tree is going to be pruned.

In the case of a document-based NoSQL database the handler function compares different versions of documents with each other. For example, the handler function may decide to apply the latest update unless one of the updates deletes a document, in which case the deletion takes precedence over the other update. Or, alternatively, the handler function may provide a method for merging different document versions.

More specifically, the replication can be handled by providing a replication object that represents a replication task which transfers changes between a local database and a remote one. By way of example, the replication object can be obtained from the database management system. It can be customized by configuring its parameters. Preferentially, the replication runs asynchronously on a background thread.

In a typical scenario, a pair of replication handlers, namely a push and a pull replication, is created at the launch time of a mobile device application. The replication handlers comprise an URL of a server run by the application vendor. Preferentially, the replications stay active continuously during the lifespan of a mobile device application. Thereby they can upload and download documents as changes occur and when the network is available.

Herein, the terms push and pull replication are defined with respect to the mobile or "local" device. A push replication uploads changes from the local database to the remote one, whereas a pull replication downloads changes from the remote database to the local one.

The message transfer between the synchronization gateway and the mobile devices may be provided by a REST (representational state transfer) interface, which can be implemented on top of a HTTP protocol. Customizable handler functions and/or objects, such as those mentioned above, can be provided to make the handling of the REST API more comfortable for application programmers.

FIG. 21 shows a further configuration of the sales execution system 10. According to this configuration, there are devices 107 of a first client with applications 20, 22, 24, 25 uploaded onto the devices 107 and devices 108 of a second client with applications 20', 22', 24', 26' uploaded onto the devices 108. A suites management interface 25 is provided centrally for all clients. Therefore, changes that are made using the SMI interface take effect for all clients.

The local databases on the devices of FIG. 20, 21 can also be present in the other embodiments to enable offline functionality. Similarly, the server arrangement of FIGS. 20 and 21 is not limited to the embodiments of FIGS. 20 and 21.

FIG. 22 shows a use of the sales execution system 10 by a sales person 133, wherein a client device 12 receives satellite position signals or location signals of a satellite 130 over a first wireless communication link 131.

The sales person 133 uses the client device 16 during customer calls at geographical locations which are marked by the labels 1-6 in this example. During the customer call, the sales person 133 interacts with a client, which is not shown in FIG. 22, according to a work flow provided by a sales application on the client device 12. Furthermore, the sales application uses the client device 12 to receive location signals over the wireless communication link 131. Furthermore, the sales application uses a further communication link 132 to communication with a sales management server 16 in order to store or retrieve data relevant to the customer call.

In the example of FIG. 22 the sales person 133 causes the sales application to send a product request message over the communication link 132, which is forwarded by the sales management server 16 to a warehouse server 134, which provides an automated product manufacturing. A data traffic 135 between the sales management server 16 and the warehouse server 134 is handled by an application component on the sales management server 16.

The client device 12 comprises a computer memory 70 which comprises the sales application. Furthermore, the client device comprises a location detection means 97, such as receiver for the location signals of a satellite navigation system of the satellite 130 and an application for processing signals of the satellite navigation system.

During operation, automated messages 97 are transmitted between the sales management server 16 and the client device 12 when the client device 12 is online. Furthermore, automated messages 98 are transmitted between the sales management server 16 and the warehouse server 134. The automated messages include, among others warning messages and other status messages, product delivery messages, data update messages for product data, customer data and sales person data and other user interaction data.

FIG. 23 shows an example of product categories of products being offered by the sales execution system 10. In the example of FIG. 23, product categories of a typical food and beverage business are shown. In this example, the product categories include food items 136, restaurant equipment 137 and equipment and materials 138 for management, billing and accounting.

Figure 24:
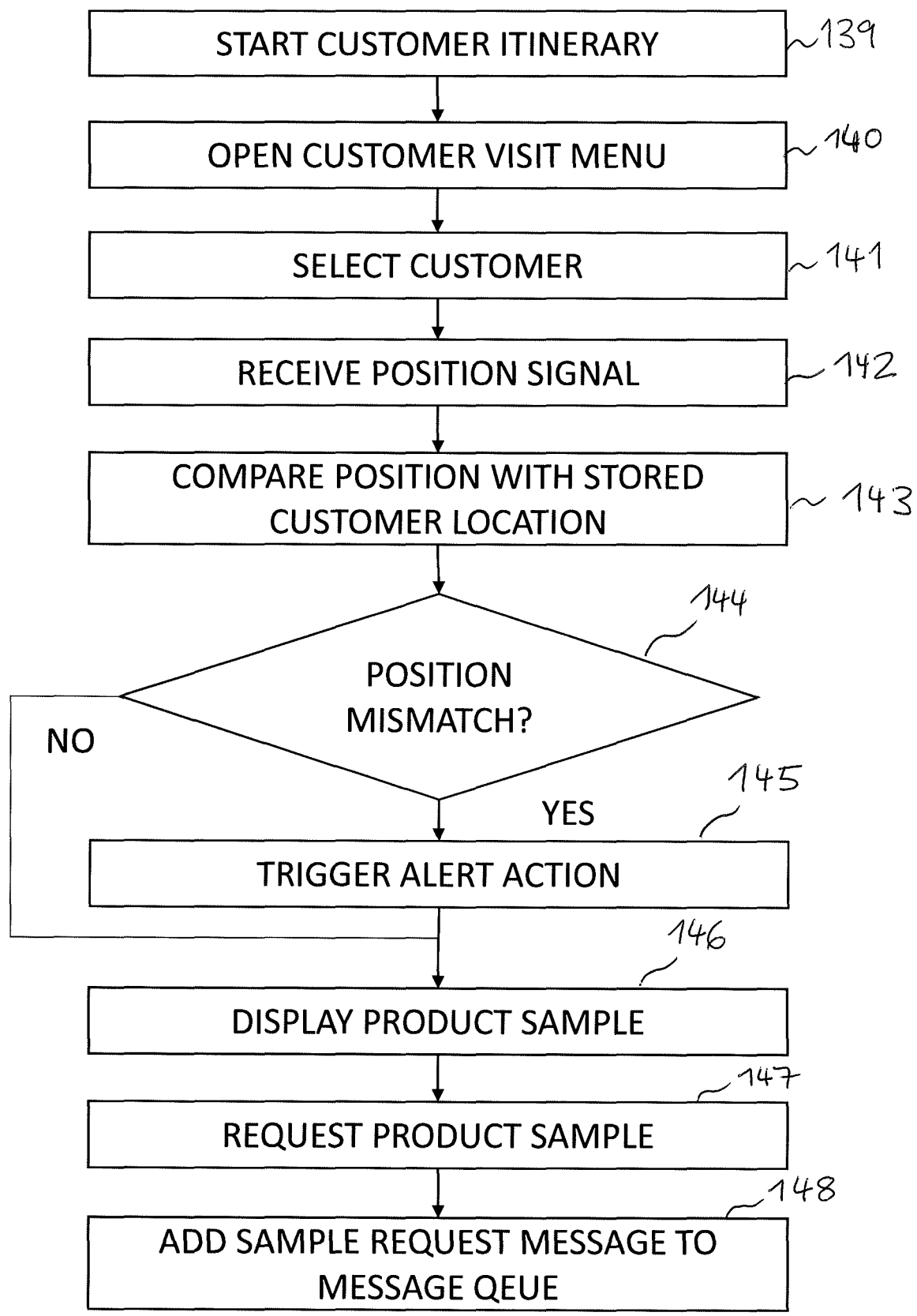

FIG. 24 shows a flow diagram of using a satellite position signal in a sales application of the sales execution system 10, which illustrates in further detail the use case of FIG. 22.

In a first step 139, a sales person starts customer itinerary. In a next step 140, the sales person opens a customer visit menu of a sales application on a client device and selects a client in a step 141. The sales application receives a position signal in step 142, derives a position of the client device and compares the derived position with a stored customer location in step 143. If a position mismatch is detected in decision step 144, an alert action is triggered in step 145. If no mismatch is detected, the sales programme goes directly to a next step 146, which in this example relates to the display of a product sample. In a further step 147, a physical product sample is requested over a user interface of the sales application and in as step 148, a sample request message is added to a message queue of the sales application.

Figure 25:
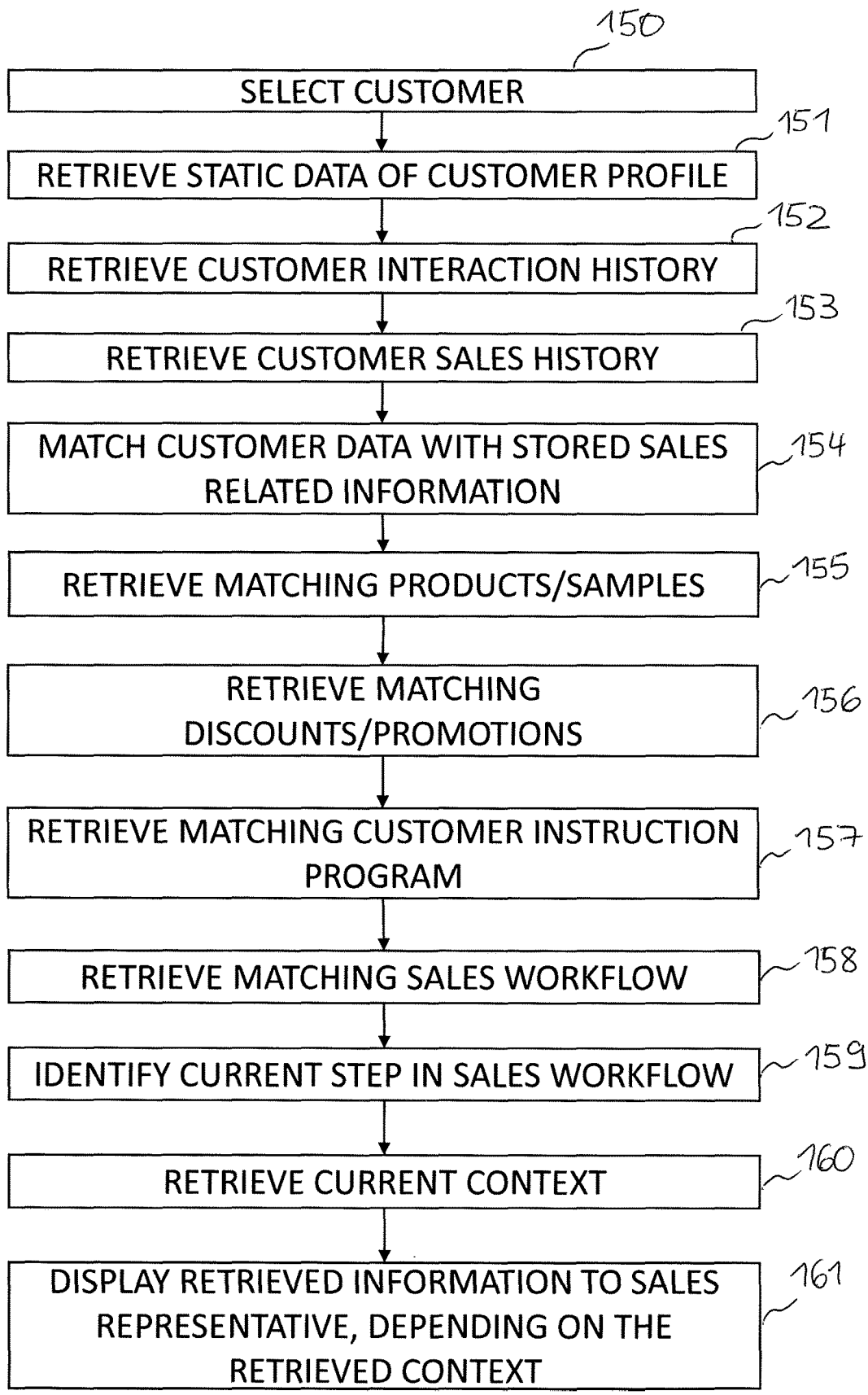

FIG. 25 shows a flow diagram, wherein a work flow is identified and displayed in the sales application.

In a step 150, a customer is selected and in further steps 151, 152 and 153 static data of the customer profile is retrieved, a customer interaction history is retrieved a customer sales history is retrieved. The customer data, which comprises the customer profile, the customer interaction history and the customer sales history is matched with stored sales related information in a step 154.

In a further step 155, matching products or samples are retrieved using the stored sales related information and the customer data. Furthermore, in a step 156 matching discounts and/or promotions are retrieved using the stored sales related information and the customer data, in a step 157 a matching customer instruction program is retrieved using the stored sales related information and the customer data, wherein the customer instruction program can contain a customer instruction workflow, and in a step 158, a matching sales workflow is retrieved using the stored sales related information and the customer data.

In a step 160, a customer context is retrieved and in a step 161, the retrieved information is displayed depending on the retrieved context. For example, the retrieved context can refer to a current position in a work flow or an entry mode of the sales program.

Figure 26:
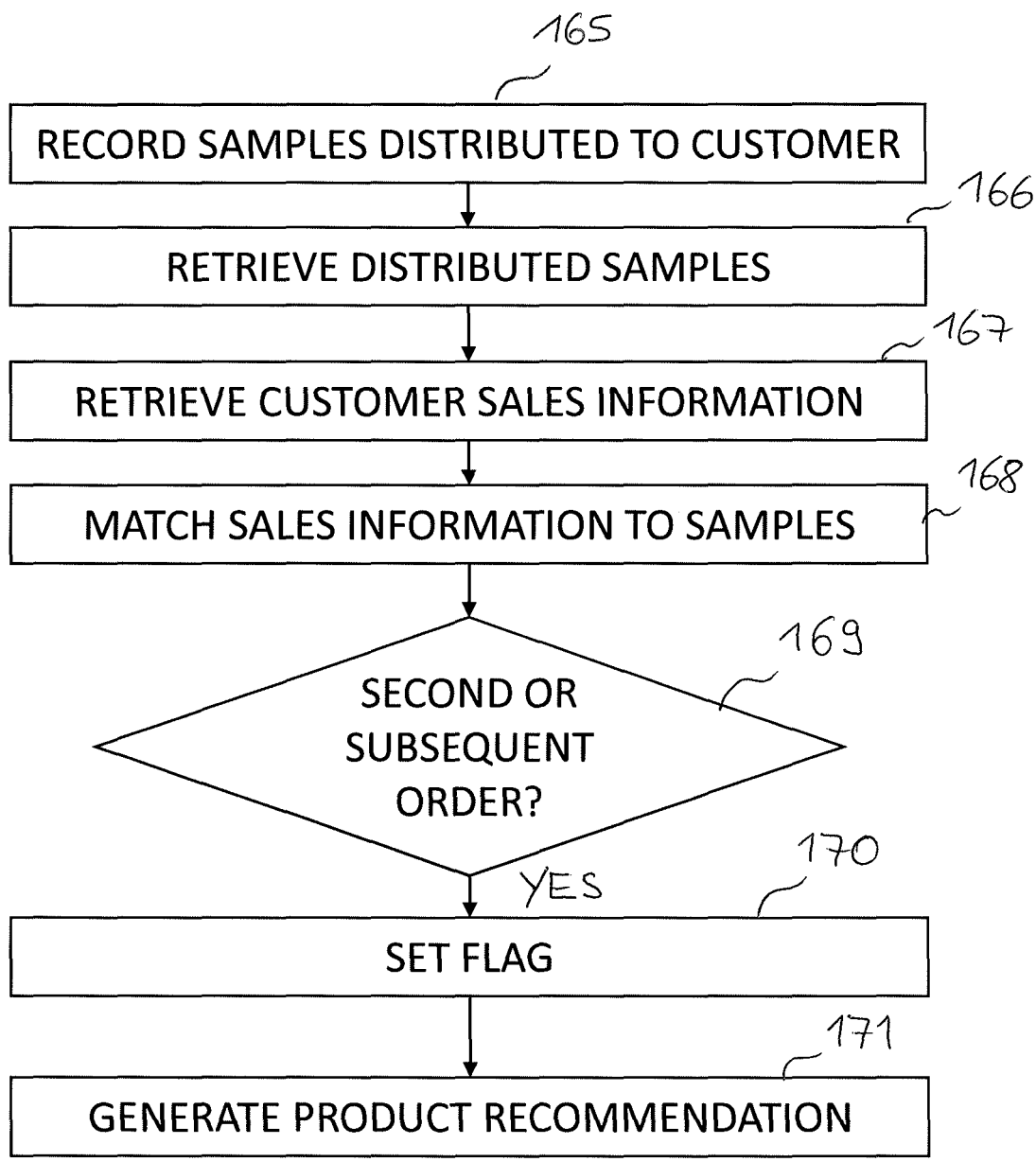

FIG. 26 shows a flow diagram, wherein a sold product is matched to distributed samples for raising a flag and generating a product recommendation.

In a step 165, samples that are distributed to the customer are recorded, which may be automatically or by way of data entry. In a further step 166, a list of distributed samples is retrieved and in a further step 167, customer sales information is retrieved. In a decision step 168, it is determined if a product order that matches to a previously distributed product sample is a second or subsequent order. If this is the case, a flag is raised in a step 169. Otherwise, the process loops to a next step, which is not shown in FIG. 26. In a further step 170, a product recommendation is generated.

Figure 27:
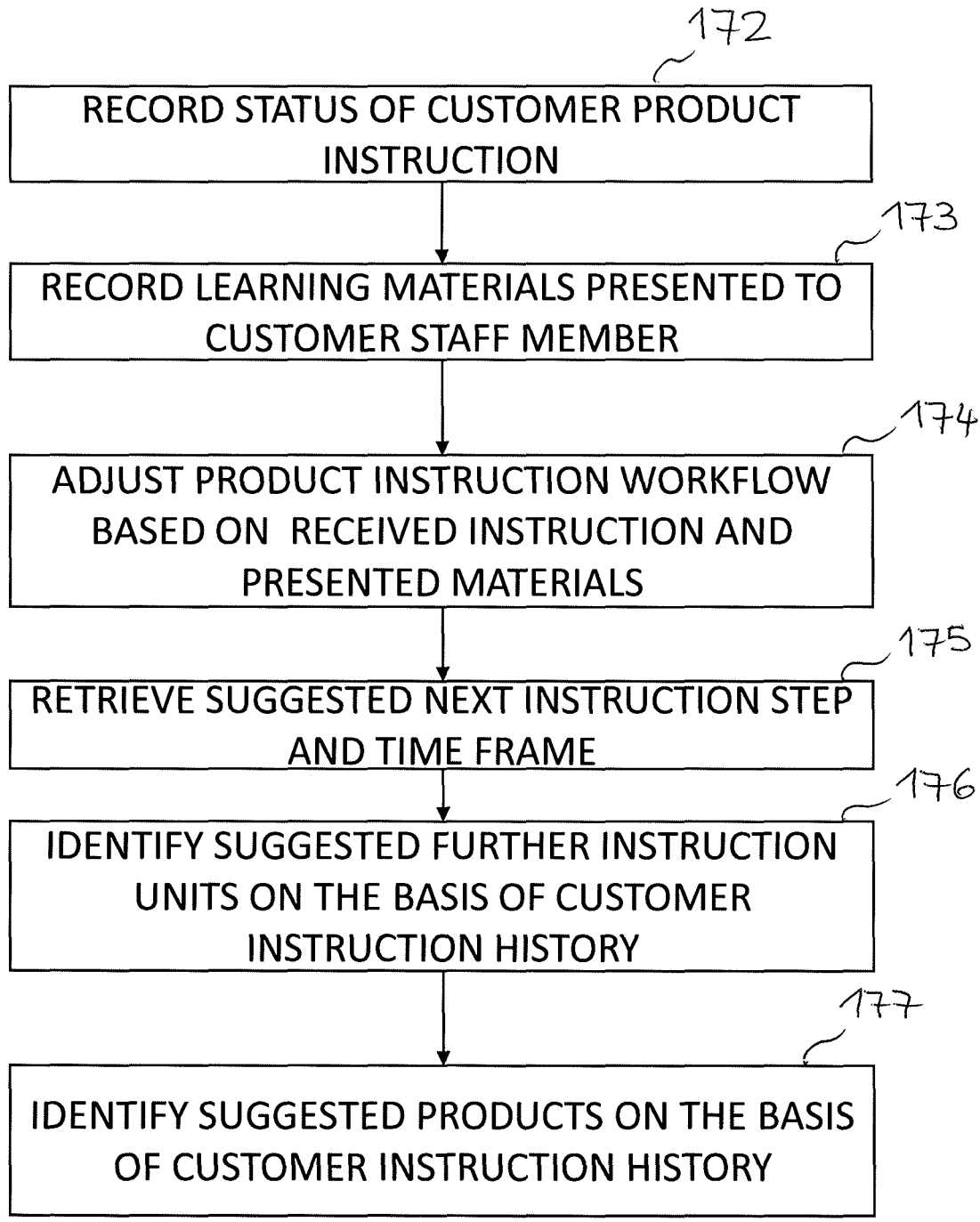

FIG. 27 shows a flow diagram, wherein a product instruction work flow is adjusted and a product suggestion is generated based on data acquired during previous client contacts.

In a step 172, a status of an ongoing product instruction is recorded. In a further step 173, learning materials that are presented to the customer are recorded. In a step 174, a product instruction workflow of a sales application is adjusted and, in further step 175, a suggested next instruction step of the adjusted workflow is retrieved.

In a step 176, further instruction units to be presented to a client are identified based on the recorded previous customer instruction history. In a further step 177, a suggested products are identified based on the recorded previous customer instruction history.

The embodiments of the present specification are also disclosed in the following item list. The embodiments and features of this item list can also be combined with other embodiments of the present specification.

1. An interaction execution system (10) comprising
   a software suite, the software suite comprising an interaction application (20, 22, 24, 26) for installation on a client device (91, 92, 12, 13, 14),
   the client device comprising a computer memory (70), the computer memory comprising the interaction application, the client device comprising location detection means (96) for obtaining location data,
   a remote server (116),
   a wireless connection (132) between the client device and the remote server,
   wherein the interaction application is operative to derive an actual location (1, 2, 3, 4, 5) of the client device using the location data of the location detection means,
   to receive user interaction data, the user interaction data being indicative of a user interaction with an interaction partner at a pre-determined location,
   the receiving of the user interaction data comprising retrieving user interaction information from a local database (100, 101, 102, 103, 104) on the client device, the user interaction information comprising a predetermined location of the user interaction, data relating to the interaction partner and data relating to a user of the client device,
   the interaction application being further operative to compare the actual location of the client device with the pre-determined location of the user interaction, to generate an automated message if a mismatch between the actual location of the client device and the predetermined location of the user interaction is detected, to send the automated message to the remote server as soon as the client device is connected over the wireless connection, and to output the automated message to a user of the remote server.
2. The interaction execution system of item 1, wherein the client device comprises a receiver for signals of a satellite navigation system, and a position module for deriving the location of the client device from the signals of the satellite navigation system.
3. The interaction execution system according to item 1 or item 2, wherein the client device comprises a receiver for signals of a cell phone network, and a position module for deriving the location of the client device from the signals of the cell phone network.
4. Computer implemented method for operating an interaction execution system, the interaction execution system comprising a software suite, the software suite comprising an interaction application for installation on a client device, the method comprising
   receiving user interaction data by the interaction application on the client device,
   the receiving of the user interaction data comprising retrieving user interaction data relating to an interaction partner from a database on the client device, the user interaction data being indicative of a user interaction with the interaction partner at a pre-determined location, obtaining location data and deriving an actual location of the client device from the location data, comparing the actual location of the client device with the pre-determined location of the user interaction, generating an alert message if a mismatch between the actual location of the client device and the predetermined location of the user interaction is detected, sending the automated message to the remote server as soon as the client device is connected over the wireless connection, and outputting the automated message to a user of the remote server.

5. The method of claim 4, comprising receiving a location signal over a wireless connection and deriving the location data from the location signal.

6. The method of item 5, comprising receiving the location signal from a satellite navigation system.

7. The method of item 5, comprising receiving the location signal from a cell phone network.

8. The method according to one of the items 5 to 7, wherein the user interaction data comprises a request for delivering a product sample to the interaction partner.

9. The method according to one of the items 5 to 8, wherein the user interaction data comprises a request for delivering a product sample to the interaction partner.

10. The method according to one of the items 5 to 9, the method comprising sending the generated alert message to a remote server, matching the alert message to user data of the user of the client device, updating a stored track record of the user of the client device.

11. The method of item 10, comprising retrieving the stored track record of the user of the client device by a managing application of the software suite, generating a visual indicator in a graphical user interface of the managing application, which is indicative of a status of the track record.

12. A computer implemented method for operating an interaction execution system, the interaction execution system comprising a software suite, the software suite comprising an interaction application for installation on a client device, the method comprising:

detecting a user interaction by way of receiving input data by the interaction application, receiving competitor product data relating to a competitor product, retrieving product catalogue data, matching the product data of the competitor product with the product catalogue data, deriving a product recommendation by identifying one or more products in the product catalogue data which are similar to the competitor product or which complement the competitor product, displaying the product recommendation.

13. The method according to item 12, wherein the competitor product data is indicative of one or more competitor product that the client has purchased.

14. The method according to item 12 or item 13, wherein the competitor product data is indicative of one or more competitor product that the client intends to purchase.

15. A computer implemented method for operating an interaction execution system, the interaction execution system comprising a software suite, the software suite comprising an interaction application for installation on a client device, the method comprising:

monitoring the distribution of product samples to an interaction partner and generating a list of distributed product samples, monitoring products sold to the interaction partner and generating a list of sold products, matching the list of sold products to the list of distributed product samples, raising a flag if one of the sold products matches a distributed sample.

16. The method of item 15, comprising counting the number of sold products that match a distributed sample.

17. The method according to item 15 or item 16, comprising collecting historical client data of the interaction partner, generating a product recommendation based on the historical data.

18. An interaction execution system comprising a software suite, the software suite comprising an interaction application for installation on a client device, a client device, the client device comprising a computer memory, the computer memory comprising the interaction application, and the computer memory comprising an interaction database, a remote server, a wireless connection between the client device and the remote server, the interaction application being operative to detect a customer interaction by way of receiving input data, retrieve competitor product data relating to a competitor product from the interaction database, retrieve product catalogue data from the interaction database, match the product data of the competitor product with the product catalogue data, derive a product recommendation by identifying one or more products in the product catalogue data which are similar to the competitor product or which complement the competitor product, displaying the product recommendation.

19. An interaction execution system comprising a software suite, the software suite comprising an interaction application for installation on a client device, a client device, the client device comprising a computer memory, the computer memory comprising the interaction application and a database, the database comprising a pre-determined location of an interaction partner a remote server, a wireless connection between the client device and the remote server, the interaction application being operative to monitor the distribution of product samples to the interaction partner at the pre-determined location and to generate a list of distributed product samples, to monitor products sold to the interaction partner and to generate a list of sold products, to match the list of sold products to the list of distributed product samples, to raise a flag if one of the sold products matches a distributed sample, to generate an accounting message and to send the accounting message to the remote server, wherein the accounting message is of a first type if one of the sold products matches the distributed sample and of a second type if none of the sold products matches the distributed sample.

20. A computer implemented method for operating an interaction execution system, the interaction execution system comprising a software suite, the software suite comprising an interaction application for installation on a client device, the method comprising
    receiving data indicating a request to obtain a product or a product sample on the client device,
    generating a product request message for delivering the product or product sample,
    sending the product request message to a remote server,
    receiving the product request message on the remote server,
    generating a product delivery message for delivering the product or product sample to a client or to a sales person associated with the client.

21. The method of item 20, comprising
    triggering an automated packaging of the product or product sample.

22. The method of item 20 or item 21, comprising
    triggering an automated delivery of the product or product sample.

23. The method of one of the items 20 to 22, comprising
    triggering an automated production of the product or product sample.

24. The method of item 23, wherein the automated production of the product or product sample comprises a 3D-printing process.

25. An interaction execution system comprising
    a software suite, the software suite comprising an interaction application for installation on a client device,
    the client device comprising a computer memory, the computer memory comprising the interaction application and a database,
    a remote server, the remote server comprising a remote database, the remote database comprising a predetermined delivery location,
    a wireless connection between the client device and the remote server,
    the interaction application being operative
      to receive data indicating a request to obtain a product or a product sample on the client device,
    generate a product request message for delivering the product or product sample to an interaction partner,
    to automatically send the product request message to the remote server as soon as the client device is connected over the wireless connection,
    receive the product request message on the remote server,
    to retrieve the pre-determined delivery location from the remote database,
    generate a product delivery message for delivering the product or product sample to the pre-determined delivery location of the interaction partner, or to a sales person associated with the interaction partner.

26. A computer implemented method for operating an interaction execution system for generating a customer interaction workflow, the interaction execution system comprising a software suite, the software suite comprising a sales application for installation on a client device, the method comprising
    generating a customer interaction workflow, the customer interaction workflow comprising
    one or more suggested steps to follow during a customer interaction,
    data relating to material to be presented to an interaction partner during the customer interaction, wherein the generated customer interaction workflow depends on input data gathered during at least one previous customer interaction.

27. Method according to item 26,
    comprising deriving a duration measure for the duration of a customer relationship based on previously acquired historical data of the interaction partner,
    adjusting the generated customer interaction workflow depending on the derived duration measure.

28. Method according to item 27, comprising counting a number of previous meetings with the interaction partner, deriving the duration measure based on the number of previous meetings with the interaction partner.

29. Method according to one of the items 26 to 28, comprising
    monitoring information that has been displayed to the interaction partner in previous meetings,
    removing steps from a customer interaction workflow which relate to previously displayed information.

30. Method according to item 29,
    wherein the previously displayed information relates to a video presentation of handling a product.

31. Method according to item 29 or item 30, comprising
    monitoring the distribution of product samples to the interaction partner and generating a list of distributed product samples,
    monitoring products sold to the interaction partner and generating a list of sold products,
    matching the list of sold products to the list of distributed product samples,
    adjusting the customer interaction workflow if one of the products in the list of sold products matches a distributed sample in the list of distributed samples.

32. A sales execution system comprising
    a software suite, the software suite comprising an interaction application for installation on a client device,
    a client device, the client device comprising a computer memory, the computer memory comprising the interaction application,
    wherein the interaction application is operative to generate a customer interaction workflow, the customer interaction workflow comprising
    one or more suggested steps to follow during a customer interaction,
    data relating to material to be presented to an interaction partner during the customer interaction, wherein
    the generated customer interaction workflow depends on input data gathered during at least one previous customer interaction.

33. A sales execution system comprising
    a plurality of client devices, each of the client devices comprising a computer memory, the computer memory comprising
      at least one software application of a plurality of software suites,
      application management interface data, the application management interface data comprising access control data, the access control data determining which features of the at least one application are accessible for a user group of a pre-determined set of user groups,
      a local application management application for configuring the application management interface data, the local application management application being operative to communicate with a remote administration management interface module on a remote computer system, the remote administration management interface module being configured as a gateway for a data transfer between application data of the software applications, a local database for storing local application data of the at least one software application, the software application being operative to synchronize the local application data with a remote database on the remote computer system, wherein each of the software suites is configured according to a subscription scheme selected by a client entity of the software suite, the configuration comprising activation and deactivation of software applications using a suite management interface module, the suite management interface module being provided for execution on the remote computer system, wherein the application management interface updates the at least one software application of the software suite automatically based on the application management interface data, if a feature of the at least one application is not accessible for the user group and the application management interface data indicates that the feature of the at least one application is accessible for the user group.

34. The sales execution system according to item 33, wherein at least one of the client devices of a client entity of a software suite comprises a local suites management interface application that is operative to communicate with the suite management interface module.

35. The sales execution system according to item 33 or item 34, wherein the applications of the plurality of suites comprise a suites mobile sales application and a web store application.

36. The sales execution system according to one of the items 33 to 35, wherein the applications of the plurality of suites comprises a sales leaders application.

37. The sales execution system according to one of the items 33 to 36, wherein the suite management interface module is provided on a dedicated web server.

38. The sales execution system according to one of the items 33 to 37, wherein the suite management interface module is provided on a dedicated web server.

39. The sales execution system according to one of the items 33 to 38, wherein the remote administration management interface module is provided on a dedicated web server.

40. The sales execution system according to one of the items 33 to 39, wherein the applications comprise a login interface, and wherein the login interface limits access to a given application to one or more user group of the pre-determined set of user groups according to the user access data.

41. The sales execution system according to one of the items 33 to 39, wherein the pre-determined set of user groups comprises a sales personnel user group, a sales leaders user group, a customer user group, and an administrator user group.

42. The sales execution system according to one of the items 33 to 39, the sales execution system comprising the remote computer system, the remote database and the suites management interface module being provided on a plurality of server computers of the remote computer system.

43. The sales execution system according to one of the items 33 to 42, wherein the subscription schemes comprises a first subscription scheme in which a sales application for use by a sales person is activated, a second subscription scheme in which the sales application and a sales leaders application for use by sales leaders that supervise sales persons is activated, and a third subscription scheme in which the sales application, the sales leaders application and a web application for purchasing products is activated.

44. A sales execution system comprising
a plurality of software suites, the software suites comprising software applications for installation on client devices, a local application management application for installation on the client devices, the local application management application being provided for configuring application management interface data, the application management interface data comprising access control data, the access control data determining which features of the at least one application are accessible for a user group of a pre-determined set of user groups, and the local application management application being operative to communicate with a remote administration management interface module, the remote administration management interface module being configured as a gateway for a data transfer between application data of the software applications, a local database for storing local application data, the local application data relating to software applications of one of the software suites, the software applications being provided for installation on a client device, wherein the software applications of the one of the software suites which are provided for installation on the client device are operative to synchronize the local application data with a remote database on a remote computer system, wherein each of the software suites is configured according to a subscription scheme selected by a client entity of the software suite, the configuration comprising activation and deactivation of software applications using a suite management interface module, the suite management interface module being provided for execution on the remote computer system.

45. The sales execution system according to item 44, wherein a local suites management interface application is provided for installation on a client device, the local suites management interface application being operative to communicate with the suite management interface module.

46. The sales execution system according to item 44 or item 45, wherein the software applications of the plurality of suites comprise a suites mobile sales application and a web store application.

47. The sales execution system according to one of the items 44 to 50, wherein the applications of the plurality of suites comprises a sales leaders application.

48. The sales execution system according to one of the items 44 to 50, wherein the suite management interface module is operative to run on a dedicated web server.

49. The sales execution system according to one of the items 44 to 50, wherein the remote administration management interface module is operative to run on a dedicated web server.

50. The sales execution system according to one of the items 44 to 53, wherein the applications comprise a login interface, and wherein the login interface limits access to a given application to one or more user group of the pre-determined set of user groups according to the user access data.

51. The sales execution system according to one of the items 44 to 54, wherein the pre-determined set of user groups comprises a sales personnel user group, a sales leaders user group, a customer user group, and an administrator user group.

52. The sales execution system according to one of the items 44 to 51, wherein the remote computer system is provided by a distributed computer system.

53. The sales execution system according to one of the items 44 to 52, wherein the subscription schemes comprises a first subscription scheme in which a sales application for use by a sales person is activated, a second subscription scheme in which the sales application and a sales leaders application for use by sales leaders that supervise sales persons is activated, and a third subscription scheme in which the sales application, the sales leaders application and a web application for purchasing products is activated.

54. A computer memory, the computer memory comprising
at least one software application of a plurality of software suites,
application management interface data, the application management interface data comprising access control data, the access control data determining which features of the at least one application are accessible for a user group of a pre-determined set of user groups,
a local application management application for configuring the application management interface data, the local application management application being operative to communicate with a remote administration management interface module on the remote computer system, the remote administration management interface module being configured as a gateway for a data transfer between application data of the software applications,
a local database for storing local application data of the at least one software application, the software application being operative to synchronize the local application data with a remote database on a remote computer system,
wherein each of the software suites is configured according to a subscription scheme selected by a client entity of the software suite, the configuration comprising activation and deactivation of software applications using a suite management interface module, the suite management interface module being provided for execution on the remote computer system.

55. A computer implemented method for operating a sales execution system, the sales execution system comprising a plurality of software suites, the software suites comprising software applications for installation on client devices, the method comprising
receiving first configuration commands over a local administration management interface which is installed on a client device, configuring the accessibility of features of the software applications for a user group of a pre-determined set of user groups according to the configuration commands,
modifying a data transfer between application data of the software applications on a remote computer system according to the first configuration commands,
receiving second configuration commands over a suites management interface,
modifying an accessibility of applications of a software suite according to the second configuration commands.

Although the above description contains much specificity, these should not be construed as limiting the scope of the embodiments but merely providing illustration of the foreseeable embodiments. For example, the modular structure shown FIGS. 3 to 8 may be modified and varied. Additional functionality may be provided and some of the functionality may be left out.

Especially the above stated advantages of the embodiments should not be construed as limiting the scope of the embodiments but merely to explain possible achievements if the described embodiments are put into practise. Thus, the scope of the embodiments should be determined by the claims and their equivalents, rather than by the examples given.

REFERENCE NUMBERS

| | |
|---|---|
| 9 | data link |
| 10 | sales execution system |
| 11 | user terminals |
| 12 | mobile phone |
| 13 | first laptop |
| 14 | second laptop |
| 15 | cloud computing environment |
| 16 | AMI web server |
| 17 | distributed database |
| 18 | database replica |
| 19 | mobile phone |
| 20 | mobile device module |
| 22 | web module |
| 24 | sales leader module |
| 25 | management interface |
| 26 | administration management interface |
| 27 | components, modules |
| 28 | main application |
| 30 | user functions |
| 32 | customer management functions |
| 34 | reporting functions |
| 36 | product gallery |
| 38 | product cart |
| 42 | authentication functions |
| 43 | user setting functions |
| 44 | tracking functions |
| 46 | presentation function |
| 47 | customer management functions |
| 48 | customer information functions |
| 49 | customer analytics functions |
| 50 | customer history functions |
| 51 | competitor information functions |
| 52 | customer call functions |
| 53 | customer survey functions |
| 54 | target definition functions |
| 57 | user feedback functions |
| 58 | customer report functions |
| 59 | system health functions |
| 60 | product report functions |
| 62 | call report functions |
| 64 | schedule report functions |
| 65 | KPI monitoring functions |
| 66 | infographic functions |
| 70 | memory |
| 71 | memory |
| 72 | memory |
| 73 | memory |
| 80 | working memory area |
| 81 | working memory area |
| 82 | working memory area |
| 83 | working memory area |
| 85 | system provider |
| 86 | client |
| 87 | customer |
| 88 | consumer |
| 90 | value chain |
| 91 | laptop |
| 92 | laptop |
| 94 | laptop |
| 95 | laptop |
| 96 | location detection means |

-continued

| | |
|---|---|
| 97 | automated message |
| 98 | automated message |
| 101 | local database |
| 102 | local database |
| 103 | local database |
| 104 | local database |
| 105 | remote database server |
| 106 | remote database server |
| 120 | remote application |
| 122 | remote application |
| 124 | remote application |
| 125 | remote application |
| 126 | remote application |
| 130 | satellite |
| 131 | communication link |
| 132 | communication link |
| 134 | warehouse server |
| 135 | data traffic |
| 136 | food items |
| 137 | equipment |
| 138 | management materials |
| 139 | method step |
| 140 | method step |
| 141 | method step |
| 142 | method step |
| 143 | method step |
| 144 | decision step |
| 145 | method step |
| 146 | method step |
| 147 | method step |
| 148 | method step |
| 150 | method step |
| 151 | method step |
| 152 | method step |
| 153 | method step |
| 154 | method step |
| 155 | method step |
| 156 | method step |
| 157 | method step |
| 158 | method step |
| 159 | method step |
| 160 | method step |
| 161 | method step |

The invention claimed is:

1. A sales execution system comprising a plurality of client devices, each of the client devices comprising a computer memory, the computer memory comprising:
   at least one software application of a plurality of software suites;
   application management interface data, the application management interface data comprising access control data, the access control data determining which features of the at least one application are accessible for a user group of a predetermined set of user groups;
   a local application management application for configuring the application management interface data, the local application management application being operative to communicate with a remote administration management interface module on a remote computer system, the remote administration management interface module being configured as a gateway for a data transfer between application data of the software applications; and
   a local database for storing local application data of the at least one software application, the software application being operative to synchronize the local application data with a remote database on the remote computer system,
   wherein each of the software suites is configured according to a subscription scheme selected by a client entity of the software suite, the configuration comprising activation and deactivation of software applications using a suite management interface module, the suite management interface module being provided for execution on the remote computer system, and
   wherein the application management interface updates the at least one software application of the software suite automatically based on the application management interface data if a feature of the at least one application is not accessible for the user group and the application management interface data indicates that the feature of the at least one application is accessible for the user group.

2. The sales execution system according to claim 1, wherein at least one of the client devices of a client entity of a software suite comprises a local suites management interface application that is operative to communicate with the suite management interface module.

3. The sales execution system according to claim 1, wherein the applications of the plurality of suites comprise a suites mobile sales application and a web store application.

4. The sales execution system according to claim 1, wherein the applications of the plurality of suites comprises a sales leaders application.

5. The sales execution system according to claim 1, wherein the suite management interface module is provided on a dedicated web server.

6. The sales execution system according to claim 1, wherein the remote administration management interface module is provided on a dedicated web server.

7. The sales execution system according to claim 1, wherein the applications comprise a login interface, and wherein the login interface limits access to a given application to one or more user groups of the predetermined set of user groups according to the access control data.

8. The sales execution system according to claim 1, wherein the predetermined set of user groups comprises a sales personnel user group, a sales leaders user group, a customer user group, and an administrator user group.

9. The sales execution system according to claim 1, the sales execution system comprising the remote computer system, the remote database, and the suite management interface module being provided on a plurality of server computers of the remote computer system.

10. The sales execution system according to claim 1, wherein the subscription schemes comprise a first subscription scheme in which a sales application for use by a sales person is activated, a second subscription scheme in which the sales application and a sales leaders application for use by sales leaders that supervise sales persons is activated, and a third subscription scheme in which the sales application, the sales leaders application and a web application for purchasing products is activated.

11. A sales execution system comprising:
   a plurality of software suites, the software suites comprising software applications for installation on client devices;
   a local application management application for installation on the client devices, the local application management application being provided for configuring application management interface data, the application management interface data comprising access control data, the access control data determining which features of the software applications are accessible for a user group of a predetermined set of user groups, the local application management application being operative to communicate with a remote administration management interface module, the remote administration management interface module being configured as a gateway for a data transfer between application data of the software applications; and a local database for storing local application data, the local application data relating to the software applications, being operative to synchronize the local application data with a remote database on a remote computer system, wherein each of the plurality of software suites is configured according to a subscription scheme selected by a client entity of the software suite, the configuration comprising activation and deactivation of software applications using a suite management interface module, the suite management interface module being provided for execution on the remote computer system.

12. The sales execution system according to claim 11, wherein a local suites management interface application is provided for installation on a client device, the local suites management interface application being operative to communicate with the suite management interface module.

13. The sales execution system according to claim 11, wherein the software applications of the plurality of software suites comprise a suites mobile sales application and a web store application.

14. The sales execution system according to claim 11, wherein the software applications of the plurality of software suites comprises a sales leaders application.

15. The sales execution system according to claim 11, wherein the suite management interface module is operative to run on a dedicated web server.

16. The sales execution system according to claim 11, wherein the remote administration management interface module is operative to run on a dedicated web server.

17. The sales execution system according to claim 11, wherein the software applications comprise a login interface, and wherein the login interface limits access to a given software application to one or more user groups of the predetermined set of user groups according to the access control data.

18. The sales execution system according to claim 11, wherein the remote computer system is provided by a distributed computer system.

19. A non-transitory computer memory, the computer memory comprising:
at least one software application of a plurality of software suites;
application management interface data, the application management interface data comprising access control data, the access control data determining which features of the at least one software application are accessible for a user group of a predetermined set of user groups;

a local application management application for configuring the application management interface data, the local application management application being operative to communicate with a remote administration management interface module on the remote computer system, the remote administration management interface module being configured as a gateway for a data transfer between application data of the at least one software application; and a local database for storing local application data of the at least one software application, the at least one software application being operative to synchronize the local application data with a remote database on a remote computer system, wherein each of the plurality of software suites is configured according to a subscription scheme selected by a client entity of the software suite, the configuration comprising activation and deactivation of software applications using a suite management interface module, the suite management interface module being provided for execution on the remote computer system.

20. A computer implemented method for operating a sales execution system, the sales execution system comprising a plurality of software suites, the plurality of software suites comprising software applications for installation on client devices, the method comprising:

receiving first configuration commands over a local administration management interface which is installed on a client device;

configuring the accessibility of features of the software applications for a user group of a predetermined set of user groups according to the first configuration commands;

modifying a data transfer between application data of the software applications on a remote computer system according to the first configuration commands;

receiving second configuration commands over a suites management interface; and modifying an accessibility of the software applications of a software suite of the plurality software suites according to the second configuration commands.

* * * * *